(12) United States Patent
Okuda

(10) Patent No.: US 8,301,142 B2
(45) Date of Patent: Oct. 30, 2012

(54) GATEWAY DEVICE, METHOD FOR CONTROLLING RADIO TRANSMISSION, AND RADIO COMMUNICATION SYSTEM

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 12/959,892

(22) Filed: Dec. 3, 2010

(65) Prior Publication Data

US 2011/0077029 A1 Mar. 31, 2011

Related U.S. Application Data

(63) Continuation of application No. PCT/JP2008/060911, filed on Jun. 13, 2008.

(51) Int. Cl.
*H04Q 7/20* (2006.01)

(52) U.S. Cl. .................. 455/435.1; 455/550.1; 455/418; 370/328

(58) Field of Classification Search ............... 455/435.1, 455/550.1, 418; 370/328
See application file for complete search history.

(56) References Cited

U.S. PATENT DOCUMENTS

| | | | |
|---|---|---|---|
| 7,197,306 B1 * | 3/2007 | Song | 455/436 |
| 2001/0044312 A1 * | 11/2001 | Yamane | 455/456 |
| 2003/0224792 A1 * | 12/2003 | Verma et al. | 455/436 |
| 2004/0166836 A1 * | 8/2004 | Kadowaki | 455/417 |
| 2004/0196810 A1 * | 10/2004 | Kil et al. | 370/331 |
| 2006/0205429 A1 * | 9/2006 | Ryoo | 455/518 |
| 2008/0232303 A1 * | 9/2008 | Takahashi et al. | 370/328 |
| 2010/0323705 A1 * | 12/2010 | Iwamura et al. | 455/440 |
| 2011/0130143 A1 | 6/2011 | Mori et al. | |

FOREIGN PATENT DOCUMENTS

| | | |
|---|---|---|
| JP | 06-269039 | 9/1994 |
| JP | 07-170566 | 7/1995 |
| JP | 07-177567 | 7/1995 |
| JP | 10-023519 | 1/1998 |
| JP | 2004-165953 | 6/2004 |
| JP | 2006-352477 | 12/2006 |
| JP | 2007-150843 | 6/2007 |
| JP | 2007-274208 | 10/2007 |
| JP | 2008-109423 | 5/2008 |
| JP | 2009-159355 | 7/2009 |
| WO | 2009/022534 | 2/2009 |

OTHER PUBLICATIONS

Notice of Rejection issued for corresponding Japanese Patent Application No. 2010-516701 mailed May 8, 2012 with English translation.

(Continued)

*Primary Examiner* — Danh Le

(74) *Attorney, Agent, or Firm* — Myers Wolin, LLC

(57) ABSTRACT

A femto GW provides a network connection to an MS that is radio-accommodated in a femto BS. Upon reception of a position registration confirmation for the MS, if the MS has been radio-accommodated in a BS or the femto BS within a specific calling area including a calling area for the femto BS immediately before reception of the position registration confirmation, and the MS that has been radio-accommodated in the specific calling area is withdrawing itself from the calling area, a transmission stop command for stopping radio transmission to the MS is sent to the femto BS.

20 Claims, 29 Drawing Sheets

OTHER PUBLICATIONS

International Search Report for corresponding International Patent Application No. PCT/JP2008/060911, mailed Sep. 2, 2008.

IEEE Computer Society and the IEEE Microwave theory and Techniques Society; IEEE Std 802.16eTM-2005 and IEEE Std 802.16TM-2004/Cor1-2005 (Amendment and Corrigendum to IEEE Std 802.16/2004); Sponsored by the LAN/MAN Standards Committee; IEEE Standard for Local and metropolitan area networks; Part 16: "Air Interface for Fixed and Mobile Broadband Wireless Access Systems"; Amendment 2: Physical and Medium Access Control Layers for Combined Fixed and Mobile Operation in Licensed Bands and Corrigendum 1; IEEE, 3 Park Avenue, New York.

IEEE Computer Society and the IEEE Microwave Theory and Techniques Society; IEEE Std 802.16TM-2004 (Revision of IEEE Std 802.16/2001); Sponsored by the LAN/MAN Standards Committee; 802.16TM IEEE Standard for Local and metropolitan area networks; Part 16: "Air Interface for Fixed Broadband Wireless Access Systems"; IEEE, 3 Park Avenue New York, NY 10016-5997, USA, dated Oct. 1, 2004.

\* cited by examiner

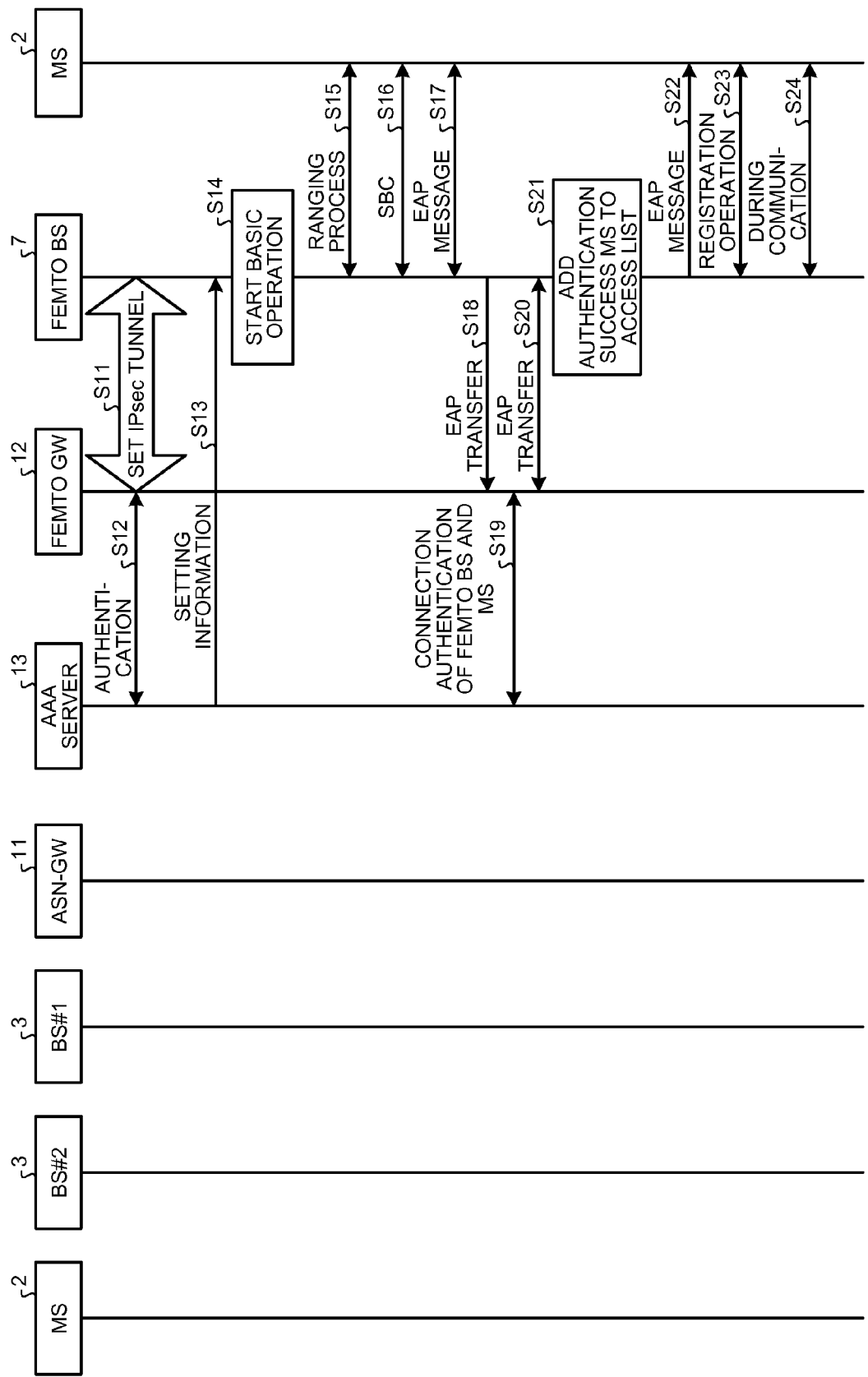

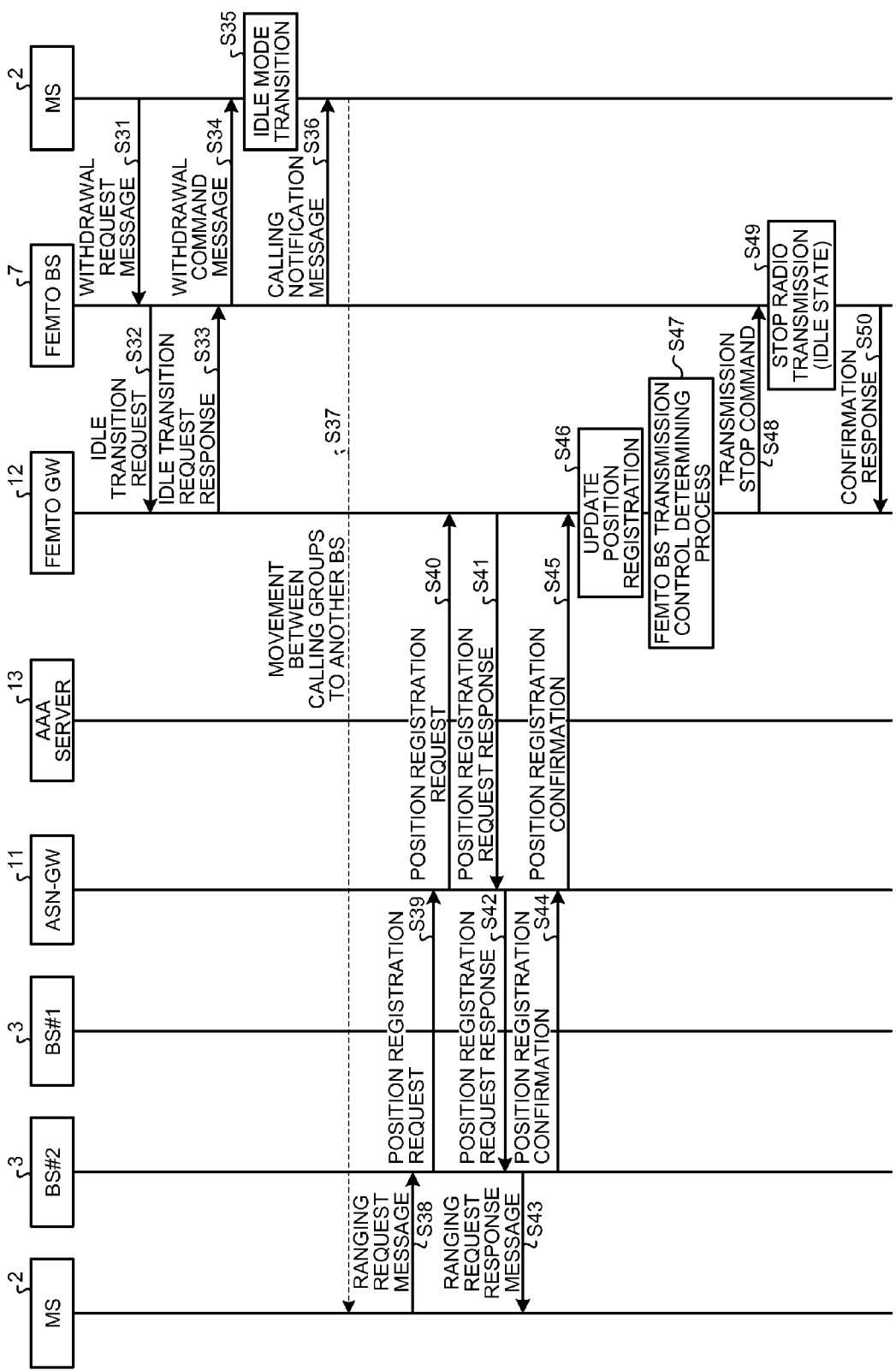

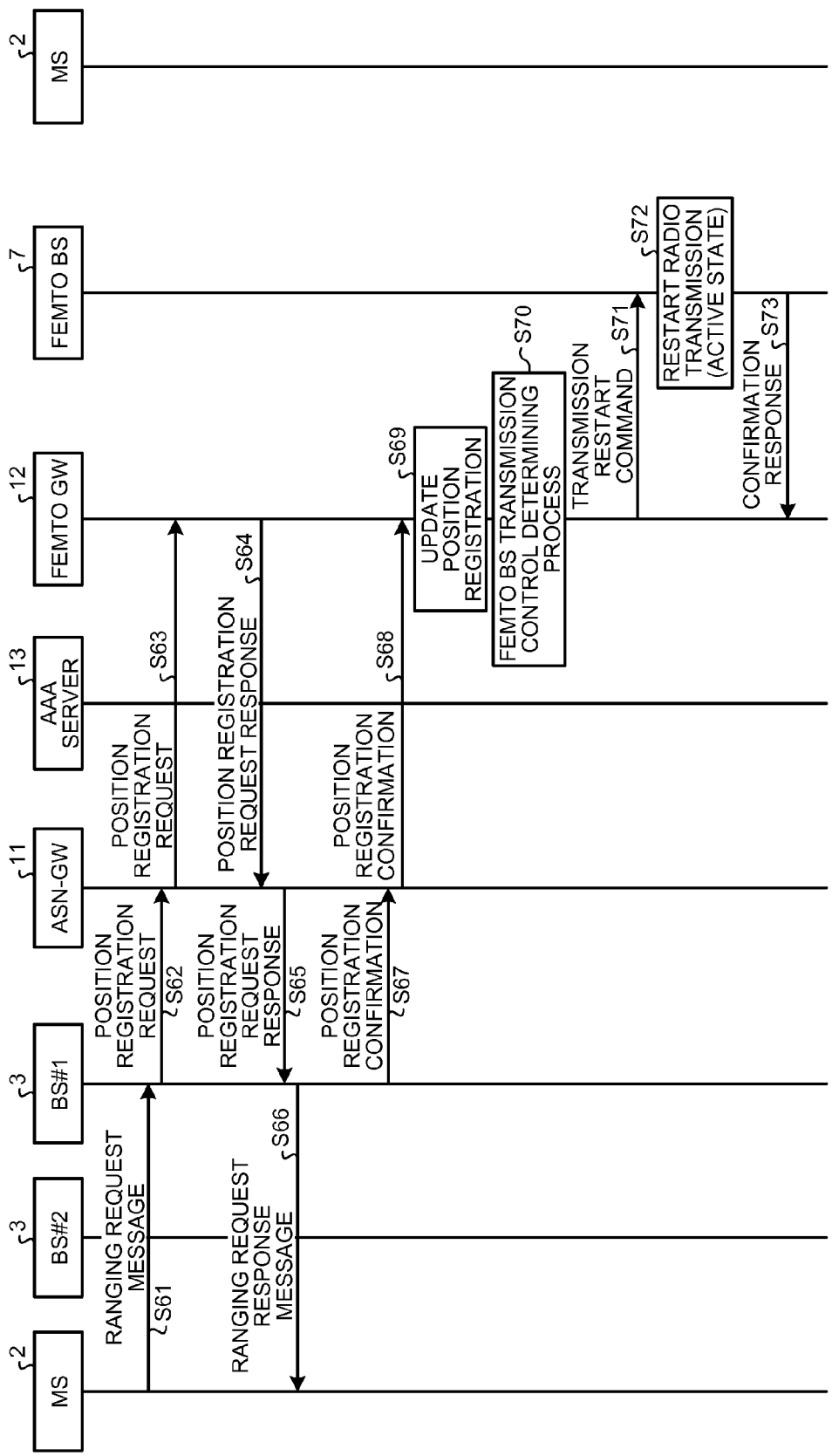

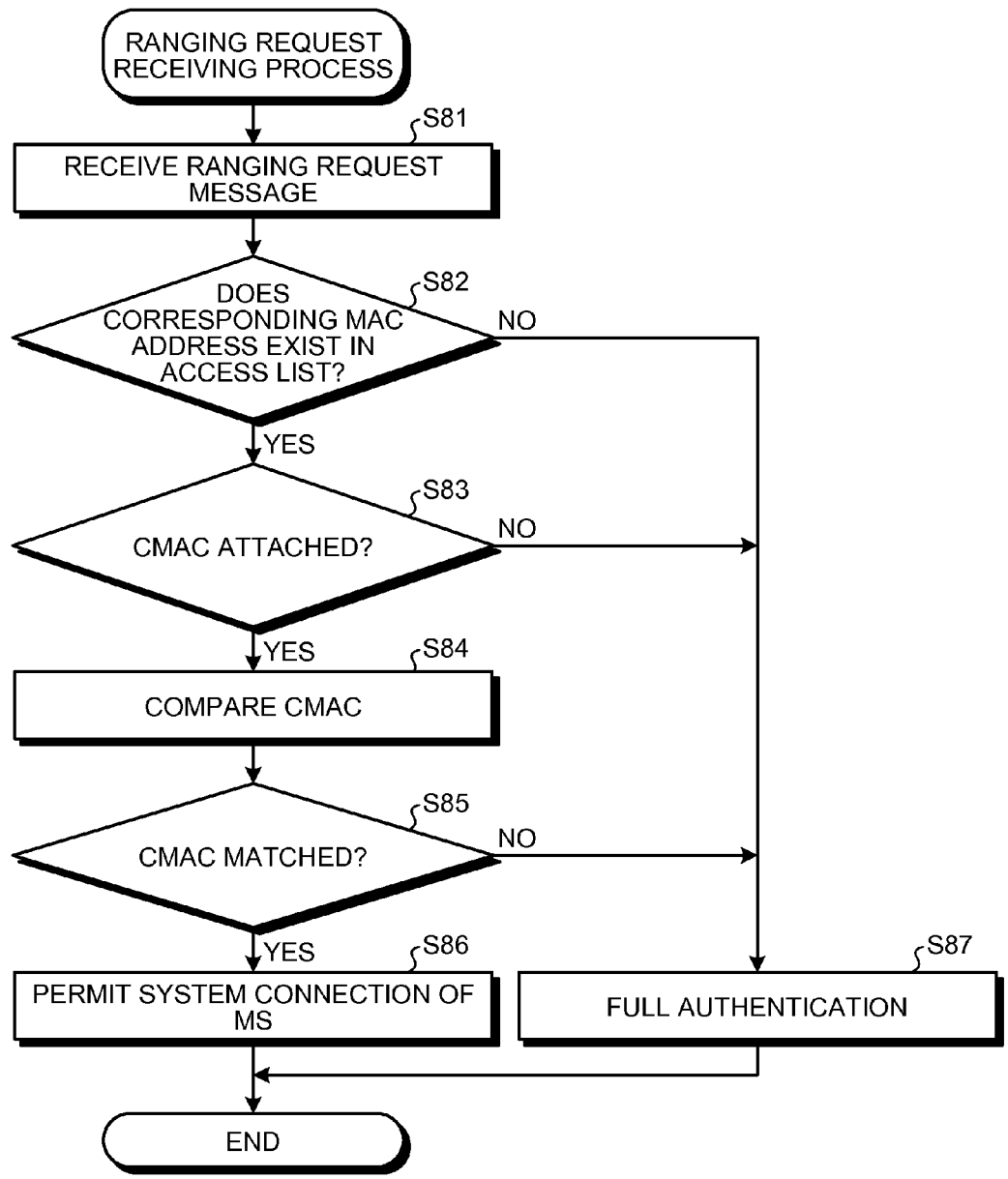

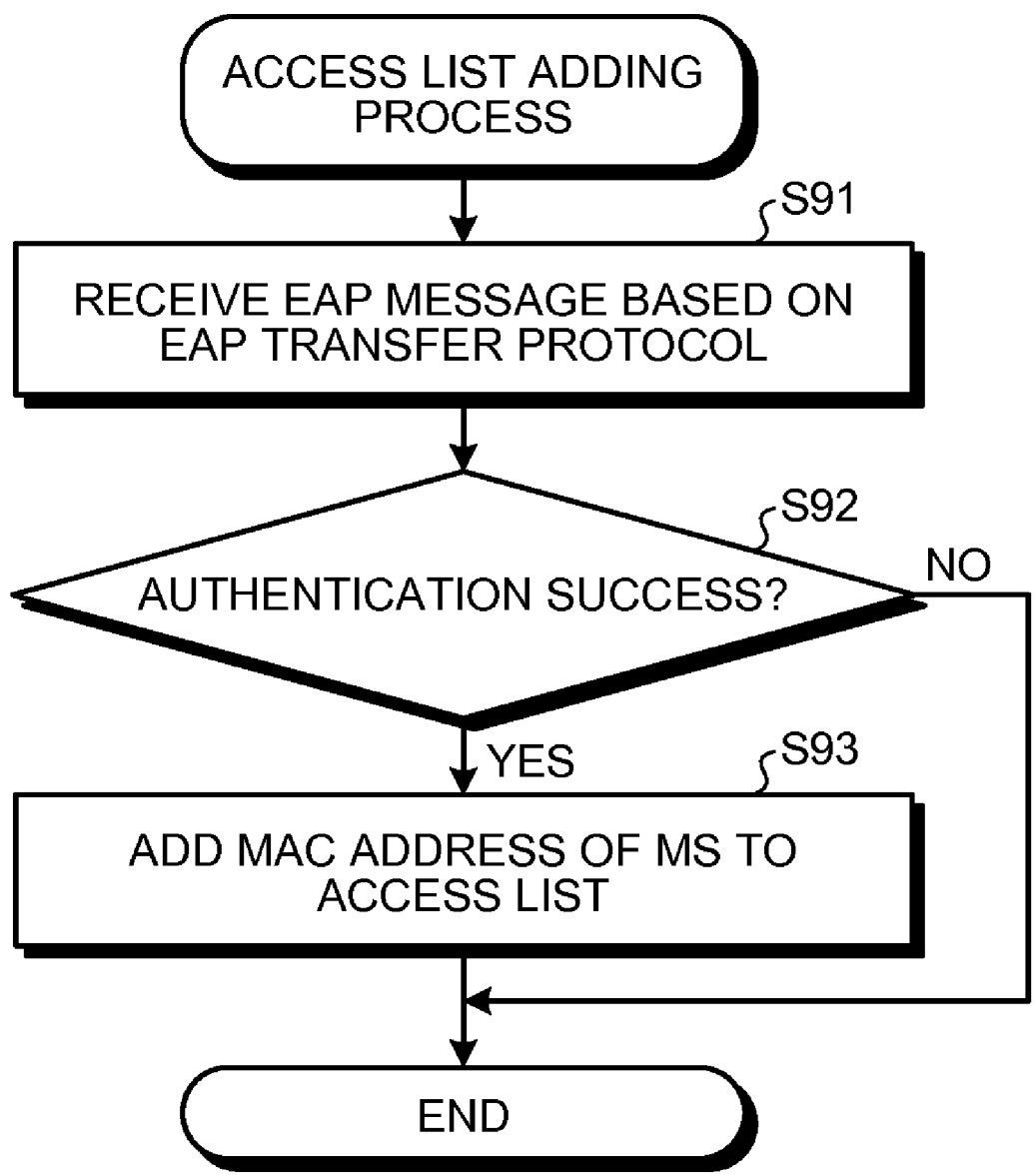

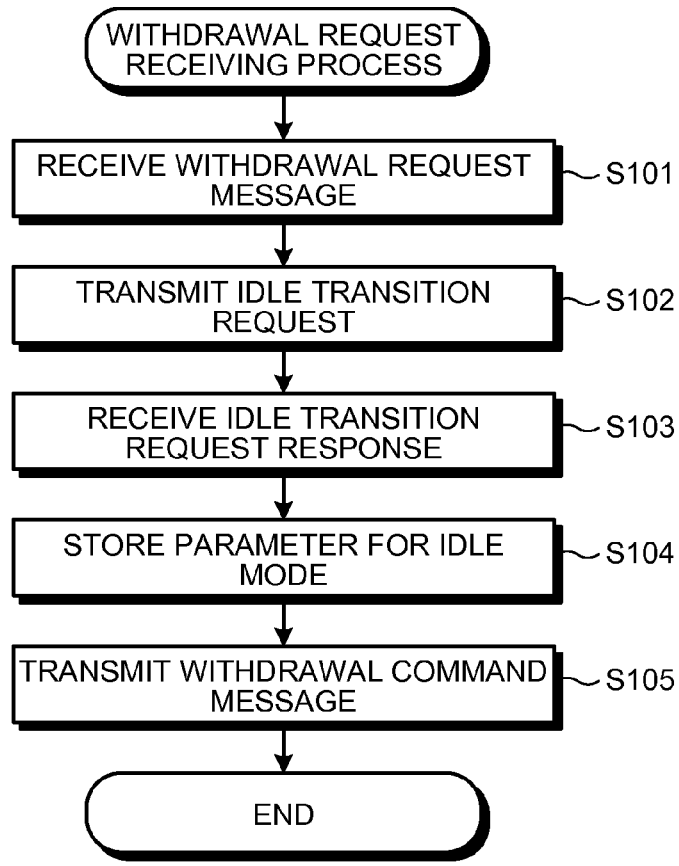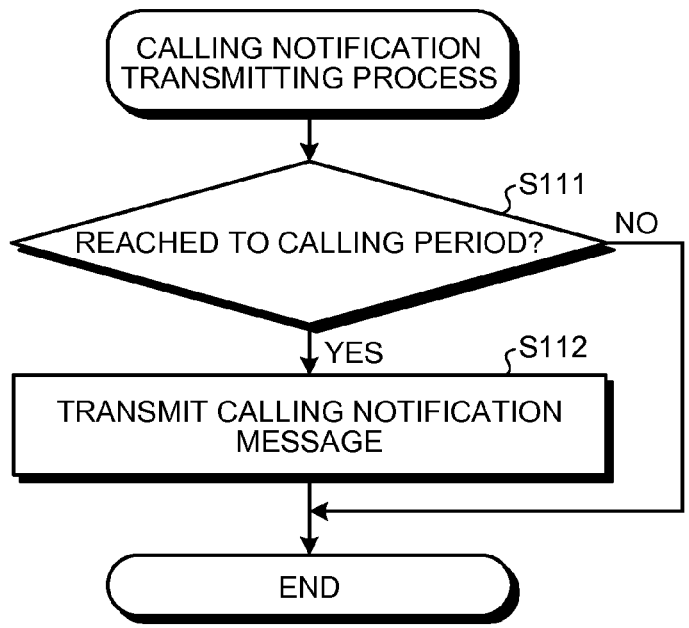

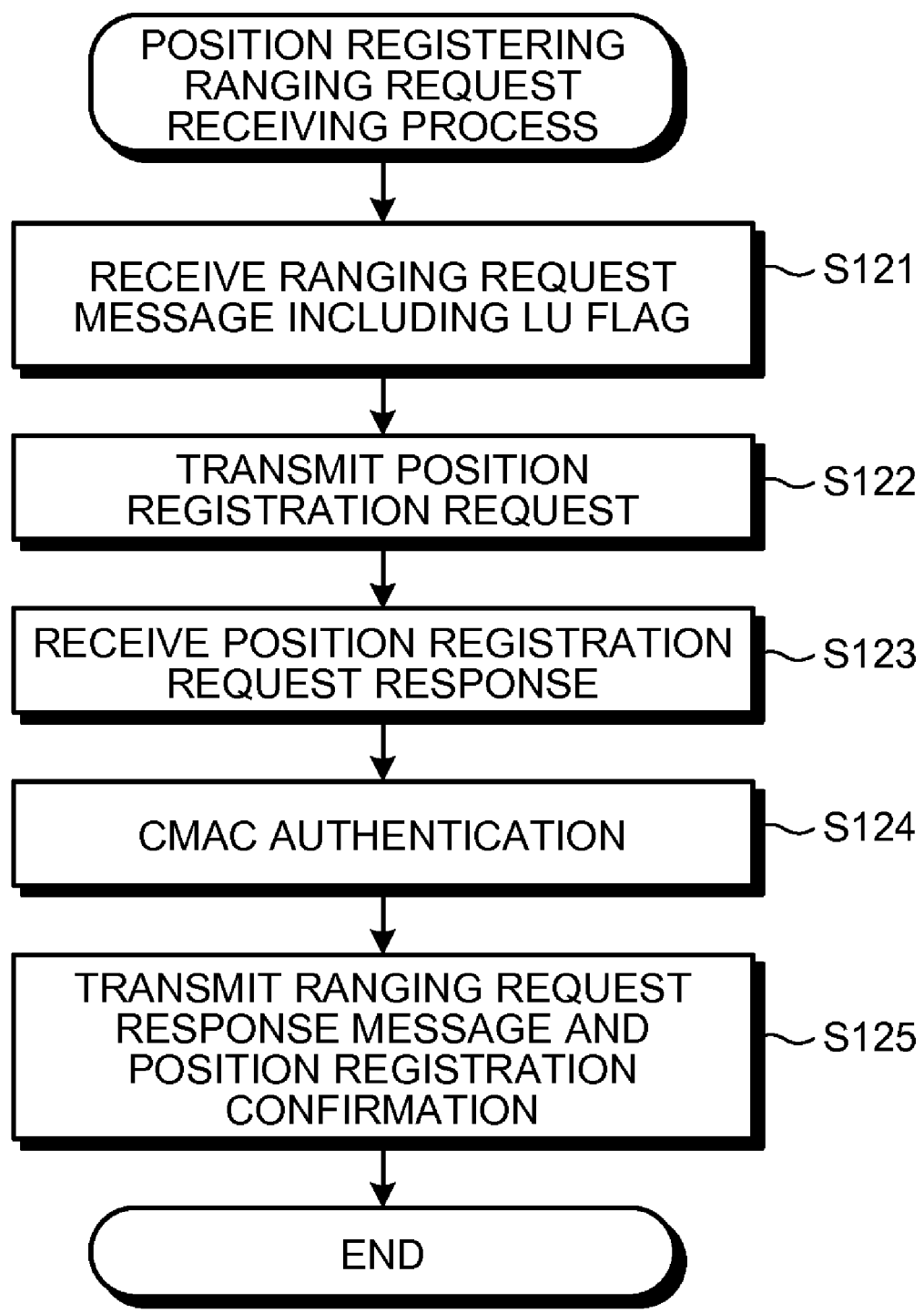

GATEWAY DEVICE, METHOD FOR CONTROLLING RADIO TRANSMISSION, AND RADIO COMMUNICATION SYSTEM

CROSS-REFERENCE TO RELATED APPLICATION

This application is a continuation of International Application No. PCT/JP2008/060911, filed on Jun. 13, 2008, the entire contents of which are incorporated herein by reference.

FIELD

The embodiments discussed herein are directed to a gateway device using a base station (hereinafter, simply referred to as BS) radio-accommodating a mobile subscriber (hereinafter, simply referred to as MS), a radio transmission control method, and a radio communication system.

BACKGROUND

In recent years, in an IEEE802.16 working group, a point-to-multipoint (hereinafter, simply referred to as P-MP) type communication method that enables connection of plural MSs to a BS is defined.

In the IEEE802.16 working group, uses of two kinds of an 802.16d specification (802.16-2004) for fixed communication and an 802.16e specification (802.16e-2005) for mobile communication are mainly defined.

In a radio communication system where the IEEE802.16d/e is adopted, a technology, such as an orthogonal frequency division multiplex (OFDM) scheme or an orthogonal frequency division multiplexing access (OFDMA) scheme, is mainly adopted.

FIG. 30 is a block diagram illustrating the schematic internal configuration of a radio communication system where the IEEE802.16d/e is adopted.

A radio communication system 100 illustrated in FIG. 30 has the Internet 101, an access service network (hereinafter, simply referred to as ASN) 104 that accommodates and connects plural BSs 103 radio-accommodating plural MSs 102, and a connectivity service network (hereinafter, simply referred to as CSN) 105 that connects the Internet 101 and the ASN 104 for communication.

The ASN 104 disposes an ASN gateway (hereinafter, simply referred to as ASN-GW) 106 that functions as a communication interface between the CSN 105 and the ASN 104 in addition to the plural BSs 103 and transmits packets with a layer 2. The CSN 105 routes and transmits the packets with a layer 3.

In recent years, with the development of the femto BS obtained by reducing the BS 103, a technology for disposing the femto BS at home or an office having a poor radio wave environment and connecting the femto BS to the ASN 104 through the Internet 101 provided by an Internet service provider (hereinafter, simply referred to as ISP) is devised.

FIG. 31 is a block diagram illustrating the schematic internal configuration of a radio communication system using the femto BS. The same components as those of the radio communication system 100 illustrated in FIG. 30 are denoted by the same reference numerals and the overlapped description of the configuration and the operation will be omitted.

A radio communication system 100A illustrated in FIG. 31 includes a femto BS 107 that is disposed at home or an office and radio-accommodates the MS 102.

The femto BS 107 is connected to an ISP 108 through an asymmetric digital subscriber line (hereinafter, simply referred to as ADSL line) or an optical fiber line, and is connected directly from the ISP 108 to the ASN 104 or is connected to the ASN 104 through the Internet 101, for communication.

The ASN 104 disposes a femto GW 109 that functions as a communication interface with the femto BS 107 through the ISP 108 or the Internet 101.

The femto GW 109 realizes encryption communication to prevent wiretapping and falsification of data with the femto BS 107, using IP security (hereinafter, simply referred to as IPsec), and secures security of the ASN 104.

Nonpatent Literature 1: IEEE Std 802.16TM-2004
Nonpatent Literature 2: IEEE Std 802.16eTM-2005

In the conventional radio communication system 100A, when the femto BS 107 is disposed in a limited place like home, the MS 102 that is radio-accommodated in the femto BS 107 is limited to the MS 102 of a specific user, such as a household member at home where the femto BS 107 is disposed or a visitor.

However, according to the conventional radio communication system 100A, regardless of a user using the MS 102 being absent from a place, that is, the MS 102 not existing in a calling area of the femto BS 107, radio communication of the femto BS 107 with respect to the MS 102 is continued. For this reason, a radio transmission output may lead to a factor of waste of useless transmission power or unnecessary radio wave interference for adjacent cells.

SUMMARY

According to an aspect of an embodiment of the invention, a gateway device includes a network connection providing unit that provides network connection to a mobile subscriber radio-accommodated in a specific base station among base stations each radio-accommodating mobile subscribers in a corresponding calling area; a receiving unit that receives a message related to movement or position registration of the mobile subscriber; a first subscriber existence determining unit that determines whether the mobile subscriber radio-accommodated in the base station in a specific calling area including a calling area of the specific base station withdraws, when the message is received in the receiving unit; and a command control unit that transmits a transmission stop command that instructs to stop radio transmission to the mobile subscriber, to the specific base station, when it is determined by the first subscriber existence determining unit that the mobile subscriber radio-accommodated in the base station in the specific calling area withdraws.

According to another aspect of an embodiment of the invention, a gateway device includes a network connection providing unit that provides network connection to a mobile subscriber radio-accommodated in a specific base station among base stations each radio-accommodating mobile subscribers in a corresponding calling area; a receiving unit that receives a message related to movement or position registration of the mobile subscriber; a second subscriber existence determining unit that determines whether the mobile subscriber radio-accommodated in the base station in a specific calling area exists, when the message is received in the receiving unit; and a command control unit that transmits a transmission restart command that instructs to restart radio transmission to the mobile subscriber, to the specific base station, when it is determined by the second subscriber existence determining unit that the mobile subscriber radio-accommodated in the base station in the specific calling area exists.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a sequence illustrating an internal processing operation of a radio communication system related to initial setting of the femto BS;

FIG. 7 is a sequence illustrating an internal processing operation of a radio communication system according to movement between calling groups from a femto BS to another BS by an MS during an idle mode;

FIG. 8 is a sequence illustrating an internal processing operation of a radio communication system according to movement between calling groups from a BS to a BS in the vicinity of a femto BS by an MS during an idle mode;

FIG. 9 is a flowchart illustrating an internal processing operation of a BS (femto BS) related to a ranging request receiving process;

FIG. 10 is a flowchart illustrating an internal processing operation of a femto BS related to an access list adding process;

FIG. 11 is a flowchart illustrating an internal processing operation of a femto BS related to a withdrawal request receiving process;

FIG. 12 is a flowchart illustrating an internal processing operation of a femto BS related to a calling notification transmitting process;

FIG. 13 is a flowchart illustrating an internal processing operation of a femto BS related to a position registering ranging request receiving process;

DESCRIPTION OF EMBODIMENTS

Preferred embodiments of the present invention will be explained with reference to accompanying drawings.

The embodiments relate to a radio communication system that has a BS that radio-accommodates a MS for each calling area and a femto GW that provides network connection to the MS radio-accommodated in the femto BS in the BS.

If the femto GW receives a message related to movement or position registration of the MS, when it is determined that an MS radio-accommodated in a BS in a specific calling area including a calling area of a femto BS withdraws, the femto GW transmits a transmission stop command, which instructs to stop radio transmission to the MS, to the femto BS.

As a result, if the femto BS receives a transmission stop command, the femto BS stops the radio transmission to the MS. Therefore, waste of useless transmission power or unnecessary interference for adjacent cells in the femto BS can be avoided.

If the femto GW receives a message related to movement or position registration of the MS, when there exists an MS that is radio-accommodated in a BS in a specific calling area, the femto GW transmits a transmission restart command, which instructs to restart radio transmission to the MS, to the femto BS.

As a result, if the femto BS receives the transmission restart command, the femto BS restarts the radio transmission to the MS. Therefore, the radio transmission in a stop state can be restarted.

[a] First Embodiment

Figure 1:
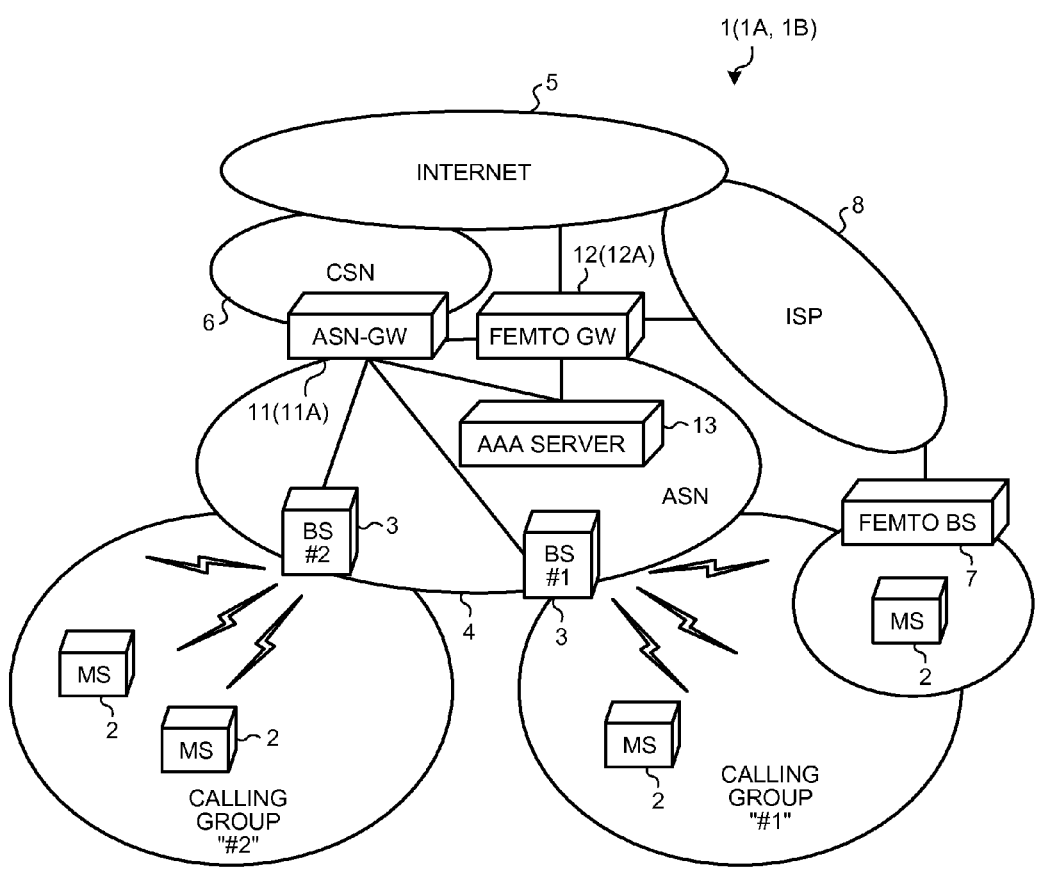
FIG. 1 is a block diagram illustrating the schematic internal configuration of a radio communication system according to an embodiment.

FIG. 1 is a block diagram illustrating the schematic internal configuration of a radio communication system according to a first embodiment.

A radio communication system 1 illustrated in FIG. 1 has an ASN 4 that accommodates and connects plural BSs 3 to radio-accommodate plural MSs 2, an Internet 5, a CSN 6 that connects the ASN 4 and the Internet 5, a femto BS 7 that is disposed at home or an office and radio-accommodates the plural MSs 2, and an ISP 8 that is connected to the femto BS 7 and is connected to the Internet 5 through an optical fiber line or an ADSL line.

The MS 2 corresponds to a personal computer including a radio function, a mobile terminal or a mobile phone terminal.

Each BS 3 includes a calling area for radio accommodation, and radio-accommodates the MS 2 that exists in the calling area. Likewise, each femto BS 7 includes a calling area for radio accommodation, and radio-accommodates the MS 2 that exists in the calling area and can be connected.

The BS 3 and the femto BS 7 in the radio communication system 1 are managed in a calling group unit of #1 or #2, for example, and the radio communication system 1 manages a calling group ID (hereinafter, simply referred to as PGID) to identify each calling group and a BSID to identify the BS 3 or the femto BS 7 belonging to the calling group.

The ASN 4 has plural BSs 3, an ASN-GW 11 that functions as a communication interface between the BS 3 and the CSN 6, a femto GW 12 that functions as a communication interface between the femto BS 7 and the ASN 4 through the ISP 8, and an authentication, authorization, and accounting (hereinafter, simply referred to as AAA) server 13.

Figure 2:
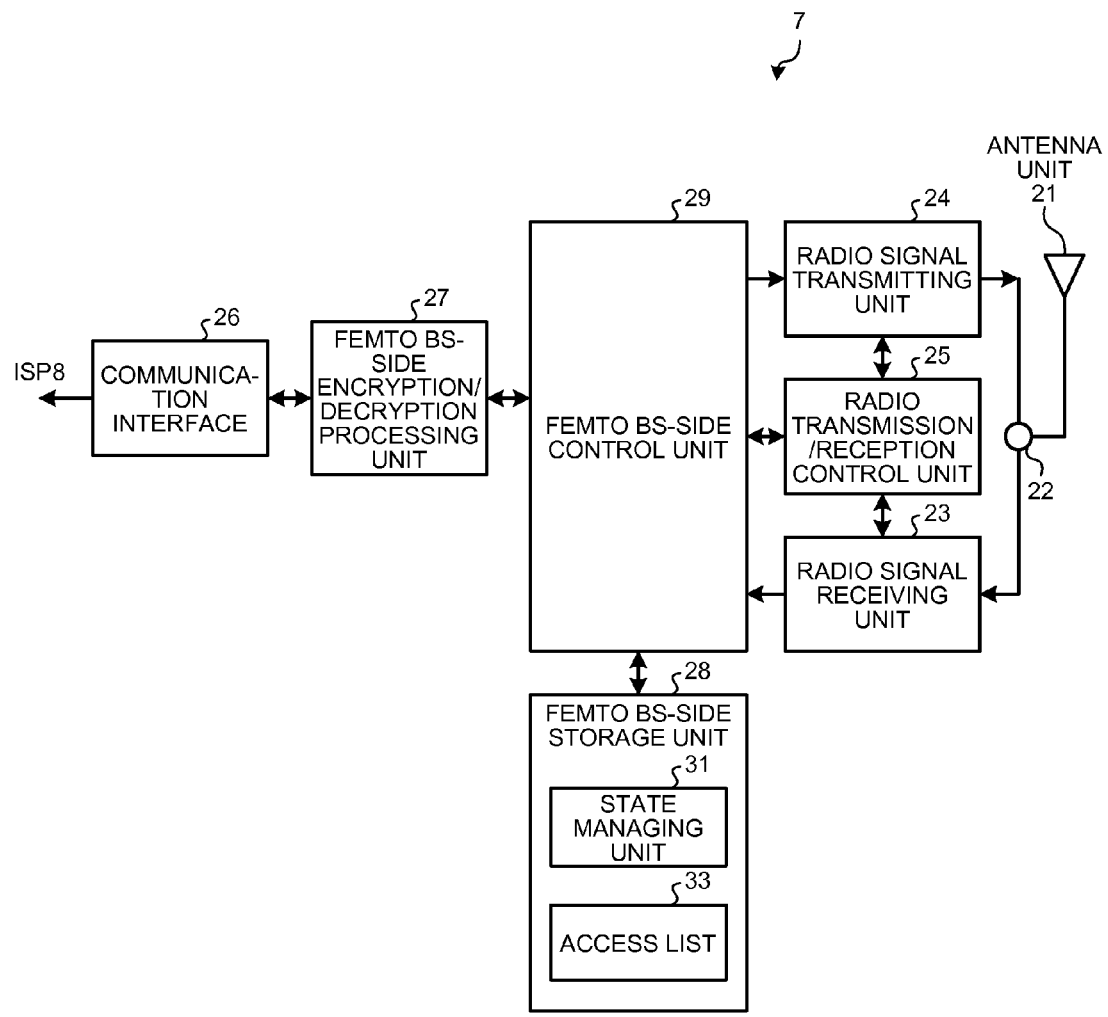
FIG. 2 is a block diagram illustrating the schematic internal configuration of a femto BS.

FIG. 2 is a block diagram illustrating the schematic internal configuration of the femto BS 7.

The femto BS 7 illustrated in FIG. 2 has an antenna unit 21 that transmits and receives a radio signal, a duplexer 22 that enables common use of the antenna unit 21 by a transmitting/receiving system, a radio signal receiving unit 23 that receives and demodulates a radio signal from a counterpart destination and decodes an error correcting code, a radio signal transmitting unit 24 that executes error correcting code processing on data transmitted to the counterpart destination, modulates the data, and transmits a radio signal through the antenna unit 21, and a radio transmission/reception control unit 25 that controls the radio signal receiving unit 23 and the radio signal transmitting unit 24.

The femto BS 7 has a communication interface 26 that functions as an interface with the ISP 8, a femto BS-side encryption/decryption processing unit 27 that encrypts or decrypts an IP packet, a femto BS-side storage unit 28 that stores a variety of information, and a femto BS-side control unit 29 that wholly controls the femto BS 7. The communication interface 26 can be directly connected to the femto GW 12 without passing through the ISP 8.

The femto BS-side storage unit 28 has a state managing unit 31 that manages a self state (active state/idle state) and an access list 33 that manages the MS 2 that can be connected to the femto BS-side storage unit. The idle state of the femto BS 7 corresponds to a stop state where radio transmission such as control information with respect to the radio-accommodated MS 2 is stopped and the active state corresponds to an operation state where the stop of radio transmission such as control information with respect to the radio-accommodated MS 2 is released.

The femto BS-side control unit 29 is relayed or terminated through a radio link protocol and a network-side protocol and enables data communication or authentication of the MS 2.

Figure 3:
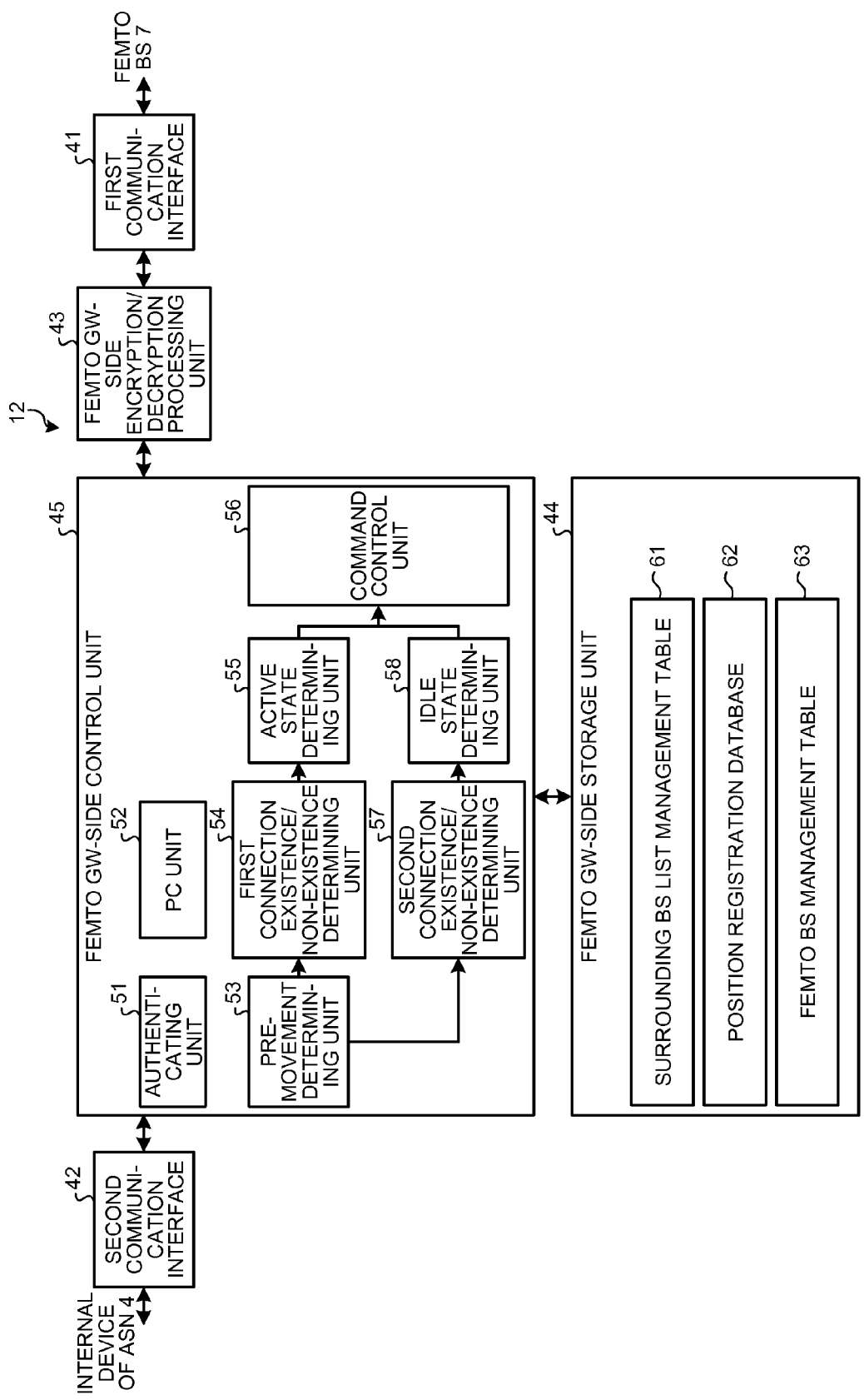
FIG. 3 is a block diagram illustrating the schematic internal configuration of a femto GW.

FIG. 3 is a block diagram illustrating the schematic internal configuration of the femto GW 12.

The femto GW 12 illustrated in FIG. 3 has a first communication interface 41 that functions as an interface with the femto BS 7, for example, through the ISP 8 or the Internet 5 and a second communication interface 42 that functions as an interface with the internal device of the ASN 4, such as the ASN-GW 11 or the BS 3.

The femto GW 12 has a femto GW-side encryption/decryption processing unit 43 that encrypts or decrypts an IP packet exchanged with the femto BS 7 through the first communication interface 41, a femto GW-side storage unit 44 that stores a variety of information, and a femto GW-side control unit 45 that wholly controls the femto GW 12.

The femto GW-side control unit 45 has an authenticating unit 51 that communicates with the AAA server 13 to execute authentication of the BS 3, the femto BS 7 or the MS 2 and sets a data transmitting path between the femto BS 7 and the femto GW-side control unit 45, and a calling controller (hereinafter, simply referred to as PC) 52 that controls calling with respect to each MS 2.

At the time of initial setting of the femto BS 7, the authenticating unit 51 is connected to the AAA server 13 for communication, according to necessity, and executes authentication of the femto BS 7. The femto BS 7 previously acquires an electronic certificate with respect to the AAA server 13, and the authenticating unit 51 uses the electronic certificate through the AAA server 13 to authenticate the femto BS 7, and obtains the authentication result.

When the MS 2 is newly connected to the femto BS 7, the authenticating unit 51 is connected to the AAA server 13 for communication, and obtains a connection authentication result that confirms whether connection of the MS 2 and the femto BS 7 is permitted on the basis of the identification information of the MS 2 and the BSID included in an EAP message from the femto BS 7, through the AAA server 13.

Since the AAA server 13 manages a list of the MSs 2 where connection with the femto BS 7 is permitted, on the basis of information at the time of new arrangement contract of the femto BS 7, the AAA server 13 confirms whether connection of the MS 2 and the femto BS 7 is permitted on the basis of the management contents and the identification information of the MS 2 and the BSID included in the EAP message from the femto BS 7.

The femto BS 7 can acquire the list of the MSs 2 where connection with the femto BS 7 is permitted as setting information from the AAA server 13, at the time of new connection of the femto BS 7.

The femto GW-side storage unit 44 has a surrounding BS list management table 61 that manages the BS 3 adjacent for each femto BS 7, for example, the BS 3 belonging to the same PGID as a surrounding BS, a position registration database 62 that manages position information of the MS 2 managed by the femto GW 12, and a femto BS management table 63 that manages state information (active state/idle state) of the femto BS 7 to be self managed.

The femto GW-side control unit 45 executes a femto BS transmission control determining process to be described below, on the basis of the contents of the surrounding BS list management table 61, the position registration database 62, and the femto BS management table 63.

The femto GW-side control unit 45 has a pre-movement determining unit 53 that determines whether a first condition where the position registration updated MS 2 exists within the coverage of the femto BS 7 or the BS 3 in the vicinity of the femto BS 7 before moving to the coverage of the movement destination BS is satisfied, on the basis of the surrounding BS list management table 61 and the position registration database 62, when a message of movement or position registration from the MS 2, for example, position registration confirmation is received.

The femto GW-side control unit 45 has a first connection existence/non-existence determining unit 54 that determines whether a second condition where all of the MSs 2 that can be connected to the femto BS 7 withdraw from the femto BS 7 and the BS 3 belonging to the same PGID as the femto BS 7 is satisfied, when it is determined by the pre-movement determining unit 53 that the first condition is satisfied.

The femto GW-side control unit 45 has an active state determining unit 55 that determines whether a third condition where a state of the femto BS 7 is an active state is satisfied, when it is determined by the first connection existence/non-existence determining unit 54 that the second condition is satisfied.

The femto GW-side control unit 45 has a command control unit 56 that determines that the first, second, and third conditions are satisfied, when it is determined by the active state determining unit 55 that the third condition is satisfied, and transmits a transmission stop command (Dormant Command) to the femto BS 7 to stop the radio transmission of the femto BS 7 to the MS 2.

The femto GW-side control unit 45 also has a second connection existence/non-existence determining unit 57 that determines that a fourth condition where the position registration updated MS 2 does not exist within the coverage of the femto BS 7 or the BS 3 in the vicinity of the femto BS 7 before moving to the coverage of the movement destination BS 3 is satisfied, when it is determined by the pre-movement determining unit 53 that the first condition is not satisfied, and determines whether a fifth condition where the MS 2 that can be connected to the femto BS 7 exists in the femto BS 7 or the BS 3 belonging to the same PGID as the femto BS 7 is satisfied.

The femto GW-side control unit 45 has an idle state determining unit 58 that determines whether a sixth condition where a state of the femto BS 7 is an idle state is satisfied, when it is determined by the second connection existence/non-existence determining unit 57 that the fifth condition is satisfied.

The command control unit 56 determines that the fourth, fifth, and sixth conditions are satisfied, when it is determined by the idle state determining unit 58 that the sixth condition is satisfied, and transmits a transmission restart command (Wake-up Command) to the femto BS 7 to restart the stopped radio transmission of the femto BS 7 to the MS 2.

Figure 4:
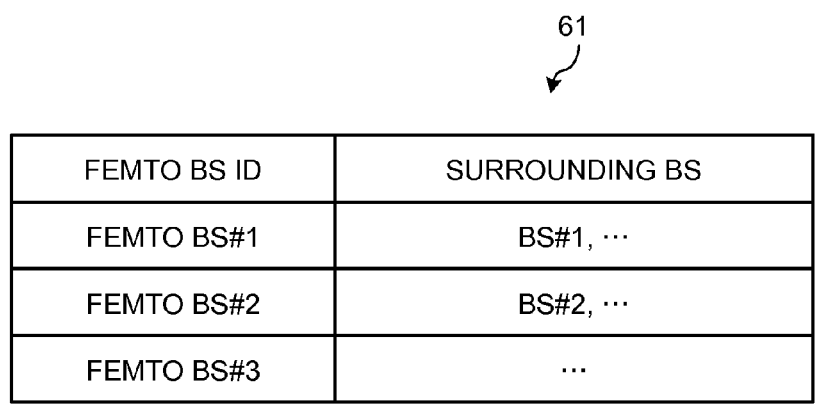
FIG. 4 is a diagram illustrating contents of a surrounding BS list management table in the femto GW.

FIG. 4 is a diagram illustrating contents of the surrounding BS list management table 61 in the femto GW 12.

The femto GW 12 manages the BS 3 adjacent for each femto BS 7, for example, the BS 3 belonging to the same PGID as the surrounding BS in the surrounding BS list management table 61. The setting information of the surrounding BS list management table 61 is obtained by generating a list of the BSs 3 adjacent to an arrangement place applied at the time of new arrangement contract of the femto BS 7 from cell design information.

The setting information of the surrounding BS list management table 61 can be dynamically set according to movement of the MS 2. That is, when handover of the MS 2 is performed from the femto BS 7 to the movement destination BS 3 or when the MS 2 moves from the femto BS 7 to the movement destination BS 3 and the position thereof is registered, the movement destination BS 3 may be added as the surrounding BS of the femto BS 7 to the surrounding BS list management table 61.

The femto BS 7 may receive the radio signal of the peripheral BS 3, and add the peripheral BS 3 of the femto BS 7 as the surrounding BS to the surrounding BS list management table 61, on the basis of the radio signal.

Figure 5:
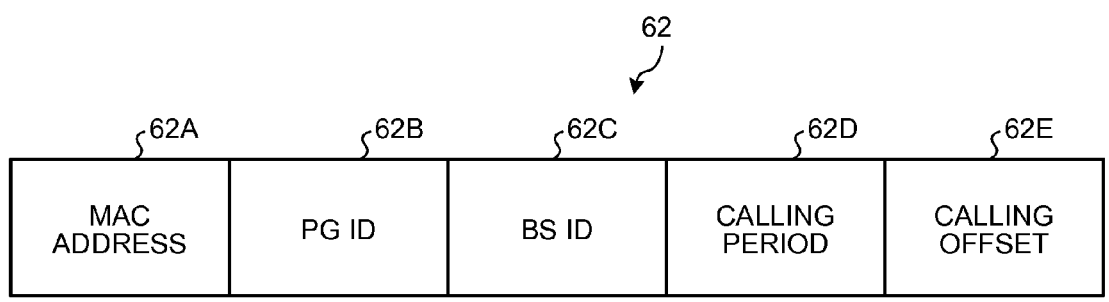
FIG. 5 is a diagram simply illustrating the data configuration of information that is managed by an internal position registration database of the femto GW.

FIG. 5 is a diagram simply illustrating the data configuration of information that is managed by an internal position registration database 62 of the femto GW 12.

The position registration database 62 manages position information of the MS 2 that is managed by the femto GW 12.

The position information has a MAC address 62A to identify the MS 2, a PGID 62B to identify a calling group which the MS 2 belongs to, a BSID 62C to identify the BS 3 or the femto BS 7 radio-accommodating the MS 2, a calling period 62D to transmit a calling notification message indicating whether a signal is transmitted to the MS 2 during the idle mode, and a calling offset 62E to manage an offset of timing of the calling period 62D.

Next, the operation of the radio communication system 1 according to the first embodiment will be described. FIG. 6 is a sequence illustrating an internal processing operation of the radio communication system 1 related to initial setting of the femto BS.

The initial setting of the femto BS corresponds to a setting operation until communication with the MS 2 that can be connected to the femto BS 7 starts through the femto BS 7, from new arrangement of the femto BS 7 in the radio communication system 1.

For example, in the initial setting, assume that the femto BS 7 is newly disposed in a home and is connected to the ISP 8 through an ADSL line or an optical fiber line.

If connection with the ISP 8 is fixed, the femto BS 7 illustrated in FIG. 6 sets an IPsec tunnel to secure communication confidentiality with the femto GW 12 (step S11).

The femto GW 12 is connected to the AAA server 13 for communication, according to necessity, and executes authentication of the femto BS 7 (step S12). Since the femto BS 7 previously acquires the electronic certificate with respect to the AAA server 13, the AAA server 13 authenticates the femto BS 7 using the electronic certificate.

If the authentication of the femto BS 7 is succeeded, the AAA server 13 transmits setting information (Configuration Information) of the femto BS 7 to the femto BS 7 (step S13). If the authentication is succeeded, the femto BS 7 can acquire setting information of the femto BS 7 from servers other than the AAA server 13.

If the setting information is received, the femto BS 7 starts a basic operation as a base station (step S14).

The basic operation as the base station is to radio-transmit control information, such as a preamble, a downlink (hereinafter, simply referred to as DL)/uplink (hereinafter, simply referred to as UL) MAP information (hereinafter, simply referred to as DL/UL-MAP), a down-channel descriptor (hereinafter, simply referred to as DCD)/up-channel descriptor (hereinafter, simply referred to as UCD), to the radio-accommodated MS 2.

Next, when the MS 2 starts to be newly connected to the newly disposed femto BS 7, the femto BS 7 executes an authentication operation of the MS 2 to determine whether connection of the MS 2 is permitted.

That is, the MS 2 and the femto BS 7 adjust transmission parameters (frequency, timing, and transmission power) through a ranging process (step S15), and negotiate SBC (SS Basic Capability) (step S16).

The MS 2 uses a privacy key management (hereinafter, simply referred to as PKM) protocol, and transmits an extensible authentication protocol (hereinafter, simply referred to as EAP) message to authenticate the MS 2 to the femto BS 7 (step S17). The PKM is used to transmit the EAP message between the femto BS 7 and the MS 2. The EAP message includes identification information of the MS 2 to authenticate the MS 2.

If the EAP message to authenticate the MS 2 is received, the femto BS 7 uses an EAP-transfer protocol to transmit the EAP message including its own BSID as well as the identification information of the MS 2 to the femto GW 12 (step S18).

The authenticating unit 51 in the femto GW 12 uses a RADIUS protocol to transmit the EAP message received from the femto BS 7 to the AAA server 13.

The AAA server 13 executes connection authentication to confirm whether connection of the MS 2 and the femto BS 7 is permitted, on the basis of management contents related to the connection permission of the femto BS 7 and the MS 2 and the identification information of the MS 2 and the BSID of the femto BS 7 included in the EAP message, and transmits the connection authentication result to the femto GW 12 (step S19).

When connection of the MS 2 and the femto BS 7 is permitted through the AAA server 13, the femto GW 12 uses the EAP-transfer protocol to transmit the EAP message of the authentication success to the femto BS 7 (step S20).

If the EAP message (EAP transfer) of the authentication success is received in step S20, the femto BS 7 adds a MAC (Media Access Control) address to identify the MS 2 of the authentication success to the access list 33 (step S21).

If the MS 2 of the authentication success is added to the access list 33, the femto BS 7 transmits the EAP message of the authentication success of the MS 2 to the MS 2 (step S22).

If the EAP message of the authentication success of the MS 2 is transmitted to the MS 2, the femto BS 7 executes a registration (REG) operation (step S23) and starts communication with the MS 2 (step S24).

When the EAP message of the authentication failure of the MS 2 is received through the AAA server 13, the femto GW 12 transmits the authentication failure to the MS 2 through the femto BS 7 and urges the MS 2 to perform reconnection with another femto BS 7 or another BS 3.

When the MAC address of the MS 2 does not exist in the access list 33, the femto BS 7 transmits the authentication failure to the MS 2 and urges the MS 2 to perform reconnection with another femto BS 7 or another BS 3.

In the sequence illustrated in FIG. 6, the case where the MS 2 is newly connected to the newly disposed femto BS 7 is exemplified. However, even when the MS 2 is connected to the movement destination femto BS 7 according to handover or when the MS 2 during the idle mode returns to the active mode and is connected to the femto BS 7, if the MAC address of the MS 2 does not exist in the access list 33 in the femto BS 7, the connection authentication between the MS 2 and the femto BS 7 in steps S17 to S20 is executed. When the authentication is succeeded, the MAC address of the MS 2 is added to the access list 33 in the femto BS 7.

Next, the operation of when the MS 2 moves the femto BS 7 to another BS 3 after the MS 2 transits from the active mode to the idle mode and withdraws from the femto BS 7 will be described. FIG. 7 is a sequence illustrating an internal processing operation of the radio communication system 1 according to movement between calling groups from the femto BS 7 to another BS 3 by the MS 2 during the idle mode.

The MS 2 illustrated in FIG. 7 transmits a withdrawal request (DREG-REQ) message to the femto BS 7, when the MS 2 transits from the active mode to the idle mode (step S31).

If the withdrawal request message is received, the femto BS 7 transmits an idle transition request (IM Entry State Change-Request) to the femto GW 12 as a preparation step of when the MS 2 transits to the idle mode (step S32). The idle transition request includes information (various registration information, security information, and service flow information) of the MS 2, a PGID of the MS 2, and a BSID to specify a transmission source BS, that is, the femto BS 7.

Since the femto GW 12 manages the PGID, the PCID to identify the PC unit 52 of the femto GW 12, and the calling period as information needed for the MS 2, if the idle transition request is received, the femto GW 12 transmits an idle transition request response (IM Entry State Change-Response) including the PGID, the PCID, and the calling period to the femto BS 7 (step S33).

If the idle transition request response is received, the femto BS 7 transmits the withdrawal command (DERG-CMD) message including the calling period to the MS 2 (step S34). If the withdrawal command message is received, the MS 2 transits to the idle mode (step S35).

When the MS 2 during the idle mode exists within the coverage of the femto BS 7, the femto BS 7 transmits a calling notification (Paging Advertisement: PAG-ADV) message indicating whether a signal is transmitted to the MS 2, on the basis of the calling period included in the idle transition request response (step S36).

When the MS 2 during the idle mode moves to the BS 3 away from the coverage of the femto BS 7, for example, the BS 3 of #2 (step S37), the MS 2 exists in a calling area of the BS 3 of #2. For this reason, the MS 2 receives the calling notification message from the BS 3 of #2.

However, since the PGID included in the calling notification message received by the BS 3 of #2 and the PGID included in the calling notification message received by the femto BS 7 are different from each other, the MS 2 recognizes that the MS 2 moves from the femto BS 7 to the calling area of the BS 3 of #2 and starts the position registration update operation thereof.

If the position registration update operation starts, the MS 2 transmits a ranging request (RNG-REQ) message including a PCID and a position registration update flag (hereinafter, simply referred to as LU flag) to the BS 3 of #2 (step S38). The LU flag indicates that the ranging request message is a message requesting to register the position.

If the ranging request message is received from the MS 2, the BS 3 of #2 transmits a position registration request (LU Req) including a PGID and a BSID to identify the BS 3 of #2 to the PC unit 52 in the femto GW 12 through the ASN-GW 11 (step S39), on the basis of the PCID from the MS 2, that is, the PCID of the PC unit 52 of the femto GW 12 (step S40).

If the position registration request is received through the ASN-GW 11, the PC unit 52 in the femto GW 12 transmits a position registration request response (LU Rsp) to the BS 3 of #2 (step S42), through the ASN-GW 11 (step S41).

The position registration request response includes key information that is needed to calculate a cipher-based message authentication code (hereinafter, simply referred to as CMAC) to check the validity of the ranging request message received from the MS 2 in step S38 at the side of the BS 3 of #2.

If the position registration request response is received, the BS 3 of #2 calculates the CMAC of the ranging request message, on the basis of the key information of the CMAC included in the position registration request response, compares the CMAC of the calculation result and the CMAC attached to the ranging request message, and confirms the validity of the ranging request message.

If the validity of the ranging request message from the MS 2 is confirmed on the basis of the comparison result of the CMAC, the BS 3 of #2 transmits the ranging request response (RNG-RSP) message including the confirmation of the validity to the MS 2 (step S43).

The BS 3 of #2 further transmits the position registration confirmation (LU Confirm) with respect to the position registration request response of step S42 to the PC unit 52 in the femto GW 12 (step S45), through the ASN-GW 11 (step S44).

If the position registration confirmation is received from the BS 3 of #2 through the ASN-GW 11, the PC unit 52 in the femto GW 12 updates and registers the position information of the MS 2 in the position registration database 62, on the basis of the PGID or the BSID of the BS 3 of #2 included in the position registration request received in step S40 (step S46).

If the position registration database 62 is updated, the femto GW 12 executes a femto BS transmission control determining process (step S47).

During the femto BS transmission control determining process, on the basis of the contents of the position registration database 62, the pre-movement determining unit 53 determines whether a first condition where the position registration updated MS 2 exists within the coverage of the femto BS 7 or the BS 3 in the vicinity of the femto BS 7 before moving to the coverage of the BS 3 of #2 is satisfied, the first connection existence/non-existence determining unit 54 determines whether a second condition where all of the MSs 2 that can be connected to the femto BS 7 withdraw from the femto BS 7 and the BS 3 belonging to the same PGID as the femto BS 7 is satisfied, and the active state determining unit 55 determines whether a third condition where a state of the femto BS 7 is an active state is satisfied.

When the first, second, and third conditions are satisfied through the femto BS transmission control determining process, the command control unit 56 in the femto GW 12 transmits the transmission stop command to the femto BS 7 to instruct the idle state, that is, the radio transmission stop of the control information with respect to the femto BS 7 (step S48).

If the transmission stop command is received from the femto GW 12, the femto BS 7 transits to the idle state where the radio transmission of the control information is stopped (step S49). As a result, the femto BS 7 can avoid waste of useless transmission power or unnecessary radio wave interference for adjacent cells.

Further, if the femto BS 7 transits to the idle state where the radio transmission is stopped, the femto BS 7 transmits a confirmation response (Ack) indicating the transition of the femto BS 7 to the idle state to the femto GW 12 (step S50).

If the confirmation response of the idle state is received from the femto BS 7, the femto GW 12 updates state information of the femto BS 7 as an idle state in the femto BS management table 63.

Next, the operation of when the MS 2 during the idle mode moves from another BS 3 to the BS 3 in the vicinity of the femto BS 7, for example, the BS 3 of #1 will be described. FIG. 8 is a sequence illustrating an internal processing operation of the radio communication system 1 according to movement between calling groups from another BS 3 to the BS 3 in the vicinity of the femto BS 7 by the MS 2 during an idle mode.

When the MS 2 during the idle mode moves from the BS 3 of #2 to the BS 3 of #1, the PGID included in the calling notification message received from the BS 3 of #1 and the PGID included in the calling notification message received from the BS 3 of #2 are different from each other. For this reason, the MS 2 recognizes that the MS 2 moves from the femto BS 7 to the calling area of the BS 3 of #1 and starts the position registration update operation thereof.

If the position registration update operation starts, the MS 2 during the idle mode transmits a ranging request message including a PCID and a LU flag to the BS 3 of #1 (step S61).

If the ranging request message is received from the MS 2, the BS 3 of #1 transmits a position registration request including the PGID and the BSID to identify the BS 3 of #1 to the PC unit 52 in the femto GW 12, on the basis of the PCID included in the ranging request message (step S63), through the ASN-GW 11 (step S62).

If the position registration request is received through the ASN-GW 11, the PC unit 52 in the femto GW 12 transmits a position registration request response including key information of the CMAC to authenticate the validity of the ranging request message to the BS 3 of #1 (step S65), through the ASN-GW 11 (step S64).

If the position registration request response is received, the BS 3 of #1 calculates the CMAC of the ranging request message, on the basis of the key information of the CMAC included in the position registration request response, compares the CMAC of the calculation result and the CMAC attached to the ranging request message, and confirms the validity of the ranging request message.

If the validity of the ranging request message from the MS 2 is confirmed on the basis of the comparison result of the CMAC, the BS 3 of #1 transmits the ranging request response message including the confirmation of the validity to the MS 2 (step S66). The BS 3 of #1 also transmits the position registration confirmation with respect to the position registration request to the PC unit 52 in the femto GW 12 (step S68), through the ASN-GW 11 (step S67).

If the position registration confirmation is received from the BS 3 of #1 through the ASN-GW 11, the PC unit 52 in the femto GW 12 updates and registers the position information of the MS 2 in the position registration database 62, on the basis of the PGID or the BSID of the BS 3 of #1 included in the position registration request received in step S63 (step S69).

If the position registration database 62 is updated, the femto GW 12 then executes a femto BS transmission control determining process (step S70).

During the femto BS transmission control determining process, on the basis of the contents of the position registration database 62, the pre-movement determining unit 53 determines whether a first condition where the position registration updated MS 2 exists within the coverage of the femto BS 7 or the BS 3 in the vicinity of the femto BS 7 before moving to the BS 3 of #1 is not satisfied, that is the fourth condition is satisfied, the second connection existence/non-existence determining unit 57 determines whether a fifth condition where the current MS 2 is within the coverage of the femto BS 7 or the BS 3 belonging to the same PGID as the femto BS 7 is satisfied, and the idle state determining unit 58 determines whether a sixth condition where a state of the femto BS 7 is an idle state is satisfied.

When the fourth, fifth, and sixth conditions are satisfied through the femto BS transmission control determining process, the command control unit 56 in the femto GW 12 transmits the transmission restart command to the femto BS 7 to instruct the active state, that is, the radio transmission restart of the control information with respect to the femto BS 7 (step S71).

If the transmission restart command is received from the femto GW 12, the femto BS 7 transits to the idle state where the radio transmission of the control information restarts (step S72). As a result, the femto BS 7 can restart the basis operation as the base station with respect to the MS 2.

If the femto BS 7 transits to the active state where the radio transmission restarts, the femto BS 7 transmits a confirmation response indicating the active state to the femto GW 12 (step S73).

If the confirmation response of the active state is received from the femto BS 7, the femto GW 12 updates state information of the femto BS 7 as the active state in the femto BS management table 63.

Next, the operation of the BS 3 (femto BS 7) that receives the ranging request message (refer to step S38 of FIG. 7 and step S61 of FIG. 8) from the MS 2 will be described. FIG. 9 is a flowchart illustrating an internal processing operation of the BS 3 (femto BS 7) related to a ranging request receiving process.

In FIG. 9, if the ranging request message is received from the MS 2 (step S81), the BS 3 (femto BS 7) determines whether the MAC address of the MS 2 of the ranging request message exists in the access list 33 (step S82).

When it is determined that the MAC address of the MS 2 exists in the access list 33 (step S82: YES), the BS 3 (femto BS 7) determines whether the CMAC is attached to the ranging request message (step S83).

The ranging request message to which the CMAC is attached is a ranging request message from the MS 2 moved from the adjacent BS 3 by the handover or the MS 2 whose state returns from the idle mode to the active mode. The ranging request message to which the CMAC is not attached is a message that is transmitted from the MS 2 by such as a start process of an initial step after power is supplied.

When it is determined that the CMAC is attached to the ranging request message (step S83: YES), the BS 3 (femto BS 7) acquires the key information to confirm the validity of the CMAC from the femto GW 12, calculates the CMAC on the basis of the acquired key information, and compares the CMAC of the calculation result and the CMAC attached to the ranging request message (step S84).

The BS 3 (femto BS 7) determines whether the CMAC of the calculation result and the CMAC attached to the ranging request message are matched with each other, on the basis of the comparison result (step S85).

When it is determined that the CMAC of the calculation result and the CMAC attached to the ranging request message are matched with each other (step S85: YES), the BS 3 (femto BS 7) determines that the ranging request message has the validity, permits connection with the MS 2 that the ranging request message transmits (step S86), and ends the processing operation illustrated in FIG. 9.

When it is determined that the MAC address of the MS 2 does not exist in the access list 33 (step S82: NO), when it is determined that the CMAC is not attached to the ranging request message (step S83: NO) or when it is determined that the CMAC of the calculation result and the CMAC attached to the ranging request message are not matched with each other (step S85: NO), the BS 3 (femto BS 7) determines that the ranging request message received in step S81 does not have the validity, executes full authentication on the femto GW 12 and the AAA server 13 to start authentication of the MS 2 of the ranging request message (step S87), and ends the processing operation illustrated in FIG. 9.

In this case, the full authentication corresponds to EAP authentication in which the MS 2 uses the PKM protocol to transmit the EAP message including the electronic certificate to the AAA server 13 through the femto BS 7 and the femto GW 12, and the AAA server 13 authenticates the MS 2.

The femto BS and the femto GW 12 exchange the EAP message with each other, using an EAP transfer protocol, and the femto BS 7 and the AAA server 13 exchange the EAP message with each other, using the authentication protocol, such as the RADIUS.

When the full authentication of the MS 2 is executed, the BS 3 (femto BS 7) uses the EAP transfer protocol to acquire the authentication result of the MS 2 of the AAA server 13 side from the femto GW 12.

During the ranging request receiving process illustrated in FIG. 9, when the ranging request message is received from the MS 2, the MAC address of the MS 2 related to the ranging request message exists in the access list 33, the CMAC is attached to the ranging request message, and the CMAC of the calculation result and the CMAC attached to the ranging request message are matched with each other, the BS 3 (femto BS 7) permits connection with the MS 2 that sends the ranging request message. Therefore, unjust connection of the MS 2 with respect to the BS 3 (femto BS 7) can be prevented.

During the ranging request receiving process, when the MAC address of the MS 2 related to the ranging request message does not exist in the access list 33, the CMAC is not attached to the ranging request message or the CMAC of the calculation result and the CMAC attached to the ranging request message are not matched with each other, the BS 3 (femto BS 7) executes the full authentication on the MS 2 that sends the ranging request message. Therefore, unjust connection of the MS 2 with respect to the BS 3 (femto BS 7) can be prevented.

Next, the operation of the femto BS 7 in the case where the full authentication of the MS 2 is executed and the EAP message of the authentication success of the MS 2 of the AAA server 13 side is received from the femto GW 12 using the EAP transfer protocol will be described. FIG. 10 is a flowchart illustrating an internal processing operation of the femto BS 7 related to an access list adding process.

If the EAP message is received from the AAA server 13 through the femto GW 12 using the EAP transfer protocol (step S91), the femto BS 7 illustrated in FIG. 10 determines whether the authentication of the MS 2 is succeeded, on the basis of the EAP message (step S92).

When the authentication of the MS 2 is succeeded (step S92: YES), the femto BS 7 adds the MAC address of the MS 2 to the access list 33 (step S93) and ends the processing operation illustrated in FIG. 10.

When the authentication of the MS 2 is failed (step S92: NO), the femto BS 7 ends the processing operation illustrated in FIG. 10.

If the MAC address of the MS 2 is added to the access list 33, the femto BS 7 transmits the EAP message of the authentication success or the authentication failure, which is received using the EAP transfer protocol, to the MS 2.

The MAC address of the MS 2 that is added to the access list 33 may be automatically erased after a constant time passes or erased according to a command.

During the access adding process illustrated in FIG. 10, when the EAP message based on the EAP transfer protocol is received through the femto GW 12 and the authentication of the MS 2 is succeeded, the MAC address of the MS 2 is added to the access list 33 in the femto BS 7. Therefore, the femto BS 7 can recognize the connectable MS 2 on the basis of the contents of the access list 33.

Next, the operation of the femto BS 7 that receives the withdrawal request message of the MS 2 will be described. FIG. 11 is a flowchart illustrating an internal processing operation of the femto BS 7 related to a withdrawal request receiving process.

If the withdrawal request message is received from the MS 2 (step S101), the femto BS 7 illustrated in FIG. 11 transmits the idle transition request of the MS 2 to the PC unit 52 in the femto GW 12 (step S102).

If the idle transition request is received, the femto GW 12 registers information of the MS 2 and the BSID included in the idle transition request. The femto BS 12 stores the PCID to identify the PC unit 52 thereof and an idle mode parameter (calling period) in the idle transition request response, and transmits the idle transition request response to the femto BS 7.

If the idle transition request response is transmitted to the femto BS 7, the femto GW 12 sets a system timer and monitors whether the position registration update of the MS 2 is performed before the system timer times up.

When the position registration update of the MS 2 is not performed before the system timer times up, the femto GW 12 can erase the association information of the MS 2. The PC unit 52 in the femto GW 12 updates and registers the idle mode parameter (calling period or the like) as the position information of the MS 2 in the position registration database 62.

If the idle transition request response is received from the femto GW 12 (step S103), the femto BS 7 stores the idle mode parameter (calling period or the like) that is included in the idle transition request response (step S104), transmits the withdrawal command message including the parameter to the MS 2 (step S105), and ends the processing operation illustrated in FIG. 11.

As a result, the MS 2 transits to the idle mode according to the withdrawal command message and stores the idle mode parameter (calling period or the like) that is included in the withdrawal command message.

Then, the MS 2 regularly receives a calling notification message indicating whether a signal is transmitted from the femto BS 7, on the basis of the stored idle mode parameter (calling period or the like).

During the withdrawal request receiving process of the femto BS 7 side illustrated in FIG. 11, since the withdrawal command message is transmitted to the MS 2 according to the withdrawal request command from the MS 2, the MS 2 can transit to the idle mode.

During the withdrawal request receiving process, since the withdrawal command message including the idle mode parameter (calling period or the like) is transmitted to the MS 2, the MS 2 can regularly receive the calling notification message indicating whether a signal is transmitted from the femto BS 7, on the basis of the calling period, even during the idle mode, and recognize whether a signal is transmitted.

FIG. 12 is a flowchart illustrating an internal processing operation of the femto BS 7 related to a calling notification transmitting process.

The femto BS 7 determines whether the calling period reaches the calling period of the idle mode parameter (step S111).

When the calling period reaches the calling period of the idle mode parameter (step S111: YES), the femto BS 7 transmits the calling notification message to the MS 2 (step S112) and proceeds to step S111.

When the calling period does not reach the calling period of the idle mode parameter (step S111: NO), the femto BS 7 continuously executes the determining operation of step S111, until the calling period reaches the calling period of the idle mode parameter.

During the calling notification transmitting process of the femto BS 7 side illustrated in FIG. 12, since the calling notification message is transmitted to the MS 2, even during the idle mode, according to the calling period, the MS 2 can recognize whether a signal is transmitted.

Next, the operation of the femto BS 7 (BS 3) in the case where a ranging request message (position registering ranging request message) including the LU flag is received from the MS 2 will be described. FIG. 13 is a flowchart illustrating an internal processing operation of the femto BS 7 (BS 3) related to a position registering ranging request receiving process.

The MS 2 starts the position registration update operation to register the current position thereof regularly or when the MS 2 moves to the coverage of the BS 3 belonging to a new calling group. For example, the regular position registration update is to transmit the position registering ranging request message to the BS 3 or the femto BS 7, using a point of time when an internal timer of the MS 2 times up as start timing. During the position registration update based on the movement, the position registering ranging request message is transmitted to the BS 3 or the femto BS 7, using a point of time when the PGID of the calling notification message to be received changes as start timing.

The MS 2 transmits the ranging request message (position registering ranging request message) including the PCID and the LU flag to the movement destination femto BS 7 (BS 3). The PCID corresponds to a newest PCID in the PCIDs notified at the time of transiting to the idle mode or immediately previous position registration update.

If the ranging request message including the LU flag is received (step S121), the femto BS 7 (BS 3) illustrated in FIG. 13 transmits the position registration request including the PCID and the BSID from the MS 2 to the PC unit 52 in the femto GW 12 through the ASN-GW 11, on the basis of the PCID included in the ranging request message (step S122).

If the position registration request is received, the femto GW 12 updates the position information of the MS 2 in the position registration database 62, on the basis of the BSID closest to the MS 2 and the PGID related to the MS 2 included in the position registration request. The femto GW 12 transmits the position registration request response to the femto BS 7 (BS 3), and resets the system timer. The timer time of the system timer is set to be slightly longer than the timer time of the internal timer of the MS 2.

If the position registration request response is received from the femto GW 12 (step S123), the femto BS 7 (BS 3) calculates the CMAC of the ranging request message, on the basis of the key information of the CMAC included in the position registration request response, compares the CMAC of the calculation result and the CMAC attached to the ranging request message, and confirms the validity of the ranging request message received in step S121 (step S124).

When the validity of the ranging request message from the MS 2 is confirmed, the femto BS 7 (BS 3) transmits the ranging request response message including the confirmation of the validity to the MS 2, transmits the position registration confirmation with respect to the position registration request to the femto GW 12 through the ASN-GW 11 (step S125), and ends the processing operation illustrated in FIG. 13.

When the validity of the ranging request message from the MS 2 cannot be confirmed, the femto BS 7 (BS 3) transmits the ranging request response message including validity confirmation impossibility to the MS 2 in step S125 and ends the processing operation illustrated in FIG. 13.

During the position registering ranging request receiving process of the femto BS 7 (BS 3) side illustrated in FIG. 13, in a case that the ranging request message including the LU flag is received from the MS 2 and the validity of the ranging request message is confirmed on the basis of the CMAC of the ranging request message, the ranging request response message is transmitted to the MS 2 and the position registration confirmation is transmitted to the femto GW 12. Therefore, the position registration can be notified to the MS 2 and the femto GW 12.

Figure 14:
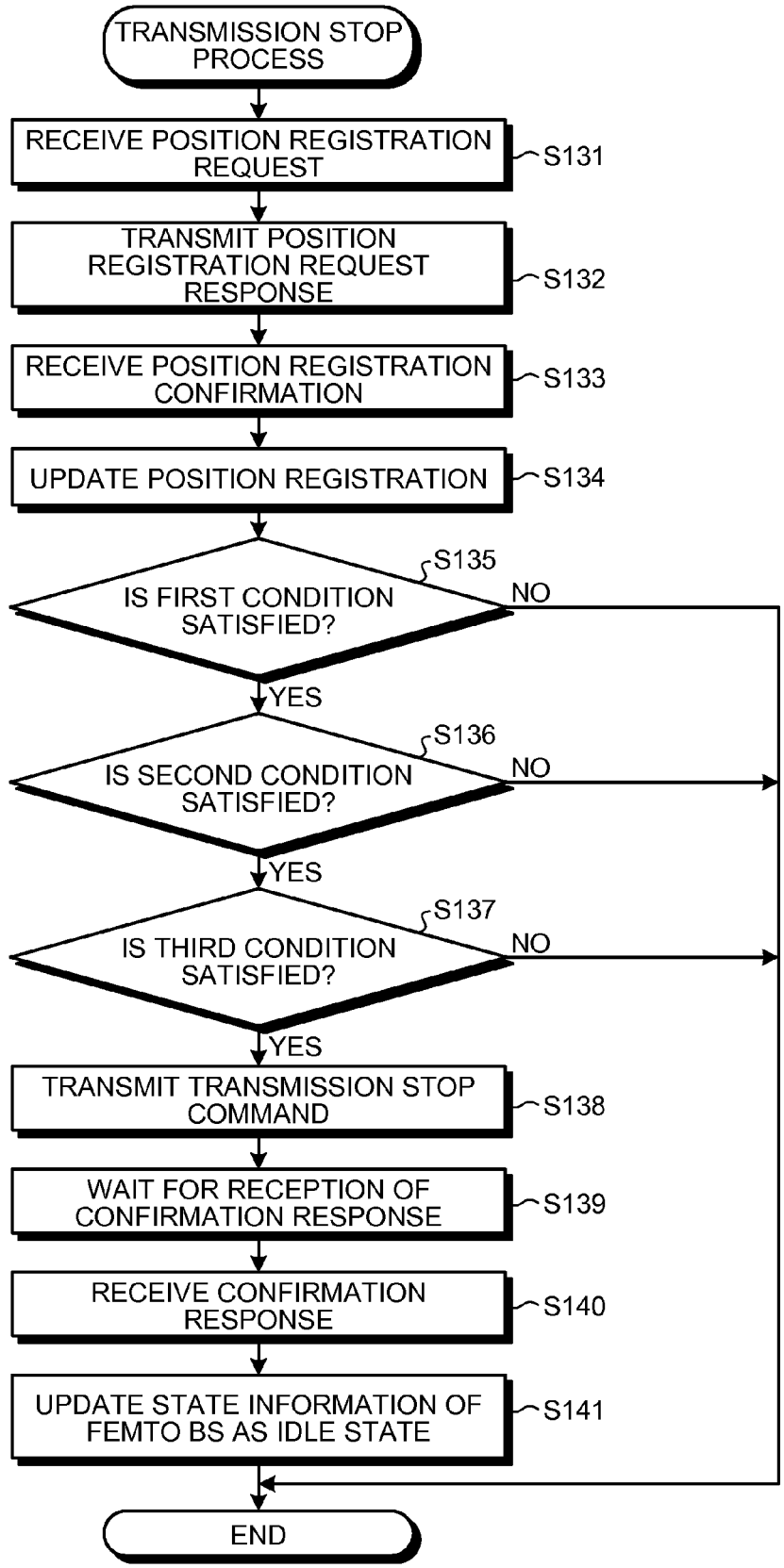
FIG. 14 is a flowchart illustrating an internal processing operation of a femto GW related to a transmission stop process.

Next, the transmission stop process of the femto GW 12 will be described. FIG. 14 is a flowchart illustrating an internal processing operation of the femto GW 12 related to a transmission stop process.

If the position registration request is received from the movement destination BS 3 (femto BS 7) side (step S131), the femto GW 12 transmits the position registration request response including the key information to check the CMAC of the ranging request message at the side of the movement destination BS 3 (femto BS 7) to the movement destination BS 3 (femto BS 7) (step S132).

If the position registration confirmation indicating whether the BS 3 (femto BS 7) can confirm the validity of the ranging request message from the MS 2 is received after the transmission of the position registration request response (step S133), when the validity of the ranging request message can be confirmed on the basis of the position registration confirmation, the femto GW 12 updates the position information of the MS 2 in the position registration database 62, on the basis of the BSID and the PGID included in the previously received position registration request (step S134).

The pre-movement determining unit 53 of the femto GW 12 determines whether a first condition where the position registration updated MS 2 exists within the coverage of the femto BS 7 or the BS 3 in the vicinity of the femto BS 7 before moving to the coverage of the movement destination BS 3 is satisfied, on the basis of the contents of the position registration database 62 (step S135).

When it is determined by the pre-movement determining unit 53 that the first condition is satisfied (step S135: YES), the first connection existence/non-existence determining unit 54 of the femto GW 12 determines whether a second condition where all of the MSs 2 that can be connected to the femto BS 7 withdraw from the femto BS 7 and the BS 3 belonging to the same PGID as the femto BS 7 is satisfied (step S136).

When it is determined by the first connection existence/non-existence determining unit 54 that the second condition is satisfied (step S136: YES), the active state determining unit 55 of the femto GW 12 determines whether a third condition where a state of the femto BS 7 is an active state is satisfied (step S137).

When it is determined by the active state determining unit 55 that the third condition is satisfied (step S137: YES), the command control unit 56 of the femto GW 12 transmits a transmission stop command to the femto BS 7 to instruct the idle state, that is, the radio transmission stop of the control information, with respect to the femto BS 7 (step S138).

If the transmission stop command is received from the femto GW 12, the femto BS 7 transits to the idle state where the radio transmission of the control information is stopped. As a result, the femto BS 7 can avoid waste of useless transmission power or unnecessary interference for adjacent cells.

If the transmission stop command is transmitted to the femto BS 7, the femto GW 12 transits to a state in which the femto GW 12 waits for receiving the confirmation response indicating the transition to the idle state from the femto BS 7 (step S139).

If the confirmation response of the idle state is received (step S140), the femto GW 12 updates state information of the femto BS 7 as an idle state in the femto BS management table 63 (step S141), and ends the processing operation illustrated in FIG. 14.

When it is determined by the pre-movement determining unit 53 that the first condition is not satisfied (step S135: NO), it is determined by the first connection existence/non-existence determining unit 54 that the second condition is not satisfied (step S136: NO), or it is determined by the active state determining unit 55 that the third condition is not satisfied (step S137: NO), the femto GW 12 ends the processing operation illustrated in FIG. 14.

During the transmission stop process of the femto GW 12 side illustrated in FIG. 14, if the position registration confirmation of the MS 2 is received, when the contents of the position registration database 62 are updated and the first, second, and third conditions are satisfied on the basis of the contents of the position registration database 62, the transmission stop command is transmitted to the femto BS 7. Therefore, the femto BS 7 side can avoid waste of useless transmission power or unnecessary interference for adjacent cells.

Figure 15:
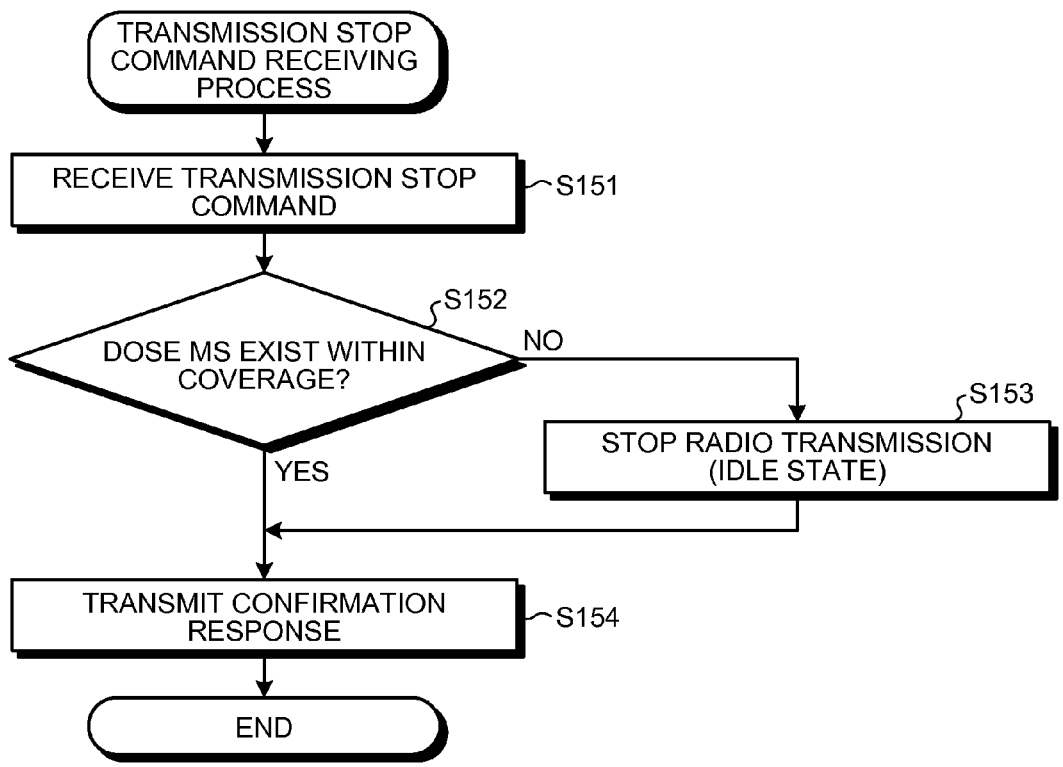
FIG. 15 is a flowchart illustrating an internal processing operation of a femto BS related to a transmission stop command receiving process.

Next, the operation of the femto BS 7 that receives the transmission stop command from the femto GW 12 will be described. FIG. 15 is a flowchart illustrating an internal processing operation of the femto BS 7 related to a transmission stop command receiving process.

If the transmission stop command is received from the femto GW 12 (step S151), the femto BS 7 illustrated in FIG. 15 determines whether the MS 2 exists within the coverage of the femto BS 7 (step S152).

When it is determined that the MS 2 does not exist within the coverage of the femto BS 7 (step S152: NO), the femto BS 7 transits to the idle state where the radio communication is stopped (step S153), and transmits the confirmation response indicating the transition of the femto BS 7 to the idle state to the femto GW 12 (step S154).

When the confirmation response of the idle state is transmitted to the femto GW 12, the femto BS 7 ends the processing operation illustrated in FIG. 15 while maintaining a reception waiting state of the transmission restart command.

During the transmission stop command receiving process of the femto BS 7 side illustrated in FIG. 15, if the reception stop command is received from the femto GW 12, the femto BS 7 transits to the idle state where the radio transmission of the control information is stopped. As a result, the femto BS 7 side can avoid waste of useless transmission power or unnecessary interference for adjacent cells.

Figure 16:
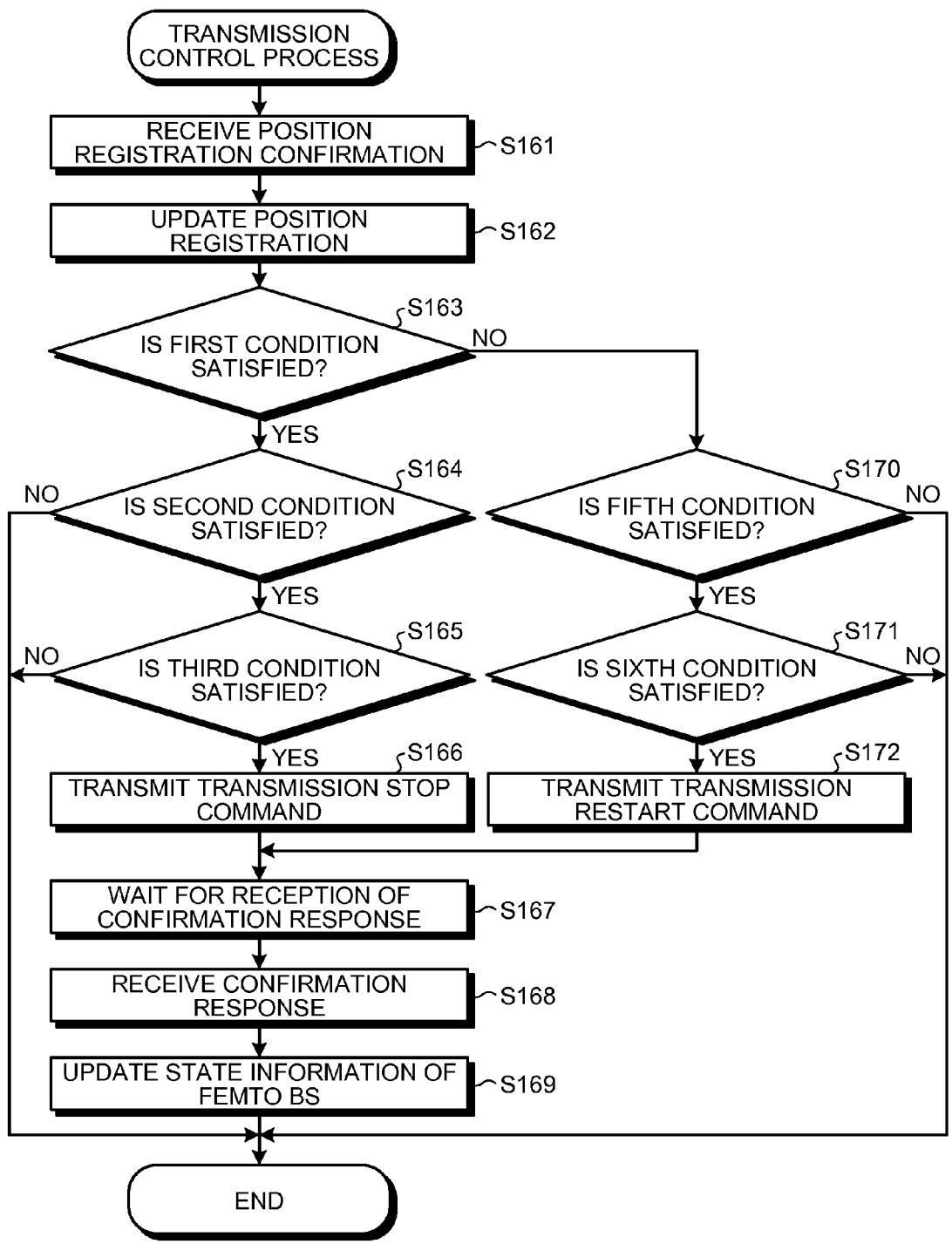
FIG. 16 is a flowchart illustrating an internal processing operation of a femto GW related to a transmission control process.

Next, the transmission control process that includes the transmission stop process and the transmission restarting process of the femto GW 12 will be described. FIG. 16 is a flowchart illustrating an internal processing operation of the femto GW 12 related to a transmission control process.

If the position registration confirmation indicating that the validity of the ranging request message of the MS 2 can be confirmed is received from the movement destination BS 3 (femto BS 7) side after the transmission of the position registration request response (step S161), when the validity of the ranging request message can be confirmed on the basis of the position registration confirmation, the femto GW 12 illustrated in FIG. 16 updates the position information of the MS 2 in the position registration database 62, on the basis of the BSID and the PGID included in the previously received position registration request (step S162).

The pre-movement determining unit 53 of the femto GW 12 determines whether a first condition where the position registration updated MS 2 exists within the coverage of the femto BS 7 or the BS 3 in the vicinity of the femto BS 7 before moving to the coverage of the movement destination BS 3 is satisfied, on the basis of the contents of the position registration database 62 (step S163).

When it is determined by the pre-movement determining unit 53 that the first condition is satisfied (step S163: YES), the first connection existence/non-existence determining unit 54 of the femto GW 12 determines whether a second condition where all of the MSs 2 that can be connected to the femto BS 7 withdraw from the femto BS 7 and the BS 3 belonging to the same PGID as the femto BS 7 is satisfied (step S164).

When it is determined by the first connection existence/non-existence determining unit 54 that the second condition is satisfied (step S164: YES), the active state determining unit 55 of the femto GW 12 determines whether a third condition where a state of the femto BS 7 is an active state is satisfied (step S165).

When it is determined by the active state determining unit 55 that the third condition is satisfied (step S165: YES), the command control unit 56 of the femto GW 12 transmits a transmission stop command to the femto BS 7 to instruct the idle state, that is, the radio transmission stop of the control information, with respect to the femto BS 7 (step S166).

If the transmission stop command is received from the femto GW 12, the femto BS 7 transits to the idle state where the radio transmission of the control information is stopped. As a result, the femto BS 7 can avoid waste of useless transmission power or unnecessary interference for adjacent cells.

If the transmission stop command is transmitted to the femto BS 7, the femto GW 12 transits to a state in which the femto GW 12 waits for receiving the confirmation response indicating the state of the femto BS 7 from the femto BS 7 (step S167). If the transmission stop command is received, the femto BS 7 transits from the active state to the idle state. For this reason, the femto BS 7 transmits the confirmation response of the idle state to the femto GW 12.

If the confirmation response indicating the state of the femto BS 7 is received (step S168), the femto GW 12 updates state information of the femto BS 7 in the femto BS management table 63 (step S169), and ends the processing operation illustrated in FIG. 16.

When it is determined that the first condition where the position registration updated MS 2 exists within the coverage of the femto BS 7 or the BS 3 in the vicinity of the femto BS 7 before moving to the coverage of the movement destination BS 3 is not satisfied on the basis of the contents of the position registration database 62 (step S163: NO), the pre-movement determining unit 53 in the femto GW 12 determines that a fourth condition is satisfied.

When the fourth condition is satisfied, the second connection existence/non-existence determining unit 57 in the femto GW 12 determines whether a fifth condition where the current MS 2 exists in the femto BS 7 or the BS 3 belonging to the same PGID as the femto BS 7 is satisfied (step S170).

When it is determined by the second connection existence/non-existence determining unit 57 that the fifth condition is satisfied (step S170: YES), the idle state determining unit 58 in the femto GW 12 determines whether a sixth condition where the femto BS 7 is in an idle state is satisfied (step S171).

When it is determined by the idle state determining unit 58 that the sixth condition is satisfied (step S171: YES), the command control unit 56 in the femto GW 12 transmits the transmission restart command to the femto BS 7 to instruct the femto BS 7 to transit to the active state, that is, restart the radio transmission of the control information (step S172).

If the transmission restart command is received from the femto GW 12, the femto BS 7 transits to the active state where the radio transmission of the control information restarts. As a result, the femto BS 7 restarts the basic operation as the base station with respect to the MS 2.

If the transmission restart command is transmitted to the femto BS 7, the femto GW 12 transits to step S167 to transit to a state in which the femto GW 12 waits for receiving the confirmation response indicating the state information from the femto BS 7. If the transmission restart command is received, the femto BS 7 transits from the idle state to the active state. Therefore, the femto BS 7 transits to step S167 to transmit the confirmation response of the active state to the femto GW 12.

If the confirmation response of the active state is received in step S168, the femto GW 12 updates the state information of the femto BS 7 as the active state in the femto BS management table 63 in step S168, and ends the processing operation illustrated in FIG. 16.

When it is determined by the first connection existence/non-existence determining unit 54 that the second condition is not satisfied (step S164: NO), it is determined by the active state determining unit 55 that the third condition is not satisfied (step S165: NO), it is determined by the second connection existence/non-existence determining unit 57 that the fifth condition is not satisfied (step S170: NO), or it is determined by the idle state determining unit 58 that the sixth condition is not satisfied (step S171: NO), the femto GW 12 ends the processing operation illustrated in FIG. 16.

During the transmission control process of the femto GW 12 side illustrated in FIG. 16, if the position registration confirmation of the MS 2 is received, when the contents of the position registration database 62 are updated and the first, second, and third conditions are satisfied on the basis of the contents of the position registration database 62, the transmission stop command is transmitted to the femto BS 7. Therefore, the femto BS 7 side can avoid waste of useless transmission power or unnecessary interference for adjacent cells.

During the transmission control process of the femto GW 12 side, if the position registration confirmation of the MS 2 is received, when the contents of the position registration database 62 are updated and the fourth, fifth, and sixth conditions are satisfied on the basis of the contents of the position registration database 62, the transmission restart command is transmitted to the femto BS 7. Therefore, the femto BS 7 side can restart the radio transmission of the control information.

Figure 17:
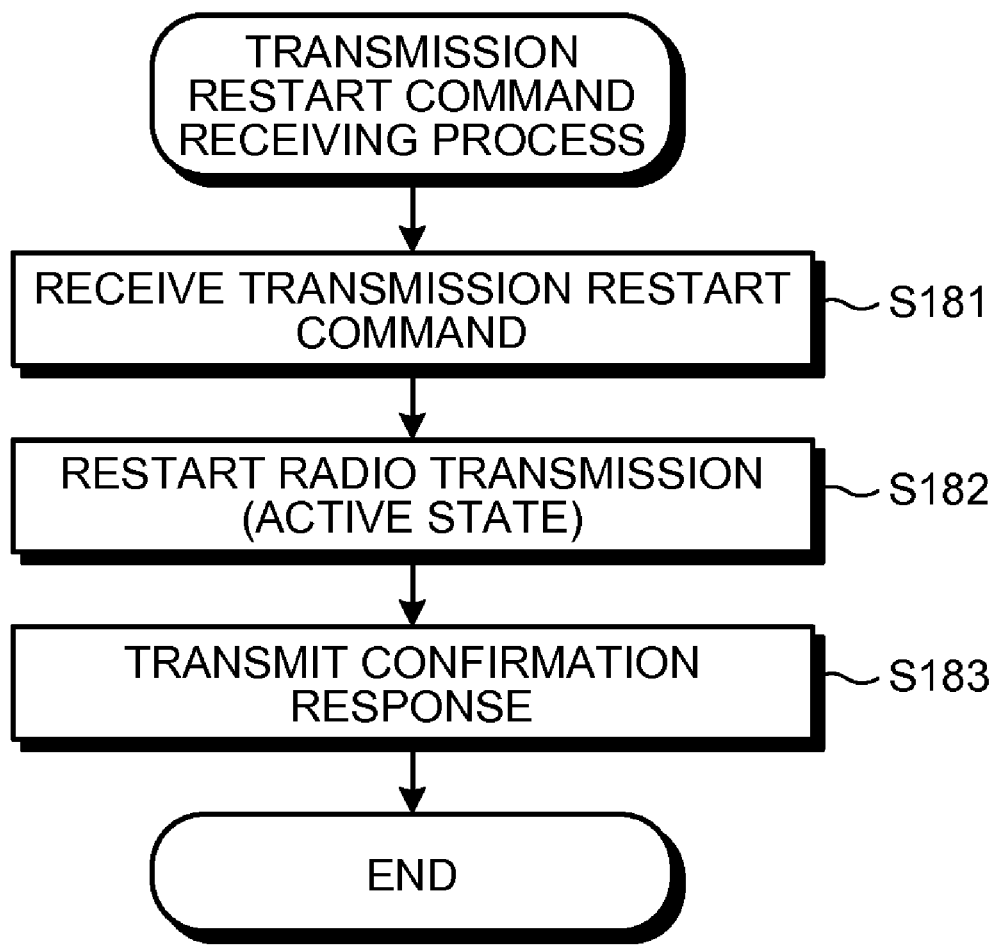
FIG. 17 is a flowchart illustrating an internal processing operation of a femto BS related to a transmission restart command receiving process.

Next, the operation of the femto BS 7 in the case where the transmission restart command is received from the femto GW 12 will be described. FIG. 17 is a flowchart illustrating an internal processing operation of the femto BS 7 related to a transmission restart command receiving process.

If the transmission restart command is received from the femto GW 12 (step S181), the femto BS 7 illustrated in FIG. 17 transits to the active state where the radio transmission of the control information restarts (step S182), and transmits the confirmation response indicating the active state to the femto GW 12 (step S183).

When the confirmation response of the active state is transmitted to the femto GW 12, the femto BS 7 ends the processing operation illustrated in FIG. 17 while maintaining a reception waiting state of the transmission stop command.

During the transmission restart command receiving process of the femto BS 7 side illustrated in FIG. 17, if the transmission restart command is received from the femto GW 12, the femto BS 7 transits to the active state where the radio transmission of the control information in the stop state restarts. As a result, the femto BS 7 side can restart the radio transmission of the control information.

In the first embodiment, if the position registration confirmation of the MS 2 is received, when the contents of the position registration database 62 are updated and the first, second, and third conditions are satisfied on the basis of the contents of the position registration database 62, the transmission stop command is transmitted to the femto BS 7. Therefore, the femto BS 7 side can avoid waste of useless transmission power or unnecessary interference for adjacent cells.

In the first embodiment, if the position registration confirmation of the MS 2 is received, when the contents of the position registration database 62 are updated and the fourth, fifth, and sixth conditions are satisfied on the basis of the contents of the position registration database 62, the transmission restart command is transmitted to the femto BS 7. Therefore, the femto BS 7 side can restart the radio transmission of the control information.

In the first embodiment, the PC unit 52 with respect to the MS 2 can be provided in the femto GW 12, the PC unit 52 in the femto GW 12 can always acquire the newest position information of the MS 2, and the active/idle state of the femto BS 7 can be managed. However, it has less e expansibility of the system to dispose the PC unit 52 in the femto GW 12 at all times.

Therefore, a radio communication system 1A according to an embodiment that corresponds to the case where the PC unit 52 is provided in the ASN-GW 11 other than the femto GW 12 will be described below as a second embodiment.

[b] Second Embodiment

Figure 18:
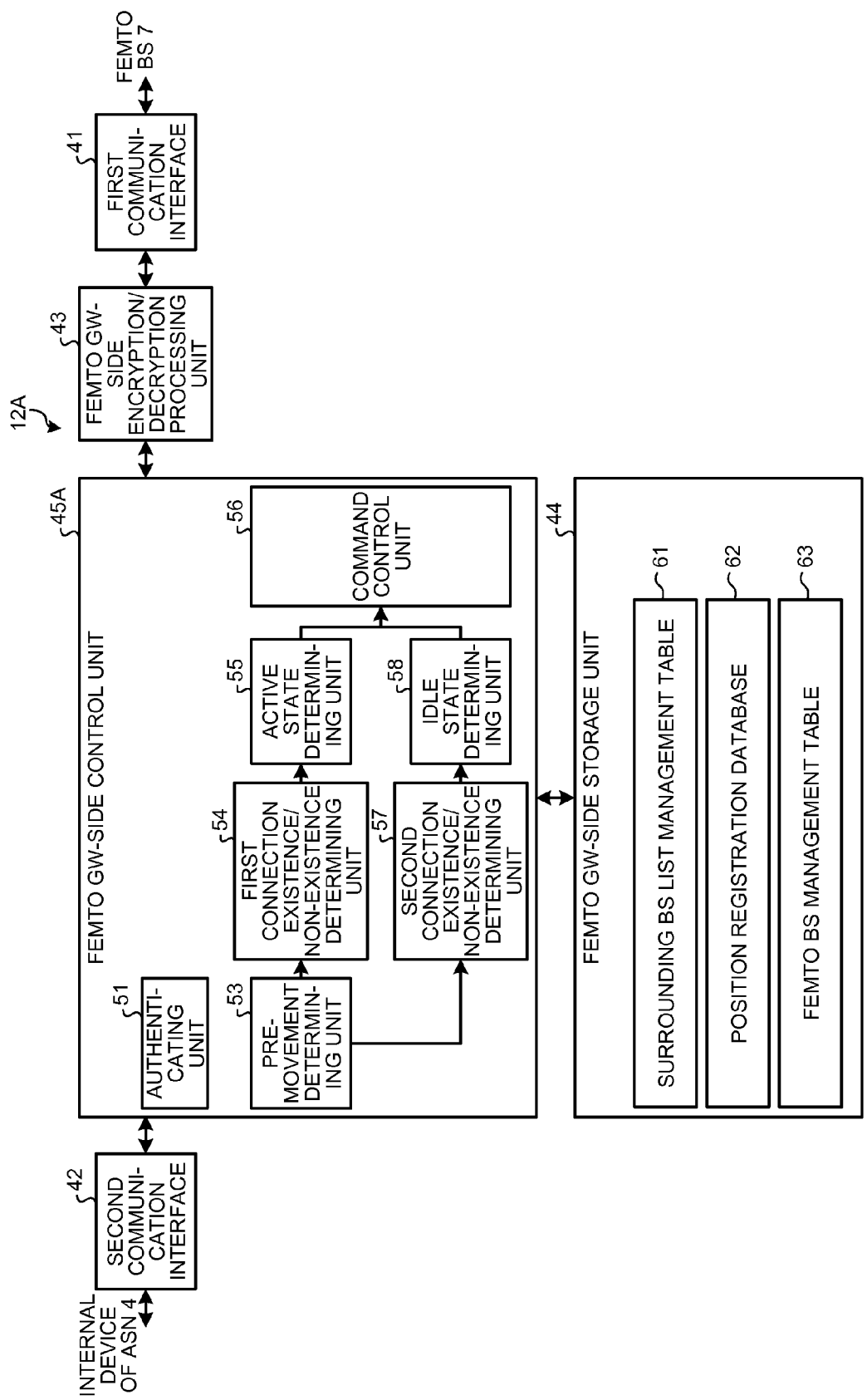
FIG. 18 is a block diagram illustrating the schematic internal configuration of a femto GW according to a second embodiment.
Figure 19:
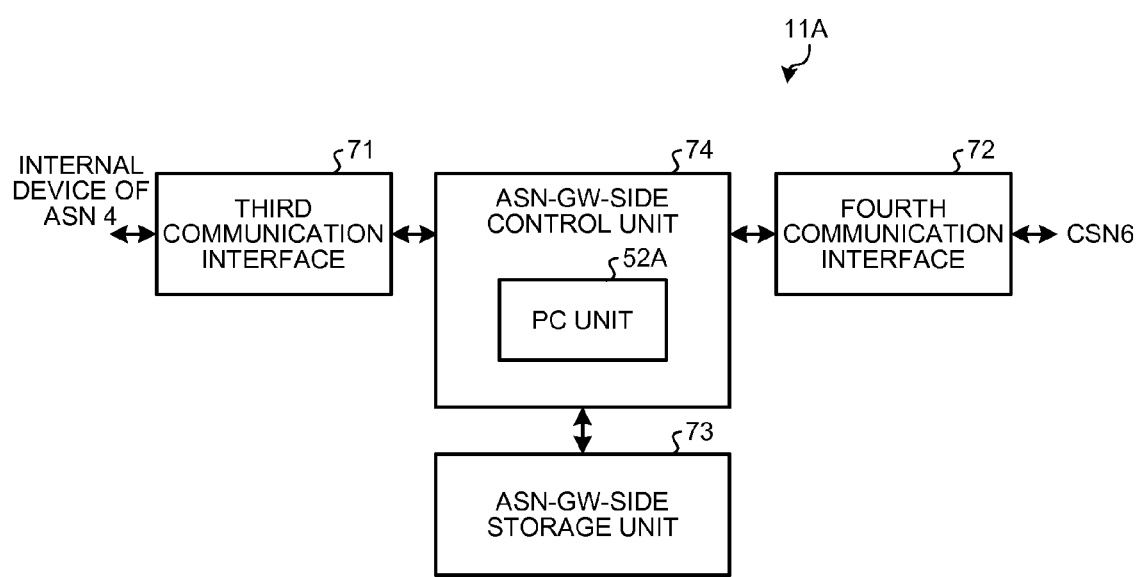
FIG. 19 is a block diagram illustrating the schematic internal configuration of an ASN-GW according to the second embodiment.

FIG. 18 is a block diagram illustrating the schematic internal configuration of the femto GW 12 according to a second embodiment. FIG. 19 is a block diagram illustrating the schematic internal configuration of an ASN-GW 11A according to the second embodiment. The same components as those of the first embodiment are denoted by the same reference numerals and the overlapped description of the configuration and operation is omitted.

A femto GW-side control unit 45A in a femto GW 12A illustrated in FIG. 18 does not include the PC unit 52 having a calling control function but the authenticating unit 51, the pre-movement determining unit 53, the first connection existence/non-existence determining unit 54, the active state determining unit 55, the command control unit 56, the second connection existence/non-existence determining unit 57, and the idle state determining unit 58.

The ASN-GW 11A illustrated in FIG. 19 has a third communication interface 71 that functions as a communication interface connected to a BS 3 or an internal device of an ASN 4 such as the femto GW 12, a fourth communication interface 72 that functions as a communication interface with a CSN 6, an ASN-GW-side storage unit 73 that stores a variety of information, and an ASN-GW-side control unit 74 that wholly controls the ASN-GW 11A.

In the ASN-GW-side control unit 74, a PC unit 52A that has a calling controller function is incorporated.

The AAA server 13 manages the list of the PCID of the ASN-GW 11A and the BSID of the femto BS 7 connected to the MS 2 together with the identification information related to the MS 2 that permits connection with the femto BS 7, on the basis of the information at the time of new arrangement contract of the femto BS 7.

Figure 20:
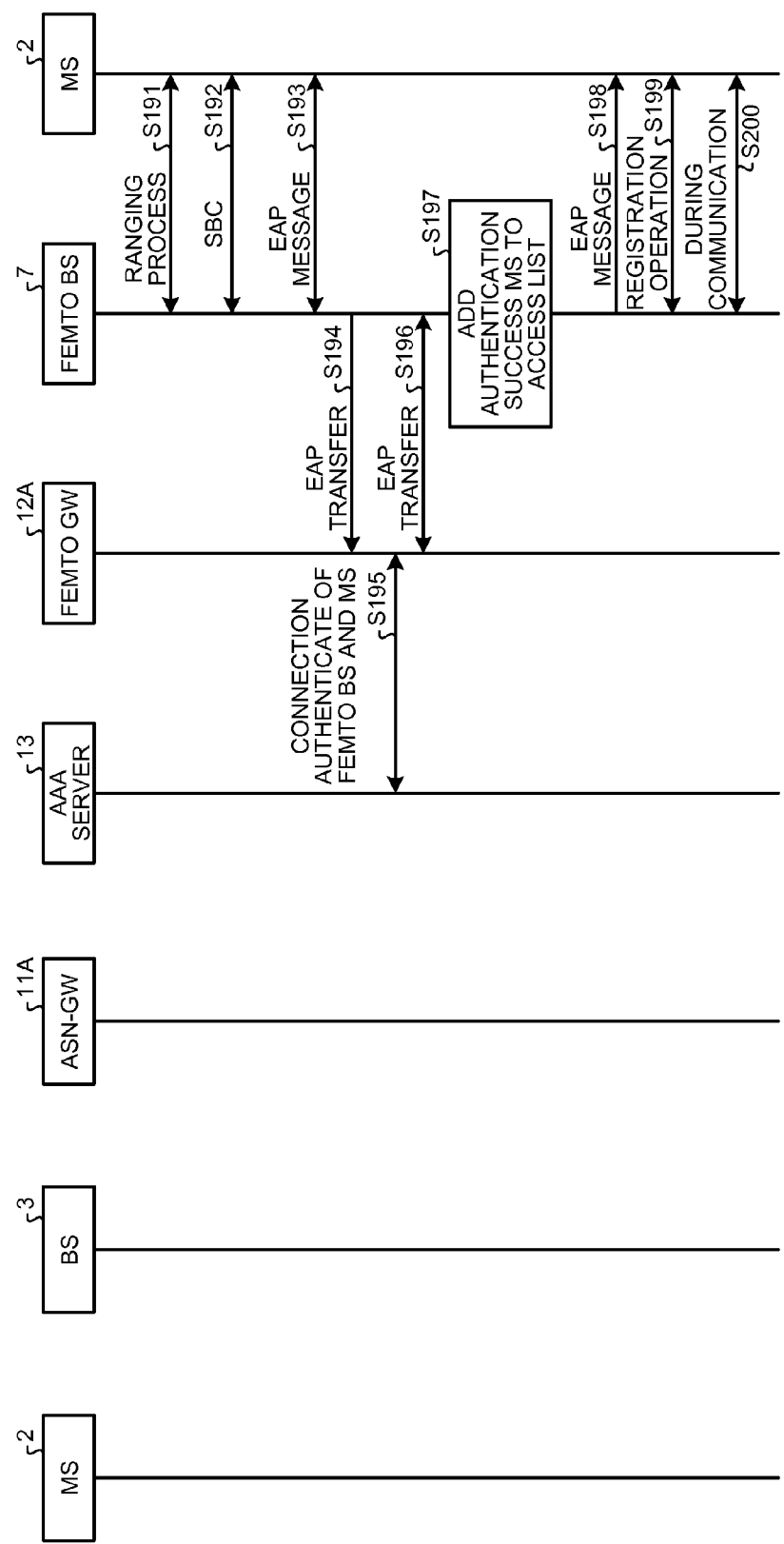
FIG. 20 is a sequence illustrating an internal processing operation of a radio communication system when an MS starts to be newly connected to a femto BS.

Next, the operation of the radio communication system 1A according to the second embodiment will be described. FIG. 20 is a sequence illustrating an internal processing operation of the radio communication system 1A when the MS 2 starts to be newly connected to the femto BS 7.

The MS 2 and the femto BS 7 illustrated in FIG. 20 adjust transmission parameters (frequency, timing, and transmission power) through a ranging process (step S191), and negotiate SBC (step S192).

The MS 2 uses a PKM protocol to transmit an EAP message to authenticate the MS 2 to the femto BS 7 (step S193). The EAP message includes identification information of the MS 2 to authenticate the MS 2.

If the EAP message to authenticate the MS 2 is received, the femto BS 7 uses an EAP transfer protocol to transmit the EAP message including its own BSID as well as the identification information of the MS 2 to the femto GW 12A (step S194).

The authenticating unit 51 in the femto GW 12A uses a RADIUS protocol to transmit the EAP message received from the femto BS 7 to the AAA server 13.

The AAA server 13 executes connection authentication to confirm whether connection of the MS 2 and the femto BS 7 is permitted, on the basis of management contents related to the connection permission of the femto BS 7 and the MS 2 and the identification information of the MS 2 and the BSID of the femto BS 7 included in the EAP message, and transmits the connection authentication result to the femto GW 12A (step S195).

When connection of the MS 2 and the femto BS 7 is permitted through the AAA server 13, the femto GW 12A uses the EAP transfer protocol to transmit the EAP message of the authentication success to the femto BS 7 (step S196).

If the EAP message (EAP transfer) of the authentication success is received in step S196, the femto BS 7 adds a MAC address of the MS 2 of the authentication success to the access list 33 (step S197).

If the MAC address of the MS 2 of the authentication success is added to the access list 33, the femto BS 7 transmits the EAP message of the authentication success of the MS 2 to the MS 2 (step S198).

If the EAP message of the authentication success of the MS 2 is transmitted to the MS 2, the femto BS 7 executes a registration operation (step S199), and starts communication with the MS 2 (step S200).

When the EAP message of the authentication failure of the MS 2 is received through the AAA server 13, the femto GW 12A transmits the authentication failure to the MS 2 through the femto BS 7 and urges the MS 2 to perform reconnection with another femto BS 7 or another BS 3.

When the MAC address of the MS 2 does not exist in the access list 33, the femto BS 7 transmits the authentication failure to the MS 2 and urges the MS 2 to perform reconnection with another femto BS 7 or another BS 3.

Figure 21:
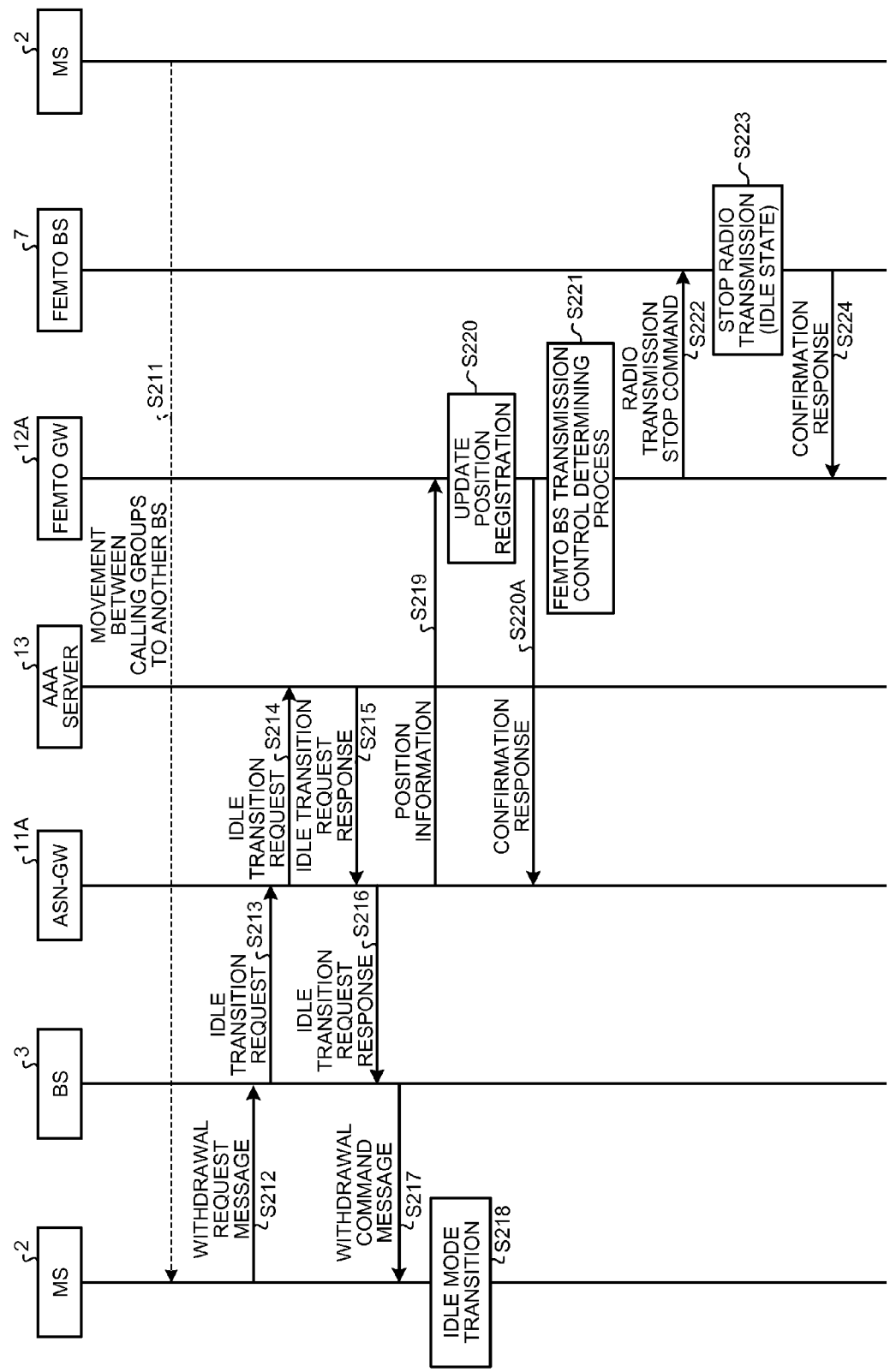
FIG. 21 is a sequence illustrating an internal processing operation of a radio communication system according to idle mode transition after handover according to movement between calling groups from a femto BS to another BS.

Next, the operation of when the MS 2 transits to an idle mode after handover according to movement between calling groups from the femto BS 7 to another BS 3 will be described. FIG. 21 is a sequence illustrating an internal processing operation of the radio communication system 1A when idle mode transition is performed, after handover according to movement between calling groups from the femto BS 7 to another BS 3.

When the MS 2 illustrated in FIG. 21 transits to the idle mode after the handover from the femto BS 7 to the movement destination BS 3 (step S211), the MS 2 transmits a withdrawal request message to the movement destination BS 3 (step S212).

If the withdrawal request message is received, the movement destination BS 3 transmits an idle transition request to the PC unit 52A in the ASN-GW 11A as a preparation step of when the MS 2 transits to the idle mode (step S213). The idle transition request includes a BSID to specify a transmission source BS, that is, the movement destination BS, a PCID to identify the PC unit 52 in the ASN-GW 11A, and information (various registration information, security information, service flow information, and the like) of the MS 2.

The PC unit 52 in the ASN-GW 11A manages the PGID, the PCID to identify the PC unit 52 in the ASN-GW 11A, and the calling period as information needed for the MS 2. For this reason, if the idle transition request is received, the PC unit 52 in the ASN-GW 11A transmits an idle transition request to the AAA server 13 (step S214).

If the idle transition request is received from the ASN-GW 11A, the AAA server 13 acquires the MS associated information related to the femto GW 12 and the femto BS 7 connected to the MS 2 during the management according to the information of the MS 2 included in the idle transition request, and transmits an idle transition request response including the MS associated information to the ASN-GW 11A (step S215).

If the idle transition request response is received, the ASN-GW 11A transmits the idle transition request response to the movement destination BS 3 (step S216).

If the idle transition request response is received from the ASN-GW 11A, the movement destination BS 3 transmits a withdrawal command message including the calling period with respect to the withdrawal request message from the MS 2, to the MS 2 (step S217). As a result, if the withdrawal command message is received, the MS 2 transits to the idle mode (step S218).

If the idle transition request response is received from the AAA server 13 in step S215, the ASN-GW 11A specifies the femto GW 12A of the femto BS 7 that the MS 2 can be connected, from the information of the MS 2 obtained from the idle transition request response.

If the femto GW 12A of the femto BS 7 is specified, the ASN-GW 11A transmits the position information of the MS 2 to the femto GW 12A (step S219). The position information of the MS 2 includes the PGID of the calling group where the MS 2 exists and the BSID of the movement destination BS 3 where the MS 2 is covered.

If the position information is received from the ASN-GW 11A, the femto GW 12A updates the position information of the MS 2 in the position registration database 62, on the basis of the position information of the MS 2 (step S220) and transmits the confirmation response with respect to the position information of step S219 to the ASN-GW 11A (step S220A).

If the confirmation response with respect to the ASN-GW 11A is transmitted, the femto GW 12A executes the femto BS transmission control determining process, on the basis of the contents of the position registration database 62 (step S221).

When the first, second, and third conditions are satisfied through the femto BS transmission control determining process, the command control unit 56 in the femto GW 12A transmits a transmission stop command to the femto BS 7 to instruct the idle state, that is, the radio transmission stop of the control information, with respect to the femto BS 7 (step S222).

If the transmission stop command is received from the femto GW 12, the femto BS 7 transits to the idle state where the radio transmission of the control information is stopped (step S223). As a result, the femto BS 7 can avoid waste of useless transmission power or unnecessary radio wave interference for adjacent cells.

If the femto BS 7 transits to the idle state where the radio transmission is stopped, the femto BS 7 further transmits a confirmation response indicating the idle state to the femto GW 12 (step S224).

If the confirmation response of the idle state is received from the femto BS 7, the femto GW 12A updates state information of the femto BS 7 as an idle state in the femto BS management table 63.

Figure 22:
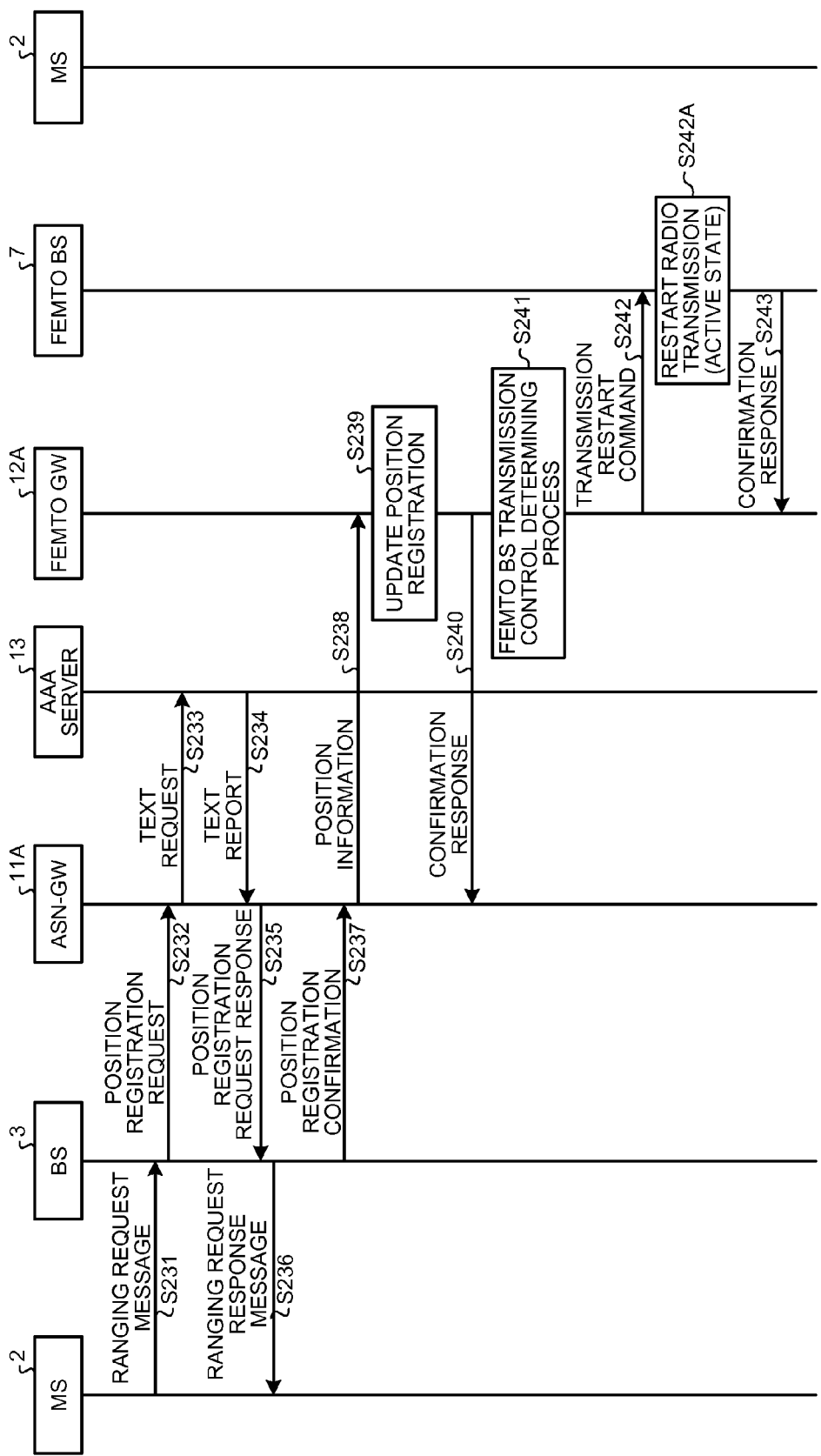
FIG. 22 is a sequence illustrating an internal processing operation of a radio communication system according to movement between calling groups from another BS to a BS in the vicinity of a femto BS.

Next, the operation of when the MS 2 during the idle mode moves between calling groups from another BS 3 to the BS 3 in the vicinity of the femto BS 7 will be described. FIG. 22 is a sequence illustrating an internal processing operation of the radio communication system 1A according to movement between calling groups from another BS 3 to the BS 3 in the vicinity of the femto BS 7.

When the MS 2 moves from the another BS 3 to the BS 3 in the vicinity of the femto BS 7, the MS 2 starts the position registration update operation thereof.

If the position registration update operation starts, the MS 2 illustrated in FIG. 22 transmits a ranging request message (position registering ranging request message) including a PCID and a LU flag to the movement destination BS 3 (step S231).

If the ranging requesting message is received from the MS 2, the movement destination BS 3 transmits a position registration request including a PGID and a BSID to identify the BS 3 to the ASN-GW 11A, on the basis of the PCID included in the ranging request message (step S232).

If the position registration request is received from the movement destination BS 3, the PC unit 52A in the ASN-GW 11A determines whether the movement destination BS 3 side holds MS associated information (security information) related to the MS 2 including key information of the CMAC to authenticate the validity of the ranging request message from the MS 2.

When it is determined that the movement destination BS 3 does not hold the MS associated information including the key information, the PC unit 52A in the ASN-GW 11A transmits a text request (Context-Req) requesting to transmit the key information to the AAA server 13 (step S233).

If the text request is received, the AAA server 13 transmits the key information to authenticate the validity of the ranging request message of the MS 2 and the MS associated information, that is, a text report (Context-Rpt) including information of the femto BS 7 and the femto GW 12A to the PC unit 52A in the ASN-GW 11A (step S234).

If the text report is received, the PC unit 52A in the ASN-GW 11A stores the key information of the CMAC included in the text report in a position registration request response, and transmits the position registration request response to the movement destination BS 3 (step S235).

If the position registration request response is received, the movement destination BS 3 calculates the CMAC of the ranging request message on the basis of the key information of the CMAC included in the position registration request response, compares the CMAC of the calculation result and the CMAC attached to the ranging request message, and confirms the validity of the ranging request message.

If the validity of the ranging request message from the MS 2 is confirmed on the basis of the comparison result of the CMAC, the movement destination BS 3 transmits the ranging request response message including the confirmation of the validity, which responses to the ranging request message, to the MS 2 (step S236). The movement destination BS 3 also transmits a position registration confirmation with respect to the position registration request of step S235 to the PC unit 52A in the ASN-GW 11A (step S237).

If the position registration confirmation is received, the PC unit 52A in the ASN-GW 11A updates and registers the position information of the MS 2, on the basis of the PGID or the BSID of the movement destination BS 3 included in the position registration request previously received in step S232.

The ASN-GW 11A specifies the femto GW 12A of the femto BS 7 that the MS 2 can be connected, from the information of the MS 2 obtained from the position registration request of step S232.

If the femto GW 12A of the femto BS 7 is specified, the ASN-GW 11A transmits the position information of the MS 2 to the femto GW 12A (step S238). The position information of the MS 2 includes the PGID where the MS 2 exists and the BSID of the movement destination BS 3 or the movement destination femto BS 7 where the MS 2 is covered.

If the position information is received from the ASN-GW 11A, the femto GW 12A updates the contents of the position registration database 62 on the basis of the position information of the MS 2 (step S239), and transmits the confirmation response with respect to the position information to the ASN-GW 11A (step S240).

If the confirmation response with respect to the ASN-GW 11A is transmitted, the femto GW 12A executes the femto BS transmission control determining process, on the basis of the contents of the position registration database 62 (step S241).

When the fourth, fifth, and sixth conditions are satisfied through the femto BS transmission control determining process, the femto GW 12A transmits a transmission restart command to the femto BS 7 to instruct the idle state, that is, the radio transmission restart of the control information with respect to the femto BS 7 (step S242).

If the transmission restart command is received from the femto GW 12A, the femto BS 7 transits to the active state where the radio transmission of the control information restarts (step S242A). As a result, the femto BS 7 restarts the basic operation as a base station with respect to the MS 2.

If the femto BS 7 transits to the active state where the radio transmission restarts, the femto BS 7 further transmits a confirmation response indicating the active state to the femto GW 12A (step S243).

If the confirmation response of the active state is received from the femto BS 7, the femto GW 12A updates an active state of the femto BS 7 as state information in the femto BS management table 63.

If the position registration request is received from the BS 3 of step S232, when the BS 3 holds the MS associated information including the key information of the CMAC, the PC unit 52A in the ASN-GW 11A transmits the position registration request response including the key information of the CMAC to the movement destination BS 3 in step S235.

Next, the operation of the ASN-GW 11A in the case where an idle transition request is received from the movement destination BS 3 will be described.

When the MS 2 transits to the idle mode, the MS 2 transmits the withdrawal request message to the BS 3 where the MS 2 currently belongs. When the withdrawal request message is received, the BS 3 transmits the idle transition request of the MS 2 to the PC unit 52A in the ASN-GW 11A. The idle transition request includes the BSID to specify the transmission source BS and the information (various registration information, security information, service flow information, and the like) of the MS 2.

Figure 23:
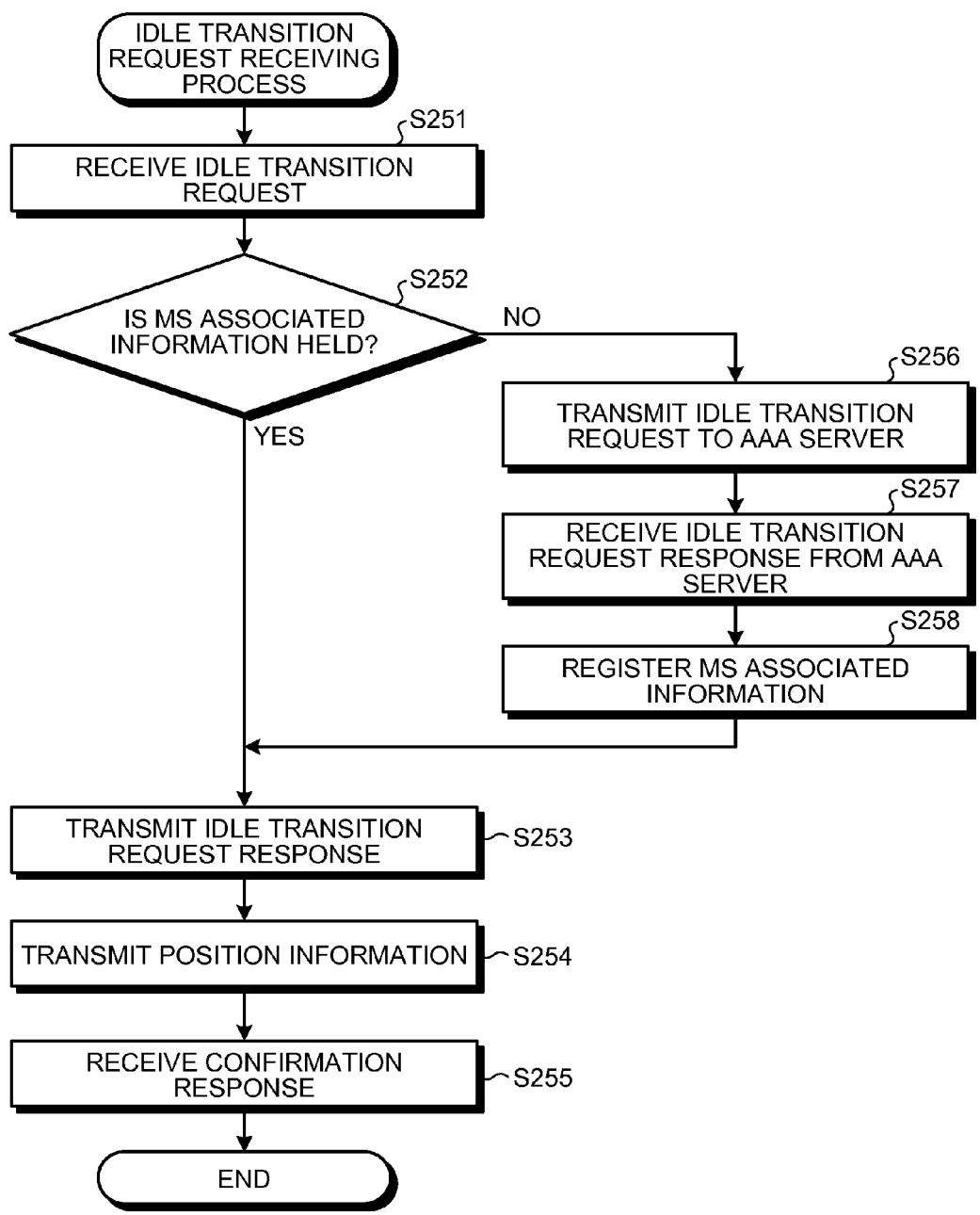
FIG. 23 is a flowchart illustrating an internal processing operation of an ASN-GW related to an idle transition request receiving process.

FIG. 23 is a flowchart illustrating an internal processing operation of the ASN-GW 11A related to an idle transition request receiving process.

If the idle transition request is received from the movement destination BS 3 (step S251), the ASN-GW 11A illustrated in FIG. 23 determines whether the MS associated information related to the MS 2 of the idle transition request is held (step S252). The MS associated information includes the key information of the CMAC in addition to the information of the femto BS 7 and the femto GW 12A that can be connected to the MS 2.

When the MS associated information related to the MS 2 is held (step S252: YES), the ASN-GW 11A transmits the idle transition request response including the key information of the CMAC in the MS associated information to the movement destination BS 3 (step S253).

The ASN-GW 11A specifies the femto GW 12A of the femto BS 7 that the MS 2 can be connected, from the held MS associated information or the MS associated information obtained from the idle transition request response to be described below.

If the femto GW 12A of the femto BS 7 is specified, the ASN-GW 11A transmits the position information of the MS 2 to the femto GW 12A (step S254). The position information of the MS 2 includes the PGID and the BSID where the MS 2 exists.

If the confirmation response from the femto GW 12A with respect the position information is received (step S255), the ASN-GW 11A ends the processing operation illustrated in FIG. 23.

When the MS associated information related to the MS 2 is not held (step S252: NO), the ASN-GW 11A transmits the idle transition request to the AAA server 13 (step S256).

As a result, if the idle transition request is received, the AAA server 13 acquires the MS associated information related to the MS 2, on the basis of the information of the MS 2 included in the idle transition request, and transmits the idle transition request response including the acquired MS associated information to the ASN-GW 11A.

If the idle transition request response is received (step S257), the ASN-GW 11A acquires the MS associated information related to the MS 2 that is included in the idle transition request response, registers the MS associated information related to the MS 2 (step S258), and transits to step S253 to transmit the idle transition request response to the BS 3.

During the idle transition request receiving process of the ASN-GW 11A side illustrated in FIG. 23, if the idle transition request is received from the movement destination BS 3, when it is determined whether the MS associated information related to the MS 2 is held and the MS associated information related to the MS 2 is held, the idle transition request response that includes the key information of the CMAC in the MS associated information is transmitted to the movement destination BS 3. Therefore, the ASN-GW 11A side can provide the key information of the CMAC to confirm the validity of the ranging request message of the MS 2 to the movement destination BS 3.

During the idle transition request receiving process of the ASN-GW 11A side, if the idle transition request is received from the movement destination BS 3, when it is determined whether the MS associated information related to the MS 2 is held and the MS associated information related to the MS 2 is not held, the MS associated information is acquired from the AAA server 13 and the idle transition request response that includes the key information of the CMAC in the acquired MS associated information is transmitted to the movement destination BS 3. Therefore, the ASN-GW 11A side can provide the key information of the CMAC to confirm the validity of the ranging request message of the MS 2 to the movement destination BS 3.

Figure 24:
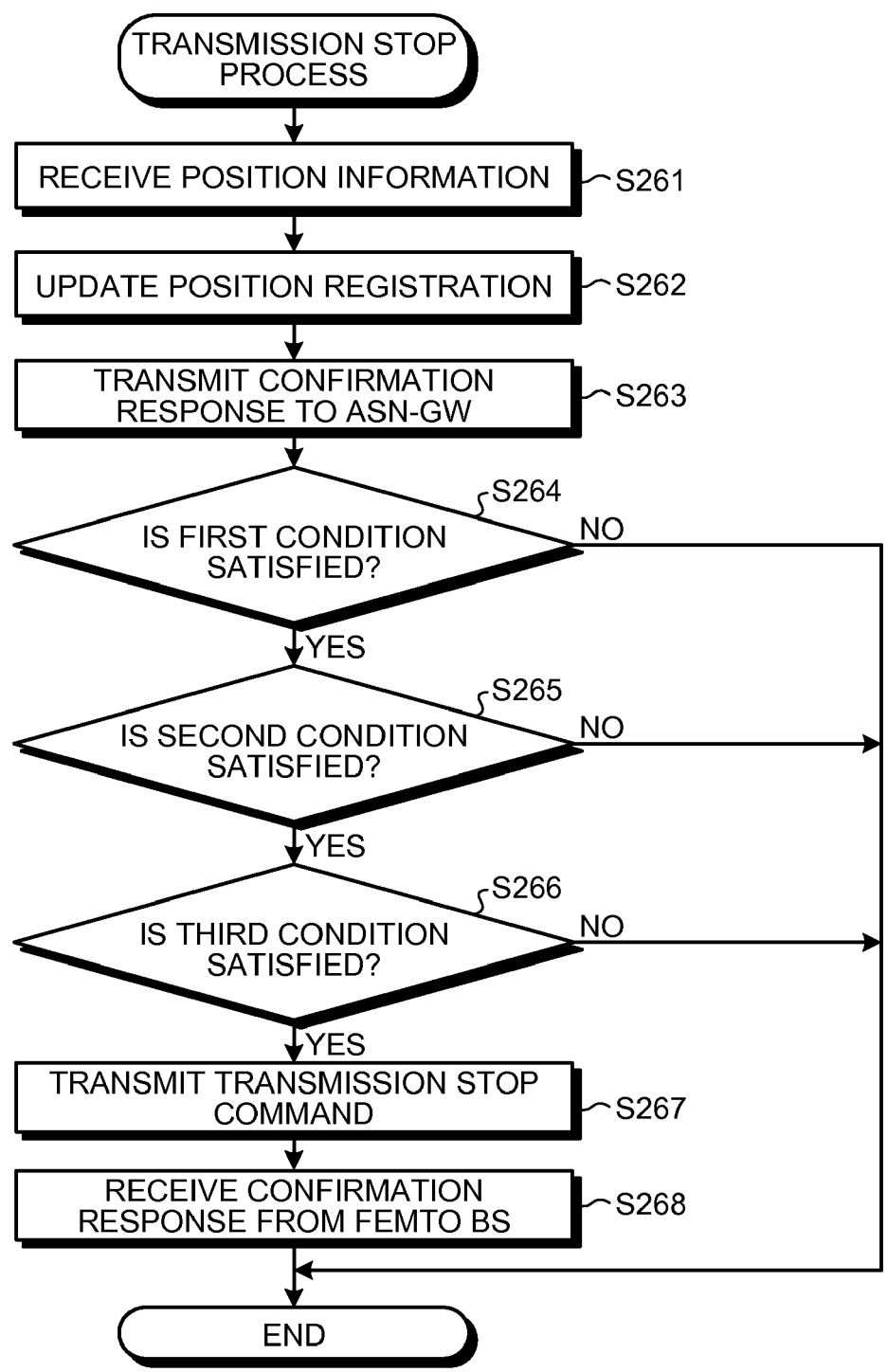
FIG. 24 is a flowchart illustrating an internal processing operation of a femto GW related to a transmission stop process according to position information reception.

Next, the operation of the femto GW 12A in the case where the position information is received from the ASN-GW 11A will be described. FIG. 24 is a flowchart illustrating an internal processing operation of the femto GW 12A related to a transmission stop process according to position information reception.

If the position information of the MS 2 is received from the ASN-GW 11A (step S261), the femto GW 12A illustrated in FIG. 24 updates the position information of the MS 2 in the position registration database 62 on the basis of the position information (step S262), and transmits the confirmation response with respect to the position information to the ASN-GW 11A (step S263).

The pre-movement determining unit 53 in the femto GW 12A determines whether a first condition where the position registration updated MS 2 exists within the coverage of the femto BS 7 or the BS 3 in the vicinity of the femto BS 7 before moving to the coverage of the movement destination BS 3 is satisfied, on the basis of the contents of the position registration database 62 (step S264).

When it is determined by the pre-movement determining unit 53 that the first condition is satisfied (step S264: YES), the first connection existence/non-existence determining unit 54 in the femto GW 12A determines whether a second condition where all of the MSs 2 that can be connected to the femto BS 7 withdraw from the femto BS 7 and the BS 3 belonging to the same PGID as the femto BS 7 is satisfied (step S265).

When it is determined by the first connection existence/non-existence determining unit 54 that the second condition is satisfied (step S265: YES), the active state determining unit 55 in the femto GW 12A determines whether a third condition where a state of the femto BS 7 is an active state is satisfied (step S266).

When it is determined by the active state determining unit 55 that the third condition is satisfied (step S266: YES), the command control unit 56 in the femto GW 12A transmits the transmission stop command to the femto BS 7 to instruct the idle state, that is, the radio transmission stop of the control information, with respect to the femto BS 7 (step S267).

If the confirmation response with respect to the transmission stop command from the femto BS 7, that is, the confirmation response of the idle state is received (step S268), the femto GW 12A updates the state information of the femto BS 7 as the idle state in the femto BS management table 63.

When it is determined by the pre-movement determining unit 53 that the first condition is not satisfied (step S264: NO), it is determined by the first connection existence/non-existence determining unit 54 that the second condition is not satisfied (step S265: NO), or it is determined by the active state determining unit 55 that the third condition is not satisfied (step S266: NO), the femto GW 12A ends the processing operation illustrated in FIG. 24.

During the transmission stop process of the femto GW 12 side illustrated in FIG. 24, if the position information of the MS 2 is received through the ASN-GW 11A, when the contents of the position registration database 62 are updated and the first, second, and third condition are satisfied on the basis of the contents of the position registration database 62, the transmission stop command is transmitted to the femto BS 7. Therefore, the femto BS 7 side can avoid waste of useless transmission power or unnecessary interference for adjacent cells.

When the MS 2 moves to the BS 3 in the vicinity of the femto BS 7, the MS 2 transmits the ranging request message including the PCID and the LU flag to the movement destination BS 3. If the ranging request message is received from the MS 2, the movement destination BS 3 transmits the position registration request including the PGID and the BSID to identify the BS 3 to the ASN-GW 11A.

Figure 25:
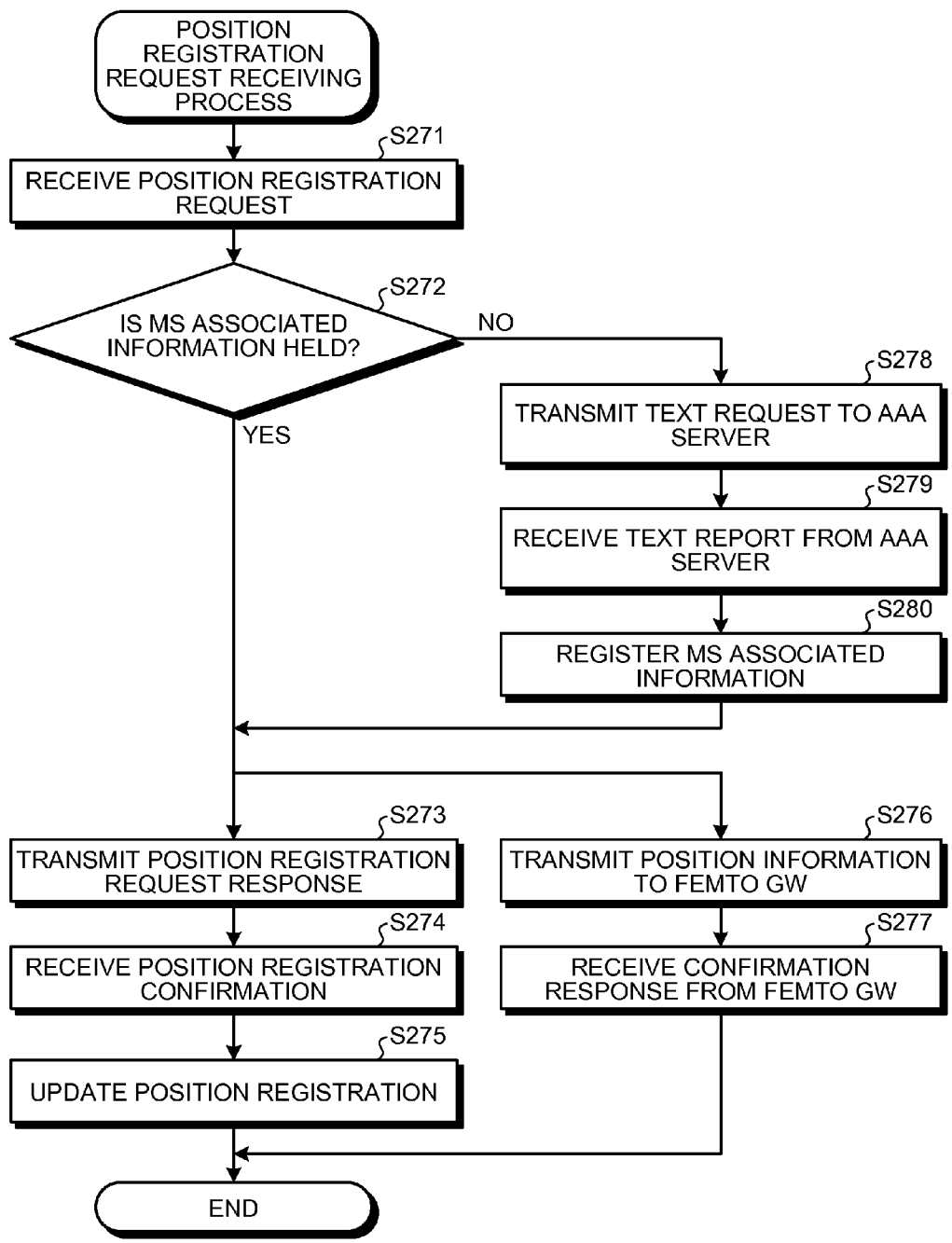
FIG. 25 is a flowchart illustrating an internal processing operation of an ASN-GW related to a position registration request receiving process.

Next, the internal processing operation of the ASN-GW 11A in the case where the position registration request is received from the movement destination BS 3 will be described. FIG. 25 is a flowchart illustrating an internal processing operation of the ASN-GW 11A related to a position registration request receiving process.

If the position registration request of the MS 2 is received from the movement destination BS 3 (step S271), the ASN-GW 11A illustrated in FIG. 25 determines whether the MS associated information related to the MS 2 is held (step S272).

When the MS associated information related to the MS 2 is held (step S272: YES), the ASN-GW 11A transmits the position registration request response with respect to the position registration request to the movement destination BS 3 (step S273).

If the position registration confirmation with respect to the position registration request response is received from the movement destination BS 3 (step S274), the ASN-GW 11A executes the position registration update of the MS 2, on the basis of the PGID or the BSID of the movement destination BS 3 included in the position registration request previously received in step S271 (step S275), and ends the processing operation illustrated in FIG. 25.

When the MS associated information related to the MS 2 is held in step S272, the ASN-GW 11A specifies the femto GW 12A of the femto BS 7 that the MS 2 can be connected, from the information of the MS 2 obtained from the position registration request, and transmits the position information of the MS 2 to the femto GW 12 (step S276).

If the confirmation response with respect to the position information from the femto GW 12 is received (step S277), the ASN-GW 11A ends the processing operation illustrated in FIG. 25.

When the MS associated information related to the MS 2 is not held (step S272: NO), the ASN-GW 11A transmits the text request requesting to transmit the key information of the CMAC to confirm the validity of the ranging request message from the MS 2 to the AAA server 13 (step S278).

If the text report including the MS associated information of the MS 2 is received from the AAA server 13 (step S279), the ASN-GW 11A registers the MS associated information that is included in the text report (step S280), and transits to step S273 to transmit the position registration request response including the key information of the CMAC to confirm the validity of the ranging request message to the movement destination BS.

During the position registration request receiving process of the ASN-GW 11A side illustrated in FIG. 25, if the position registration request of the MS 2 is received from the movement destination BS 3, when it is determined whether the MS associated information is held and the MS associated information is held, the idle transition request response that includes the key information of the CMAC in the MS associated information is transmitted to the movement destination BS 3. Therefore, the ASN-GW 11A side can provide the key information of the CMAC to confirm the validity of the ranging request message of the MS 2 to the movement destination BS 3.

Also, during the position registration request receiving process of the ASN-GW 11A side, if the position registration request is received from the movement destination BS 3, when it is determined whether the MS associated information is held and the MS associated information is not held, the MS associated information is acquired from the AAA server 13 and the position registration request response including the key information of the CMAC of the acquired MS associated information is transmitted to the movement destination BS 3. Therefore, the ASN-GW 11A side can provide the key information of the CMAC to confirm the validity of the ranging request message of the MS 2 to the movement destination BS 3.

Figure 26:
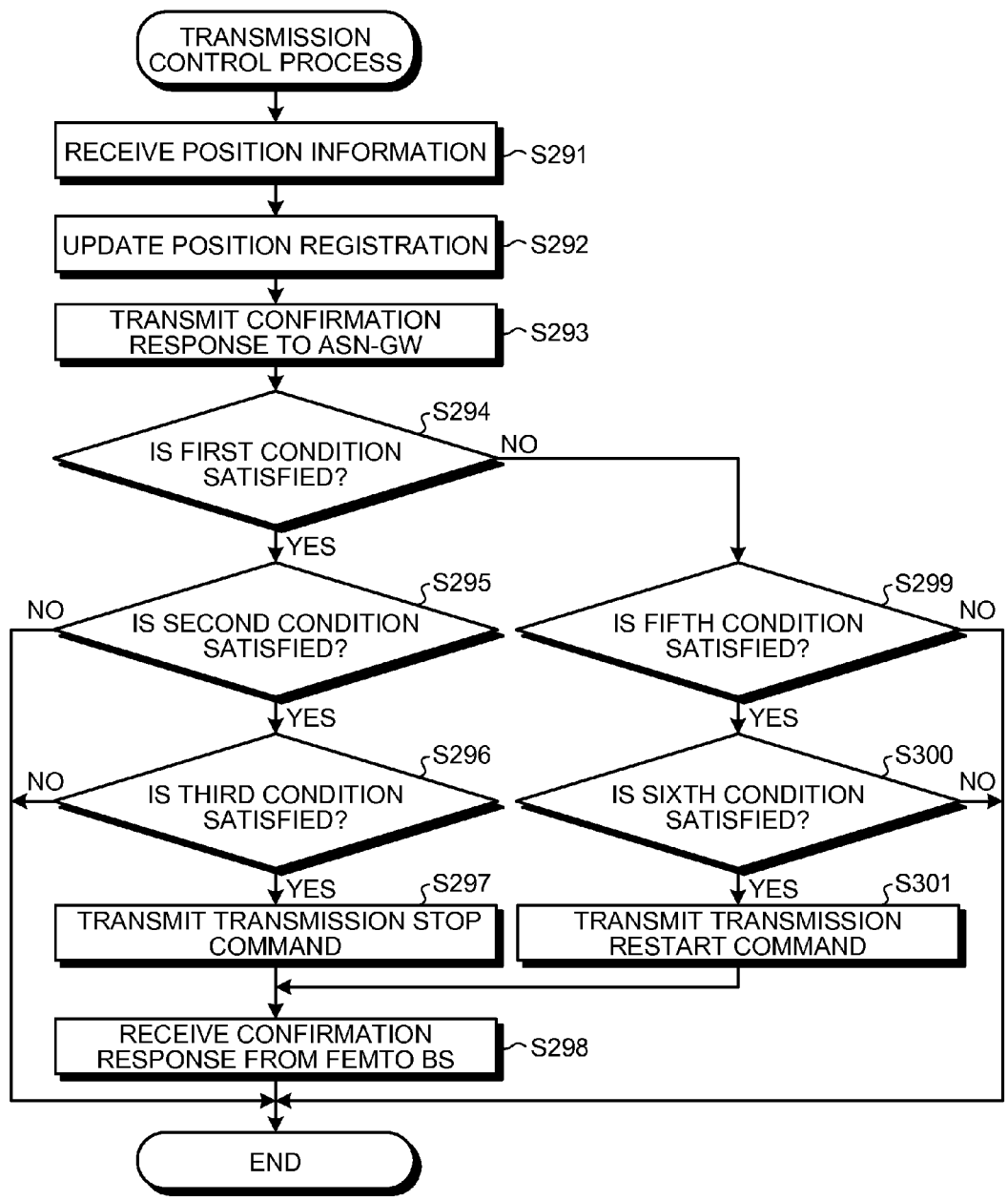
FIG. 26 is a flowchart illustrating an internal processing operation of a femto GW related to a transmission control process according to position information reception.

Next, the internal operation process of the femto GW 12A in the case where the position information is received from the ASN-GW 11A will be described. FIG. 26 is a flowchart illustrating an internal processing operation of the femto GW 12A related to a transmission control process according to position information reception.

If the position information is received from the ASN-GW 11A (step S291), the femto GW 12A illustrated in FIG. 26 updates the position information of the MS 2 in the position registration database 62 on the basis of the position information (step S292).

The femto GW 12A transmits the confirmation response with respect the position information from the ASN-GW 11A to the ASN-GW 11A (step S293).

The pre-movement determining unit 53 in the femto GW 12A determines whether a first condition where the position registration updated MS 2 exists within the coverage of the femto BS 7 or the BS 3 in the vicinity of the femto BS 7 before moving to the movement destination BS is satisfied, on the basis of the contents of the position registration database 62 (step S294).

When it is determined by the pre-movement determining unit 53 that the first condition is satisfied (step S294: YES), the first connection existence/non-existence determining unit 54 in the femto GW 12A determines whether a second condition where all of the MSs 2 that can be connected to the femto BS 7 withdraw from the femto BS 7 and the BS 3 belonging to the same PGID as the femto BS 7 is satisfied (step S295).

When it is determined by the first connection existence/non-existence determining unit 54 that the second condition is satisfied (step S265: NO), the active state determining unit 55 in the femto GW 12A determines whether a third condition where a state of the femto BS 7 is an active state is satisfied (step S296).

When it is determined by the active state determining unit 55 that the third condition is satisfied (step S296: YES), the command control unit 56 in the femto GW 12A transmits the transmission stop command to the femto BS 7 to instruct the idle state, that is, the radio transmission stop of the control information, with respect to the femto BS 7 (step S297).

If the transmission stop command is received from the femto GW 12A, the femto BS 7 transits to the idle state where the radio transmission of the control information is stopped. As a result, the femto BS 7 stops the basic operation as the base station with respect to the MS 2.

If the confirmation response with respect to the command from the femto BS 7 is received (step S298), for example, the confirmation response indicating the idle state with respect to the transmission stop command is received, the femto GW 12A updates the state information of the femto BS 7 as the idle state in the femto BS management table 63.

When it is determined by the pre-movement determining unit 53 that the first condition is not satisfied (step S294: NO), the second connection existence/non-existence determining unit 57 in the femto GW 12A determines that a fourth condition where the position registration updated MS 2 does not exist within the coverage of the femto BS 7 or the BS 3 in the vicinity of the femto BS 7 before moving to the coverage of the movement destination BS 3 is satisfied, and determines whether a fifth condition where the current MS 2 exists in the femto BS 7 or the BS 3 belonging to the same PGID as the femto BS 7 is satisfied (step S299).

When it is determined by the second connection existence/non-existence determining unit 57 that the fifth condition is satisfied (step S299: YES), the idle state determining unit 58 in the femto GW 12A determines that a sixth condition where the femto BS 7 is in the idle state is satisfied (step S300).

When it is determined by the idle state determining unit 58 that the sixth condition is satisfied (step S300: YES), the command control unit 56 in the femto GW 12A transmits the transmission restart command to the femto BS 7 to instruct the active state, that is, the radio transmission restart of the control information, with respect to the femto BS 7 (step S301), and transits to step S298.

If the transmission restart command is received from the femto GW 12A, the femto BS 7 transits to the active state where the radio transmission of the control information restarts. As a result, the femto BS 7 restarts the basic operation as the base station with respect to the MS 2.

If the confirmation response indicating the active state with respect to the transmission restart command is received from the femto BS 7 in step S298, the femto GW 12A updates the state information of the femto BS 7 as the active state in the femto BS management table 63.

When it is determined by the first connection existence/non-existence determining unit 54 that the second condition is not satisfied (step S295: NO), it is determined by the active state determining unit 55 that the third condition is not satisfied (step S296: NO), it is determined by the second connection existence/non-existence determining unit 57 that the fifth condition is not satisfied (step S299: NO), or it is determined by the idle state determining unit 58 that the sixth condition is not satisfied (step S300: NO), the femto GW 12A ends the processing operation illustrated in FIG. 26.

During the transmission control process of the femto GW 12 side illustrated in FIG. 26, if the position information of the MS 2 is received through the ASN-GW 11A, when the contents of the position registration database 62 are updated and the first, second, and third conditions are satisfied on the basis of the contents of the position registration database 62, the transmission control command is transmitted to the femto BS 7. Therefore, the femto BS 7 side can avoid waste of useless transmission power or unnecessary interference for adjacent cells.

During the transmission control process of the femto GW 12A, if the position information of the MS 2 is received through the ASN-GW 11A, when the contents of the position registration database 62 are updated and the fourth, fifth, and sixth conditions are satisfied on the basis of the contents of the position registration database 62, the transmission restart command is transmitted to the femto BS 7. Therefore, the femto BS 7 side can restart the radio transmission of the control information.

In the second embodiment, even though the PC unit 52A is disposed in the ASN-GW 11A, if the position information of the MS 2 is received through the ASN-GW 11A, when the contents of the position registration database 62 are updated on the basis of the position information and the first, second, and third conditions are satisfied on the basis of the contents of the position registration database 62, the transmission stop command is transmitted to the femto BS 7. Therefore, the femto BS 7 side can avoid waste of useless transmission power or unnecessary interference for adjacent cells.

In the second embodiment, if the position information of the MS 2 is received through the ASN-GW 11A, when the contents of the position registration database 62 are updated and the fourth, fifth, and sixth conditions are satisfied on the basis of the contents of the position registration database 62, the transmission restart command is transmitted to the femto BS 7. Therefore, the femto BS 7 side can restart the radio transmission of the control information.

In the second embodiment, the ASN-GW 11A requests the AAA server 13 to transmit the MS associated information, for example, the information of the femto GW 12A and the femto BS 7 related to the MS 2, and acquires the MS associated information from the AAA server 13. Meanwhile, it is needless to say that even though the MS associated information is held in the MS 2 and the ranging request message including the MS associated information is transmitted to the BS 3 and the ASN-GW 11A, the same effects can be obtained.

In the second embodiment, the femto GW 12A holds the surrounding BS of the femto BS 7 in the surrounding BS list management table 61, the femto GW 12A acquires the position information of the MS 2 from the ASN-GW 11A, and the femto GW 12A executes the femto BS transmission control determining process, on the basis of the surrounding BS and the position information. Meanwhile, it is needless to say that even though the ASN-GW 11A acquires the surrounding BS of the femto BS 7 held in the femto GW 12A and the ASN-GW 11A executes the femto BS transmission control determining process on the basis of the surrounding BS of the femto BS 7 and the position information of the MS 2, the same effect can be obtained.

In the first and second embodiments, it is described that the MS 2 during the idle mode is monitored and the active state/idle state of the femto BS 7 is controlled.

Next, an embodiment at the time of handover in which the MS 2 moves from the femto BS 7 to another BS 2 during the communication through the femto BS 7 will be described below as a third embodiment.

[c] Third Embodiment

Figure 27:
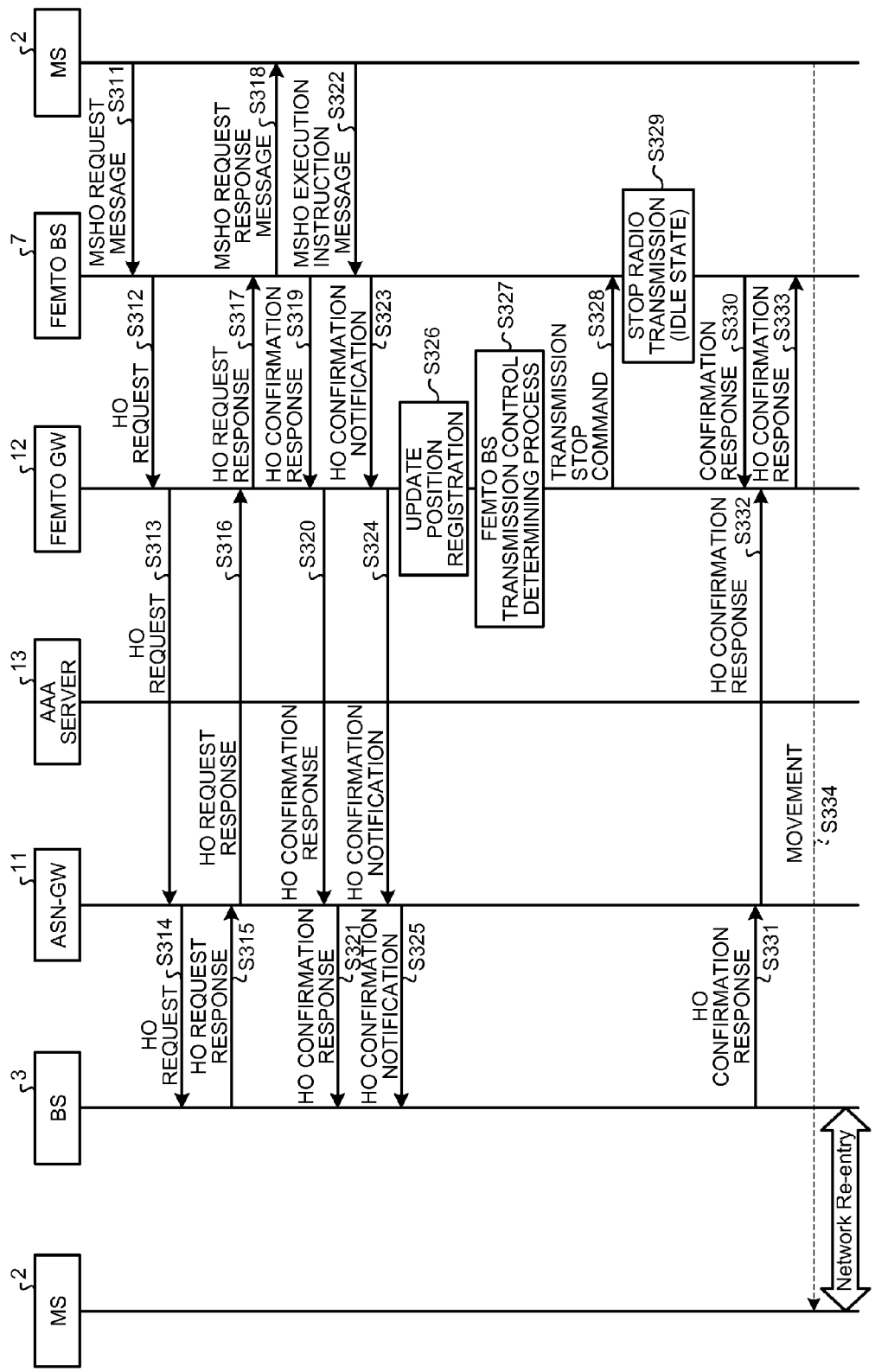
FIG. 27 is a sequence illustrating an internal processing operation of a radio communication system according to handover from a femto BS to another BS.

The same components as of the radio communication system 1 of the first embodiment are denoted by the same reference numerals and the overlapped description of the configuration and operation is omitted. FIG. 27 is a sequence illustrating an internal processing operation of a radio communication system 1B according to handover from the femto BS 7 to another BS 3.

When reception quality of a radio signal received from the femto BS 7 is less than a predetermined threshold value, the MS 2 starts handover (hereinafter, simply referred to as HO) to switch connection from the femto BS 7 to another BS 3 where reception quality of a radio signal received is superior.

If the MS 2 detects the start of the HO, the MS 2 transmits an MSHO request (MOB MSHO-REQ) message to the femto BS 7 (step S311). The MS 2 executes a radio scan operation to previously measure reception quality of the radio signal with respect to the BS 3 or the femto BS 7 around the MS 2, to regularly detect the femto BS 7 (target BS) or the connection destination BS 3.

The MSHO request message includes a BSID that indicates the target BS.

If the MSHO request message is received from the MS 2, the femto BS 7 transmits an HO request (HO-Req) to confirm an available state of a resource of the connection destination BS 3 or the like to the connection destination BS 3 through the femto GW 12 (step S312) and the ASN-GW 11 (step S313) (step S314), on the basis of the BSID of the connection destination BS 3 included in the MSHO request message.

If the HO request is received, the connection destination BS 3 determines existence or non-existence of a band to secure a communication quality (Quality of Service: hereinafter, simply referred to as QoS) of connection of the MS 2, and transmits an HO request response (HO-Rsq) including the determination result to the femto BS 7 through the ASN-GW 11 (step S315) and the femto GW 12 (step S316) (step S317).

If the HO request response is received, the femto BS 7 transmits an MSHO request response (MOB BSHO-RSP) message, which includes information included in the HO request response, to the MS 2 (step S318).

The femto BS 7 also transmits an HO confirmation response (HO-Ack) with respect to the HO request response of step S317 to the BS 3 through the femto GW 12 (step S319) and the ASN-GW 11 (step S320) (step S321).

When the MSHO request response message of step S318 is received, the MS 2 fixes HO execution with respect to the connection destination BS 3, and transmits an MSHO execution instruction (HOB HO-IND) message including a BSID of new connection destination BS 3 to the femto BS 7 (step S322).

If the MSHO execution instruction message is received, the femto BS 7 transmits an HO confirmation notification (HO-Cnf (Confirm)) indicating that the MS 2 starts HO to the new connection destination BS 3 through the femto GW 12 (step S323) and the ASN-GW 11 (step S324) (step S325).

Further, if the HO confirmation notification from the femto BS 7 of step S323 is received, the femto GW 12 updates the position information of the MS 2 in the position registration database 62, on the basis of the HO confirmation notification (step S326), and executes a femto BS transmission control determining process, on the basis of the contents of the position registration database 62 (step S327).

When the first, second, and third conditions are satisfied through the femto BS transmission control determining process, the femto GW 12 transmits a transmission stop command to the femto BS 7 to instruct the idle state, that is, the radio transmission stop of the control information, with respect to the femto BS 7 (step S328).

The determination on whether the second condition where all of the MSs 2 that can be connected to the femto BS 7 withdraw from the femto BS 7 and the BS 3 belonging to the same PGID as the femto BS 7 is satisfied by the first connection existence/non-existence determining unit 54 may be performed on the basis of whether all connections set for MS communication between the femto GW 12 and the femto BS 7 are switched into other BS 3, that is, existence or non-existence of connection.

If the transmission stop command is received from the femto GW 12 in step S328, the femto BS 7 transits to the idle state where the radio transmission of the control information is stopped (step S329). As a result, the femto BS 7 can avoid waste of useless transmission power or unnecessary radio wave interference for adjacent cells.

If the femto BS 7 transits to the idle state where the radio transmission is stopped in step S329, the femto BS 7 transmits a confirmation response indicating the idle state to the femto GW 12 (step S330). As a result, the femto GW 12 updates state information of the femto BS 7 as an idle state in the femto BS management table 63.

If the HO confirmation notification is received from the femto BS 7 through the femto GW 12 and the ASN-GW 11 in step S325, the movement destination BS 3 transmits the HO confirmation response with respect to the HO confirmation notification to the femto BS 7 through the ASN-GW 11 (step S331) and the femto GW 12 (step S332) (step S333).

The MS 2 moves completely from the femto BS 7 to the movement destination BS 3 (step S334) and is then connected to the movement destination BS 3.

The femto GW 12 detects existence or non-existence of the MS 2 within the coverage of the femto BS 7, on the basis of the existence or non-existence of the connection for the MS communication. However, it is needless to say that the femto BS 7 may detect existence or non-existence of the connection and independently transit to the idle state or request the femto GW 12 to transit to the idle state, on the basis of the existence or non-existence of the connection.

Figure 28:
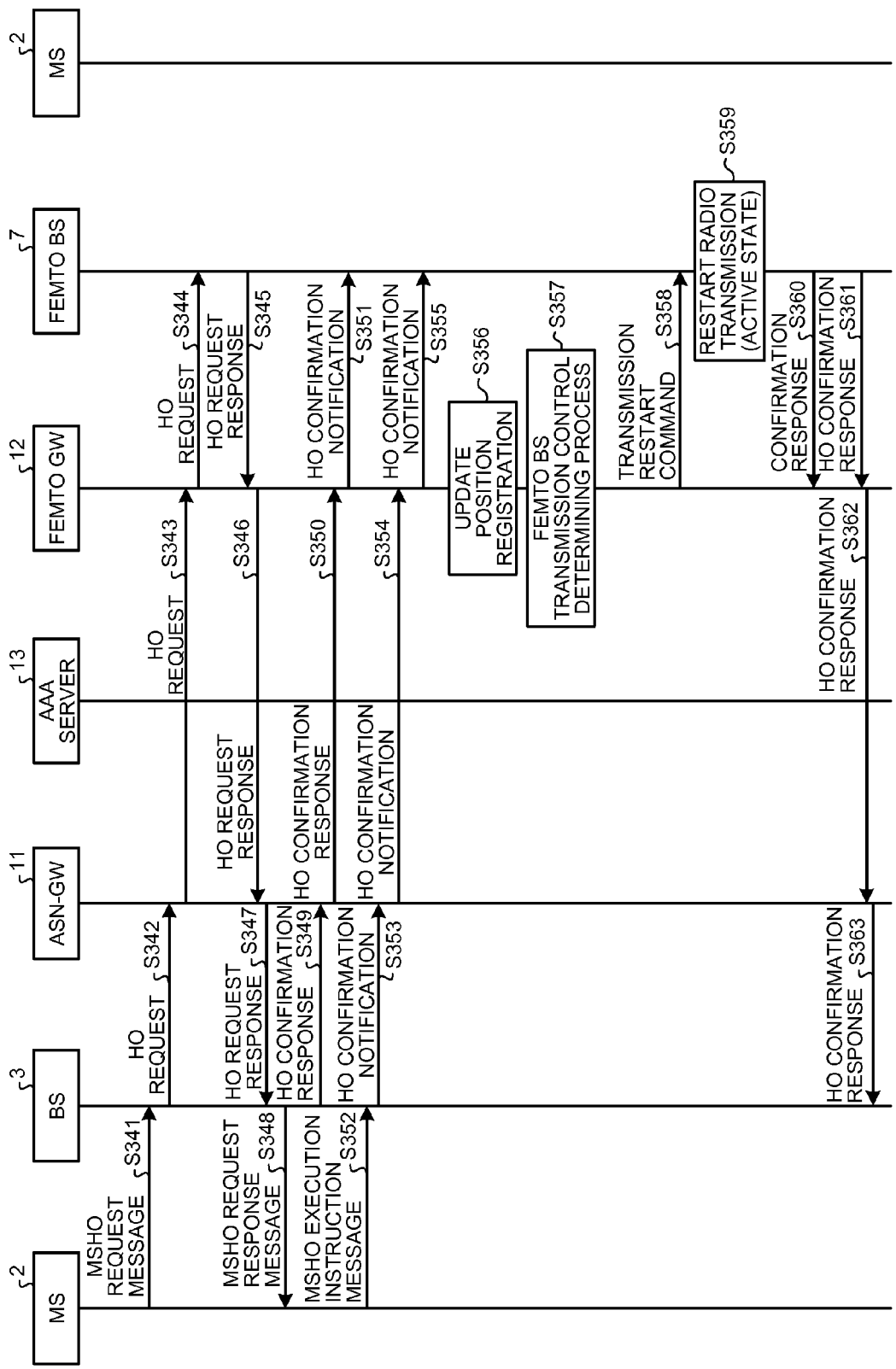
FIG. 28 is a sequence illustrating an internal processing operation of a radio communication system according to handover from another BS to a femto BS.

FIG. 28 is a sequence illustrating an internal processing operation of a radio communication system B1 with handover according to movement between calling groups from another BS to the femto BS 7.

When reception quality of a radio signal received from the BS 3 is less than a predetermined threshold value, the MS 2 starts HO to switch connection from the BS 3 to the femto BS 7 where reception quality of a radio signal received is superior.

If the MS 2 detects the start of the HO, the MS 2 transmits an MSHO request message to the BS 3 (step S341).

If the MSHO request message is received from the MS 2, the BS 3 transmits an HO request to confirm an available state of a resource of the connection destination femto BS 7 or the like to the connection destination femto BS 7 through the ASN-GW 11 (step S342) and the femto GW 12 (step S343) (step S344), on the basis of the connection destination femto BS 7 included in the MSHO request massage.

If the HO request is received, the femto BS 7 determines existence or non-existence of a band to secure the QoS of connection of the MS 2, and transmits an HO request response including the determination result to the BS 3 through the femto GW 12 (step S345) and the ASN-GW 11 (step S346) (step S347).

If the HO request response is received, the BS 3 transmits an MSHO request response message, which includes information included in the HO request response, to the MS 2 (step S348), and transmits an HO confirmation response with respect to the HO request response to the femto BS 7 through the ASN-GW 11 (step S349) and the femto GW 12 (step S350) (step S351).

Also, when the MSHO request response message is received from the BS 3 in step S348, the MS 2 fixes HO execution with respect to the connection destination femto BS 7, and transmits an MSHO execution instruction message including a BSID of new connection destination femto BS 7 to the BS 3 (step S352).

If the MSHO execution instruction message is received, the BS 3 transmits an HO confirmation notification indicating that the MS 2 starts HO to the new connection destination femto BS 7 through the ASN-GW 11 (step S353) and the femto GW 12 (step S354) (step S355).

If the HO confirmation notification is received from the BS 3 in step S354, the femto GW 12 updates the position information of the MS 2 in the position registration database 62, on the basis of the HO confirmation notification (step S356), and executes a femto BS transmission control determining process (step S357).

When the fourth, fifth, and sixth conditions are satisfied through the femto BS transmission control determining process, the femto GW 12 transmits the transmission stop command to the femto BS 7 to instruct the active state, that is, the radio transmission restart of the control information with respect to the femto BS 7 (step S358).

If the transmission restart command is received from the femto GW 12, the femto BS 7 transits to the active state where the radio transmission of the control information restarts (step S359). As a result, the femto BS 7 can restart the radio transmission.

If the femto BS 7 transits to the active state where the radio transmission restarts, the femto BS 7 transmits a confirmation response indicating the active state to the femto GW 12 (step S360).

If the confirmation response of the active state is received from the femto BS 7, the femto GW 12 updates state information of the femto BS 7 as an active state in the femto BS management table 63.

The femto BS 7 transmits the HO confirmation response with respect to the HO confirmation notification to the BS 3 through the femto GW (step S361) and the ASN-GW 11 (step S362) (step S363).

In FIG. 28, the sequence in which the femto BS 7 transits from the idle state to the active state at the time of handover from the BS 3 to the femto BS 7 is described. However, it is needless to say that the femto BS 7 may transit from the idle state to the active state, when the MS 2 performs the scan measurement to measure reception quality of the radio signal of another BS 3.

Figure 29:
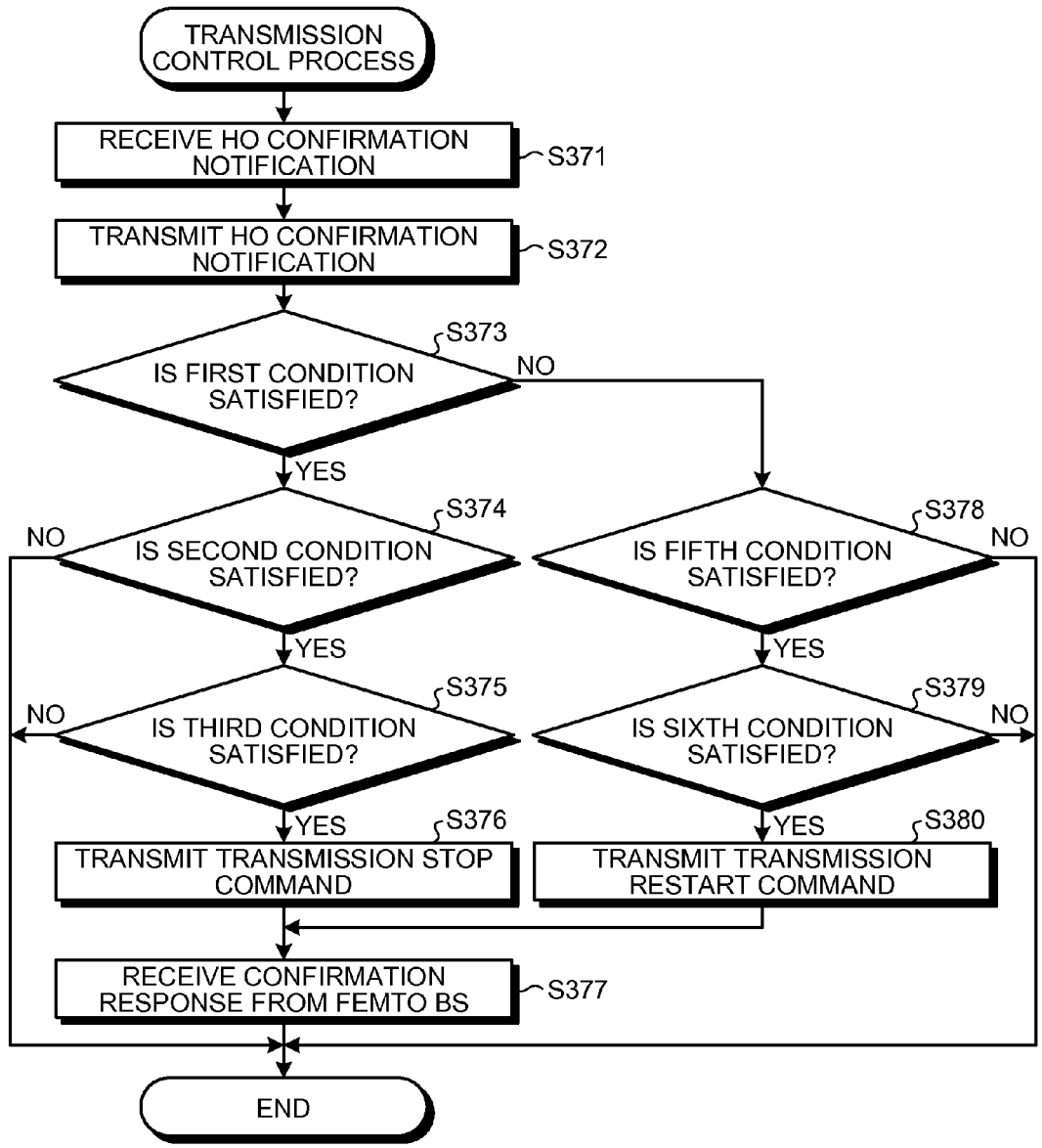
FIG. 29 is a flowchart illustrating an internal processing operation of a femto GW related to a transmission control process according to handover (HO) confirmation notification reception.
Figure 30:
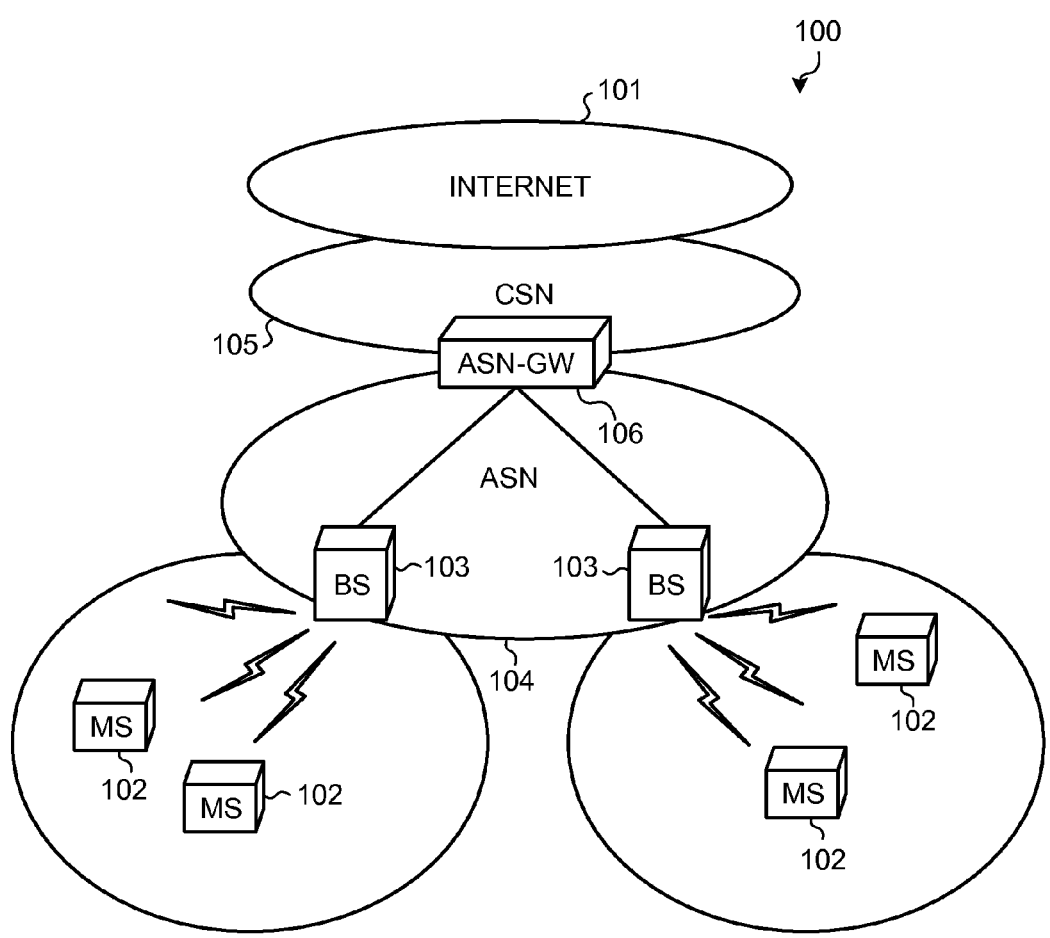
FIG. 30 is a block diagram illustrating the schematic internal configuration of a radio communication system where IEEE802.16d/e is adopted.
Figure 31:
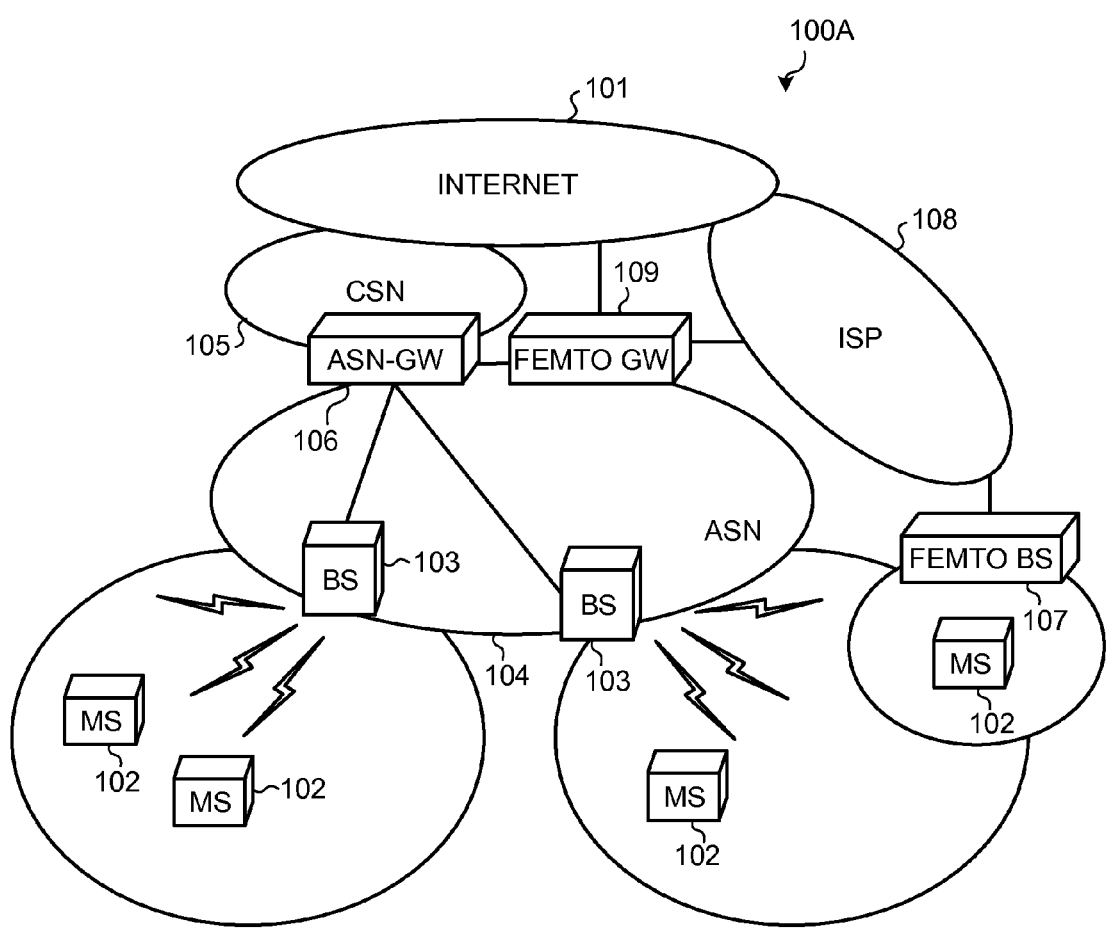
FIG. 31 is a block diagram illustrating the schematic internal configuration of a radio communication system using a femto BS.

As illustrated in FIGS. 27 and 28, a transmission control process of the femto GW 12 side in the case where the HO confirmation notification is received according to the HO start of the MS 2 will be described. FIG. 29 is a flowchart illustrating an internal processing operation of the femto GW 12 related to a transmission control process according to handover (HO) confirmation notification reception.

In FIG. 29, the femto GW 12 receives the HO confirmation notification from the ASN-GW 11 or the femto BS 7 (step S371). When the HO confirmation notification is received from the femto BS 7 in step S371, the femto GW 12 transfers the HO confirmation notification to the BS 3 through the ASN-GW 11 (step S372).

When the HO confirmation notification is received from the ASN-GW 11 in step S371, the femto GW 12 transfers the HO confirmation notification to the femto BS 7 in step S372.

If the HO confirmation notification is transferred, the pre-movement determining unit 53 in the femto GW 12 determines whether a first condition where the MS 2 of the HO exists within the coverage of the femto BS 7 or the BS in the vicinity of the femto BS 7 before moving to the coverage of the movement destination BS 3 is satisfied, on the basis of the managed connection information of the MS 2 (step S373).

When it is determined by the pre-movement determining unit 53 that the first condition is satisfied (step S373: YES), the first connection existence/non-existence determining unit 54 in the femto GW 12 determines whether a second condition where all of the MSs 2 that can be connected to the femto BS 7 withdraw from the femto BS 7 and the BS 3 belonging to the same PGID as the femto BS 7 is satisfied (step S374).

When it is determined by the first connection existence/non-existence determining unit 54 that the second condition is satisfied (step S374: YES), the active state determining unit 55 in the femto GW 12 determines whether a third condition where a state of the femto BS 7 is an active state is satisfied (step S375).

When it is determined by the active state determining unit 55 that the third condition is satisfied, the command control unit 56 in the femto GW 12 transmits the transmission stop command to the femto BS 7 to instruct the idle state, that is, the radio transmission stop of the control information, with respect to the femto BS 7 (step S376).

If the transmission stop command is received from the femto GW 12, the femto BS 7 transits to the idle state where the radio transmission of the control information is stopped. As a result, the femto BS 7 can avoid waste of useless transmission power or unnecessary interference for adjacent cells.

If the confirmation response with respect to the command from the femto BS 7, that is, the confirmation response of the idle state with respect to the transmission stop command is received (step S377), the femto GW 12 updates the state information of the femto BS 7 as the idle state in the femto BS management table 63, and ends the processing operation illustrated in FIG. 12.

When it is determined by the pre-movement determining unit 53 that the first condition is not satisfied (step S373: NO), the second connection existence/non-existence determining unit 57 in the femto GW 12 determines that a fourth condition where the position registration updated MS 2 does not exist within the coverage of the femto BS 7 or the BS 3 in the vicinity of the femto BS 7 before moving to the coverage of the movement destination BS 3 is satisfied, and determines whether a fifth condition where the current MS 2 exists in the femto BS 7 or the BS 3 belonging to the same PGID as the femto BS 7 is satisfied (step S378).

When it is determined that the fifth condition is satisfied (step S378: YES), the idle state determining unit 58 in the femto GW 12 determines whether a sixth condition where the femto BS 7 is in the idle state is satisfied (step S379).

When it is determined by the idle state determining unit 58 that the sixth condition is satisfied (step S379: YES), the command control unit 56 in the femto GW 12 transmits the transmission restart command to the femto BS 7 to instruct the active state, that is, the radio transmission restart of the control information, with respect to the femto BS 7 (step S380), and transits to step S377.

If the transmission restart command is received from the femto GW 12, the femto BS 7 transits to the active state where the radio transmission of the control information restarts. As a result, the femto BS 7 restarts the basic operation as the base station with respect to the MS 2.

If the confirmation response of the active state with respect to the transmission restart command is received in step S380, the femto GW 12 updates the state information of the femto BS 7 as the active state in the femto BS management table 63.

When it is determined by the first connection existence/non-existence determining unit 54 that the second condition is not satisfied (step S374: NO), it is determined by the active state determining unit 55 that the third condition is not satisfied (step S375: NO), it is determined by the second connection existence/non-existence determining unit 57 that the fifth condition is not satisfied (step S378: NO), or it is determined by the idle state determining unit 58 that the sixth condition is not satisfied (step S379: NO), the femto GW 12 ends the processing operation illustrated in FIG. 29.

During the transmission control process of the femto GW 12 side illustrated in FIG. 29, if the HO confirmation notification of the MS 2 is received, when the contents of the position registration database 62 are updated and the first, second, and third conditions are satisfied on the basis of the contents of the position registration database 62, the transmission stop command is transmitted to the femto BS 7. Therefore, the femto BS 7 side can avoid waste of useless transmission power or unnecessary interference for adjacent cells.

During the transmission control process of the femto GW 12 side, if the HO confirmation notification of the MS 2 is received, when the contents of the position registration database 6 are updated and the fourth, fifth, and sixth conditions are satisfied on the basis of the contents of the position registration database 62, the transmission restart command is transmitted to the femto BS 7. Therefore, the femto BS 7 side can restart the radio transmission of the control information.

In the third embodiment, if the HO confirmation notification of the MS 2 is received at the time of the handover of the MS 2, when the contents of the position registration database 62 are updated and the first, second, and third condition are satisfied on the basis of the contents of the position registration database 62, the transmission stop command is transmitted to the femto BS 7. Therefore, the femto BS 7 side can avoid waste of useless transmission power or unnecessary interference for adjacent cells.

In the third embodiment, if the HO confirmation notification of the MS 2 is received at the time of the handover of the MS 2, when the contents of the position registration database 62 are updated and the fourth, fifth, and sixth conditions are satisfied on the basis of the contents of the position registration database 62, the transmission restart command is transmitted to the femto BS 7. Therefore, the femto BS 7 side can restart the radio transmission of the control information.

In the first to third embodiments, when it is determined by the pre-movement determining unit 53 that the first condition is satisfied, it is determined by the first connection existence/non-existence determining unit 54 that the second condition is satisfied, and it is determined by the active state determining unit 55 that the third condition is satisfied, the transmission stop command is transmitted to the femto BS 7. However, when the first and third conditions are not satisfied but the second condition is satisfied, the transmission stop command may be transmitted. The femto BS 7 that receives the transmission stop command may intermittently radio-transmit the control information, instead of completely stopping the radio transmission of the control information, until the transmission restart command is received.

In the first to third embodiments, when it is determined by the pre-movement determining unit 53 that the fourth condition is satisfied, it is determined by the second connection existence/non-existence determining unit 57 that the fifth condition is satisfied, and it is determined by the idle state determining unit 58 that the sixth condition is satisfied, the transmission restart command is transmitted to the femto BS 7. However, when the fourth and sixth conditions are not satisfied but the fifth condition is satisfied, the transmission restart command may be transmitted.

The embodiments of the present invention are described. However, it is needless to say that the technical spirit of the present invention is not limited by the embodiments, and various different embodiments can be made without departing from a range of the technical spirit described in claims. The effects that are described in the embodiments are not limited to the above description.

It is needless to say that all or part of the processes described as being automatically executed among the various processes described in the embodiments may be manually executed. In contrast, all or part of the processes described as being manually executed may be automatically executed. The information that includes the process sequences, the control sequences, the specific names, and the variety of data or parameters all described in the above embodiments may be appropriately changed, except for the case where the specific mentions are given.

The components of the individual apparatus that are illustrated in the drawings are functional and conceptual, and do not need to be physically configured as illustrated in the drawings. That is, the specific aspects of the apparatuses are not limited to the forms illustrated in the drawings.

Further, all or part of the various processing functions that are executed in the individual apparatuses may be executed on a CPU (Central Processing Unit) (or a microcomputer, such as an MPU (Micro Processing Unit) or an MCU (Micro Controller Unit)), a program that is analyzed and executed by the CPU (or the microcomputer, such as the MPU or the MCU), or hardware based on wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A gateway device, comprising:
    a network connection providing unit that provides network connection to a mobile subscriber radio-accommodated in a specific base station among base stations each radio-accommodating mobile subscribers in a corresponding calling area;
    a receiving unit that receives a message related to movement or position registration of the mobile subscriber;
    a first subscriber existence determining unit that determines whether the mobile subscriber radio-accommodated in the base station in a specific calling area including a calling area of the specific base station withdraws, when the message is received in the receiving unit; and
    a command control unit that transmits a transmission stop command that instructs to stop radio transmission to the mobile subscriber, to the specific base station, when it is determined by the first subscriber existence determining unit that the mobile subscriber radio-accommodated in the base station in the specific calling area withdraws.

2. The gateway device according to claim 1, further comprising:
    a pre-reception determining unit that determines whether the mobile subscriber related to the message is radio-accommodated in the base station in the specific calling area immediately before receiving the message, when the message is received in the receiving unit,
    wherein the first subscriber existence determining unit determines whether the mobile subscriber radio-accommodated in the base station in the specific calling area withdraws, when it is determined by the pre-reception determining unit that the mobile subscriber related to the message is radio-accommodated in the base station in the specific calling area.

3. The gateway device according to claim 2, further comprising:
    a radio transmission state determining unit that determines whether a radio transmission state of the specific base station is an operation state,
    wherein the command control unit transmits the transmission stop command to the specific base station, when it is determined by the first subscriber existence determining unit that the mobile subscriber radio-accommodated in the base station in the specific calling area withdraws and it is determined by the radio transmission state determining unit that the radio transmission state is the operation state.

4. The gateway device according to claim 1, further comprising:
    a position information managing unit that registers and manages position information for each mobile subscriber that is connectable to the specific base station,
    wherein the first subscriber existence determining unit determines whether the mobile subscriber radio-accommodated in the base station in the specific calling area withdraws, on the basis of the position information registered and managed in the position information managing unit.

5. The gateway device according to claim 1, further comprising:
    a connection managing unit that manages existence of connection used in data transmission and reception of the mobile subscriber set to the base station, which is managed by the connection managing unit,
    wherein the first subscriber existence determining unit determines whether the mobile subscriber radio-accommodated in the base station in the specific calling area withdraws, on the basis of existence of the connection managed by the connection managing unit.

6. The gateway device according to claim 1,
    wherein the message corresponds to a message that requests to register a current position of the mobile subscriber in the gateway device.

7. The gateway device according to claim 1,
    wherein the message corresponds to a message that notifies the gateway device of connection switching of the base station radio-accommodating the mobile subscriber.

8. The gateway device according to claim 1,
    wherein the specific calling area includes calling areas of the base stations adjacent to the calling area of the specific base station, in addition to the calling area of the specific base station.

9. The gateway device according to claim 1, further comprising a second subscriber existence determining unit that determines whether the mobile subscriber radio-accommodated in the base station in the specific calling area exists, when the message is received in the receiving unit, wherein
    the command control unit transmits a transmission restart command that instructs to restart radio transmission to the mobile subscriber, to the specific base station, when it is determined by the second subscriber existence determining unit that the mobile subscriber radio-accommodated in the base station in the specific calling area exists.

10. The gateway device according to claim 9, further comprising:
    a pre-reception determining unit that determines whether the mobile subscriber related to the message is radio-accommodated in the base station in the specific calling area immediately before receiving the message, when the message is received in the receiving unit,
    wherein the second subscriber existence determining unit determines whether the mobile subscriber radio-accommodated in the base station in the specific calling area exists, when it is determined by the pre-reception determining unit that the mobile subscriber related to the message is not radio-accommodated in the specific calling area.

11. The gateway device according to claim 10, further comprising:

a radio transmission stop state determining unit that determines whether a radio transmission state of the specific base station is a stop state, wherein the command control unit transmits the transmission restart command to the specific base station, when it is determined by the second subscriber existence determining unit that the mobile subscriber radio-accommodated in the base station in the specific calling area withdraws and it is determined by the radio transmission stop state determining unit that the radio transmission state is the stop state.

12. The gateway device according to claim 9, further comprising:

a position information managing unit that registers and manages position information for each mobile subscriber that is connectable to the base station that is managed by the position information managing unit, wherein the second subscriber existence determining unit determines whether the mobile subscriber radio-accommodated in the base station in the specific calling area exists, on the basis of the position information registered and managed in the position information managing unit.

13. The gateway device according to claim 9, further comprising:

a connection managing unit that manages existence of connection used in data transmission and reception of the mobile subscriber set to the base station that is managed by the connection managing unit, wherein the second subscriber existence determining unit determines whether the mobile subscriber radio-accommodated in the base station in the specific calling area exists, on the basis of existence of the connection managed by the connection managing unit.

14. The gateway device according to claim 9, wherein the message corresponds to a message that requests to register a current position of the mobile subscriber in the gateway device.

15. The gateway device according to claim 9, wherein the message corresponds to a message that notifies the gateway device of connection switching of the base station radio-accommodating the mobile subscriber.

16. The gateway device according to claim 9, wherein the specific calling area includes calling areas of the base stations adjacent to the calling area of the specific base station, in addition to the calling area of the specific base station.

17. A radio transmission control method, comprising:

providing network connection to a mobile subscriber radio-accommodated in a specific base station among base stations each radio-accommodating mobile subscribers in a corresponding calling area;

receiving a message related to movement or position registration of the mobile subscriber;

determining whether the mobile subscriber radio-accommodated in the base station in a specific calling area including a calling area of the specific base station withdraws, when the message is received; and transmitting a transmission stop command that instructs to stop radio transmission to the mobile subscriber, to the specific base station, when it is determined that the mobile subscriber radio-accommodated in the base station in the specific calling area withdraws.

18. The radio transmission control method according to claim 17, further comprising:

determining whether the mobile subscriber radio-accommodated in the base station in the specific calling area exists, when the message is received; and transmitting a transmission restart command that instructs to restart radio transmission to the mobile subscriber, to the specific base station, when it is determined that the mobile subscriber radio-accommodated in the base station in the specific calling area exists.

19. A radio communication system, comprising:

base stations each radio-accommodating mobile subscribers in a corresponding calling area; and a gateway device that provides network connection to the mobile subscriber radio-accommodated in a specific base station among the base stations, wherein the gateway device includes a receiving unit that receives a message related to movement or position registration of the mobile subscriber, a first subscriber existence determining unit that determines whether the mobile subscriber radio-accommodated in the base station in a specific calling area including a calling area of the specific base station withdraws, when the message is received in the receiving unit, and a command control unit that transmits a transmission stop command that instructs to stop radio transmission to the mobile subscriber, to the specific base station, when it is determined by the first subscriber existence determining unit that the mobile subscriber radio-accommodated in the base station in the specific calling area withdraws, and the specific base station stops radio transmission to the mobile subscriber, when receiving the transmission stop command.

20. The radio communication system according to claim 19, wherein the gateway device further includes a second subscriber existence determining unit that determines whether the mobile subscriber radio-accommodated in the base station in the specific calling area exists, when the message is received in the receiving unit, the command control unit transmits a transmission restart command that instructs to restart radio transmission to the mobile subscriber, to the specific base station, when it is determined by the second subscriber existence determining unit that the mobile subscriber radio-accommodated in the base station in the specific calling area exists, and the specific base station restarts radio transmission to the mobile subscriber, when receiving the transmission restart command.

\* \* \* \* \*